(12) United States Patent
Chang et al.

(10) Patent No.: US 7,287,166 B1
(45) Date of Patent: Oct. 23, 2007

(54) GUARDS FOR APPLICATION IN SOFTWARE TAMPERPROOFING

(75) Inventors: Hoi Chang, Walnut Creek, CA (US); Mikhail J. Atallah, West Lafayette, IN (US); John R. Rice, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 10/620,534

(22) Filed: Jul. 16, 2003

Related U.S. Application Data

(63) Continuation-in-part of application No. 09/455,580, filed on Dec. 6, 1999, now abandoned.

(60) Provisional application No. 60/396,186, filed on Jul. 16, 2002, provisional application No. 60/152,769, filed on Sep. 3, 1999.

(51) Int. Cl.
*G06F 12/14* (2006.01)

(52) U.S. Cl. ............... 713/187; 713/176; 713/189; 713/194

(58) Field of Classification Search ............ 713/176, 713/187, 189, 194
See application file for complete search history.

(56) References Cited

U.S. PATENT DOCUMENTS

| | | | |
|---|---|---|---|
| 4,120,030 A | 10/1978 | Johnstone | |
| 4,465,901 A | 8/1984 | Best | |
| 5,493,649 A | 2/1996 | Slivka et al. | |
| 5,666,411 A | 9/1997 | McCarty | |
| 5,684,875 A | 11/1997 | Ellenberger | |
| 5,687,191 A | 11/1997 | Lee et al. | |
| 5,737,416 A | 4/1998 | Cooper et al. | |
| 5,745,573 A | 4/1998 | Lipner et al. | |
| 5,748,741 A * | 5/1998 | Johnson et al. ............... | 380/28 |
| 5,822,360 A | 10/1998 | Lee et al. | |
| 5,822,517 A | 10/1998 | Dotan | |
| 5,892,899 A | 4/1999 | Aucsmith et al. | |
| 5,892,900 A | 4/1999 | Gintner et al. | |
| 5,933,498 A | 8/1999 | Schneck et al. | |
| 6,006,328 A | 12/1999 | Drake | |
| 6,044,469 A | 3/2000 | Horstmann | |
| 6,052,780 A | 4/2000 | Glover | |
| 6,055,503 A | 4/2000 | Horstmann | |
| 6,061,449 A | 5/2000 | Candelore et al. | |
| 6,088,452 A | 7/2000 | Johnson et al. | |
| 6,119,108 A | 9/2000 | Holmes et al. | |
| 6,134,659 A | 10/2000 | Sprong et al. | |
| 6,138,119 A | 10/2000 | Hall et al. | |
| 6,175,925 B1 | 1/2001 | Nardone et al. | |
| 6,178,509 B1 | 1/2001 | Nardone et al. | |
| 6,185,683 B1 | 2/2001 | Gintner et al. | |
| 6,192,475 B1 | 2/2001 | Wallace | |
| 6,205,550 B1 | 3/2001 | Nardone et al. | |
| 6,237,786 B1 | 5/2001 | Gintner et al. | |
| 6,334,189 B1 | 12/2001 | Granger et al. | |
| 6,438,432 B1 | 8/2002 | Zimmermann et al. | |
| 6,463,538 B1 | 10/2002 | Elteto | |
| 6,480,959 B1 | 11/2002 | Granger et al. | |
| 6,594,761 B1 * | 7/2003 | Chow et al. ................. | 713/190 |
| 6,668,325 B1 * | 12/2003 | Collberg et al. ............ | 713/194 |
| 6,779,114 B1 * | 8/2004 | Chow et al. ................. | 713/189 |
| 6,842,862 B2 * | 1/2005 | Chow et al. ................. | 713/190 |
| 7,054,443 B1 * | 5/2006 | Jakubowski et al. .......... | 380/28 |
| 2005/0210275 A1 * | 9/2005 | Homing et al. ............. | 713/190 |

FOREIGN PATENT DOCUMENTS

| | | |
|---|---|---|
| WO | WO97/15051 | 4/1997 |
| WO | WO99/01815 | 1/1999 |
| WO | WO99/64973 | 12/1999 |
| WO | WO 00/67095 | 11/2000 |
| WO | WO 00/77596 | 12/2000 |
| WO | WO 01/14953 | 3/2001 |

OTHER PUBLICATIONS

Collberg et al. ;"A Taxonomy of Obfuscating Transformations"; Jul. 1997; Department of Computer Science, The University of Auckland; pp. 1-36.*

Copy Protection Methods; http://www.erasmataz.com/library/JCGD_Volume_6/Copy_Protection.html; pp. 1-6; Author unknown, Dec. 27, 1997.

(Continued)

*Primary Examiner*—Gilberto Barrón, Jr.
*Assistant Examiner*—Jung Kim
(74) *Attorney, Agent, or Firm*—Bose McKinney & Evans LLP

(57) ABSTRACT

A method of protecting a software program from unauthorized modification, and a system for practicing the method. The method utilizes self-protecting software code. Armed internally with self-defensive mechanisms, a self-protecting software program is tamper-resistant. Whenever its integrity is compromised, a self-protecting software program may become unusable due to software program crashes or other errors, or may generate subtle errors that do not immediately result render the program unusable but still result in incorrect software program execution. A self-protecting software program also may be able to repair itself to restore the integrity of its damaged code. The system comprises a computer program for automatically adding self-protection features to a software program.

10 Claims, 46 Drawing Sheets

OTHER PUBLICATIONS

Cifuentes, Cristina, Structuring Decompiled Graphs, Proceedings of the International Conference on Computer Construction, pp. 91-105, Linkoping, Sweden, 1996.

Joepgen, Hans-Georg, and Krau_, Stefan, Rundum-Schutz durch Fertig-Programmbausteine, Elektronik 17/1993, pp. 52-56.

Larus, James, Whole Program Paths, SIGPLAN PLDI, May 1999.

Schulman, Andrew, Examining the Windows AARD Detection Code, Dr. Dobb's Journal, vol. 18, No. 19, Sep. 1993, pp. 42, 44-48, 89.

White, Steve R., and Comerford, Liam, ABYSS: An Architecture for Software Protection, IEEE Transactions on Software Engineering, vol. 16, No. 6, Jun. 1990, pp. 619-629.

Collberg, Thomborson and Low, A Taxonomy of Obfuscating Transformations, Technical Report 148, pp. 1-36, Jul. 1997.

Aucsmith, Tamper Resistant Software: An Implementation from Lecture Notes in Computer Science 1174, 1996, pp. 317-333.

Millen, Kernel Isolation for the PDP-11/70 from Proceedings of the 1982 Symposium on Security and Privacy, 1982, pp. 57-65.

Dwork, Lotspiech and Naor, Digital Signets: Self-Enforcing Protection of Digital Information (Preliminary Version), 1996, pp. 489-498.

Wood and Seidler, Security Modules: Potent Information Security System Components from Computers & Security, 1985, pp. 114-121.

Necula and Lee, Research on Proof-Carrying Code for Untrusted-Code Security from 1997 IEEE Symposium on Security and Privacy, 1997, p. 204.

Sander and Tschudin, Protecting Mobil Agents Against Malicious Hosts from Lecture Notes in Computer Science 1419, Mobile Agents and Security, 1998, pp. 44-60.

Mambo, Murayama and Okamoto, A Tentative Approach to Constructing Tamper-Resistant Software from New Security Paradigms Workshop, 1997, pp. 23-33.

Kahng, Mantik, Markov, Potkonjak, Tucker, Wang and Wolfe, Robust IP Watermarking Methodologies for Physical Design from Design Automation Conference, 1998, pp. 782-787.

Carolina, Software Protection Technology Legal Aspects of Software Protection Devices from the Computer Law and Security Report, 1995, pp. 188-193.

Larus and Schnarr, EEL: Machine-Independent Executable Editing, 1995, pp. 1-10.

Collberg, Thomborson and Low, Breaking Abstractions and Unstructuring Data Structures, pp. 1-11, 1998.

Collberg and Thomborson, Software Watermarking: Models and Dynamic Embeddings, pp. 1-14, 1999.

Bashar, Krisnan, Kuhn, Spafford and Wagstaff, Low-Threat Security Patches and Tools, pp. 1-8, Oct. 1997.

Collberg, Thomborson and Low, Manufacturing Cheap, Resilient, and Stealthy Opaque Constructs, 1998, pp. 184-196.

Atallah, Mikhail J.; Pantazopolous, Konstatinos N.; and Spafford, Eugene H.; Secure Outsourcing of Some Computations; pp. 1-23, 1996.

* cited by examiner

```
// template 1
        movl        $RANDOM_1, CHECKSUM_1  // RANDOM_1 = any integer
        movl        $START_1, TEMP_1
LABEL_1:
        Cmpl        $END_1, TEMP_1
        jg          LABEL_2
        addl        (TEMP_1), CHECKSUM_1
        addl        $RANDOM_2, TEMP_1  // RANDOM_2 in [3,5]
        jmp         LABEL_1
LABEL_2:

//template2
        movl        $START_1+END_1+RANDOM_1, TEMP_1  // RANDOM_1 = any
                    integer
        xorl        CHECKSUM_1, CHECKSUM_1
        movl        TEMP_1, CHECKSUM_2
LABEL_1:
        addl        -END_1-RANDOM_1(TEMP_1), CHECKSUM_1
        xorl        -END_1-RANDOM_2+3(TEMP_1), CHECKSUM_2
        subl        $-RANDOM_2, TEMP_1 // RANDOM_2 in [3,5]
        cmpl        $END_1+END_1+RANDOM_1, TEMP_1
        jle         LABEL_1
```

FIG. 3

$$
\begin{aligned}
& (x+3)(y+7) & & & (1)\\
=\ & (x+3+0)(y+7+0) & & & (2)\\
=\ & (x+3+u-u_0)(y+7+w_0-w) & & \text{iff } u=u_0 \text{ and } w=w_0 & (3)\\
=\ & (x+u+k_1)(y-w+k_2) & & \text{where } k_1=3-u0 \text{ and } k_2=7+w_0 & (4)
\end{aligned}
$$

FIG. 4

```
1   main:
2           leal    -4(%esp), %esp       // %esp := %esp – 4
3           movl    %ebp, (%esp)         // mem[%esp] := %ebp
4           movl    %esp, %ebp
5           subl    $8, %esp             // %esp := %esp – 8
6           leal    -8(%ebp), %eax
7           leal    -4(%esp), %esp
8           movl    %eax, (%esp)
9           leal    -4(%esp), %esp
10          movl    $str1, (%esp)
11          leal    -4(%esp), %esp
12          movl    $next1, (%esp)       // mem[%esp] := $next1
13          jmp     scanf                //jump to location scanf
14
15  next1:
16          addl    $8, %esp             // %esp :=%esp + 8
17          leal    -4(%esp), %esp
18          movl    -8(%ebp), %eax       // %eax := mem[%ebp-8]
19          movl    %eax, (%esp)
20          leal    -4(%esp), %esp
21          movl    $next2, (%esp)
22          jmp     pr_fact
23
24  next2
25          addl    $4, %esp
26          movl    %ebp, %esp
27          movl    (%esp), %ebp
28          leal    4(%esp), %esp
29          leal    4(%esp), %esp
30          jmp     *-4(%esp)
31
32  pr_fact:
33          leal    -4(%esp), %esp
34          movl    %ebp, (%esp)
35          movl    %esp, %ebp
36          subl    $4, %esp
37          movl    $1, -4(%ebp)
38          jmp     .L94
39
40  .L94
41          cmpl    $1, 8(%ebp)          // mem[%ebp+8] – 1 == ??
42          g       .L96                 // if ?? > 0, jmp .L96
43          jmp     .L98
44
45  .L96
46          movl    -4(%ebp), %eax
47          imul    8(%ebp), %eax        // %eax := %eax * mem[%ebp+8]
48          movl    %eax, -4(%ebp)
49          subl    $1, 8(%ebp)
50          jmp     .L94
51
52  .L98
53          leal    -4(%esp), %esp
54          movl    -4(%ebp), %eax
55          movl    %eax, (%esp)
56          leal    -4(%esp),
```

FIG. 6A

```
57          movl    $str2, (%esp)
58          leal    -4(%esp), %esp
59          movl    $next3, (%esp)
60          jmp     printf
61
62  next3:
63          addl    $8, %esp
64          movl    %ebp, %esp
65          movl    (%esp), %ebp
66          leal    4(%esp), %esp
67          leal    4(%esp), %esp
68          jmp     *-4(%esp)           // jump to addr in mem[%esp-4]
69
```

FIG. 6B

```
 1   main:
 2         leal    -4(%esp), %esp
 3         movl    %ebp, (%esp)
 4         movl    %esp, %ebp
 5         subl    $8, %esp
 6         leal    -8(%ebp), %eax
 7         leal    -4(%esp), %esp
 8         movl    %eax, (%esp)
 9         leal    -4(%esp), %esp
10         movl    $str1, (%esp)
11         leal    -4(%esp), %esp
12         movl    $next1, (%esp)
13         jmp     scanf
14
15   next1:                              // start of client
16         addl    $8, %esp
17         leal    -4(%esp), %esp
18         movl    -8(%ebp), %eax
19         movl    %eax, (%esp)
20         leal    -4(%esp), %esp
21         movl    $next2, (%esp)
22         jmp     pr_fact
23   end1:                               // end of client
24
25   next2:
26         addl    $4, %esp
27         movl    %ebp, %esp
28         movl    (%esp), %ebp
29         leal    4(%esxp), %esp
30         leal    4(%esp), %esp
31         jmp     *-4(%esp)
32
33   pr_fact:
34         leal    -4(%esp), %esp
35         movl    %ebp, (%esp)
36         movl    %esp, %ebp
37         subl    $4, %esp
38
39         // guard installation site
40
41         movl    $100, g1
42         movl    $next1, %eax
43   guard1_1:
44         cmpl    $end1, %eax
45         jg      guard1_2
46         movl    g1, %ecx
47         addl    (%eax), %ecx
48         movl    %ecx, g1
49         addl    $3, %eax
50         jmp     guard1_1
51   guard1_2:
52
53         // end of checksumming: (g1, G!)
54
55         movl    $-G1+1, %eax         // G1 is the checksum constant
56         addl    g1, %eax
```

FIG. 7A

| | | |
|---|---|---|
| 57 | movl | %eax, -4(%ebp) |
| 58 | jmp | .L94 |
| 59 | | |
| 60 .L94: | | |
| 61 | leal | 8+G1(%ebp), %eax |
| 62 | subl | g1, %eax |
| 63 | movl | (%eax), %eax |
| 64 | cmpl | $1, %eax |
| 65 | jg | .L96 |
| 66 | jmp | .L98 |
| 67 | | |
| 68 .L96: | | |
| 69 | movl | -4(%ebp), %eax |
| 70 | imul | 8(%ebp), %eax |
| 71 | movl | %eax, -4(%ebp) |
| 72 | subl | $1, 8(%ebp) |
| 73 | jmp | .L94 |
| 74 | | |
| 75 .L98: | | |
| 76 | leal | -4(%esp), %esp |
| 77 | movl | -4(%ebp), %eax |
| 78 | movl | %eax, (%esp) |
| 79 | leal | -4(%esp), %esp |
| 80 | movl | $str2, (%esp) |
| 81 | leal | -4(%esp), %esp |
| 82 | movl | $next3, (%esp) |
| 83 | jmp | printf |
| 84 | | |
| 85 next3: | | |
| 86 | addl | $8, %esp |
| 87 | movl | %ebp, %esp |
| 88 | movl | (%esp), %ebp |
| 89 | leal | 4(%esp), %esp |
| 90 | leal | 4(%esp), %esp |
| 91 | jmp | *-4(%esp) |
| 92 | | |

FIG. 7B

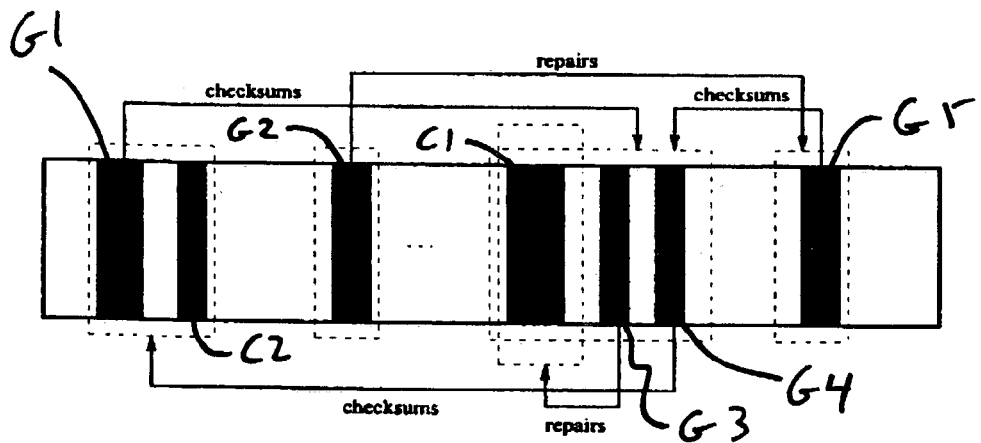
(a) Memory layout of the guarded program
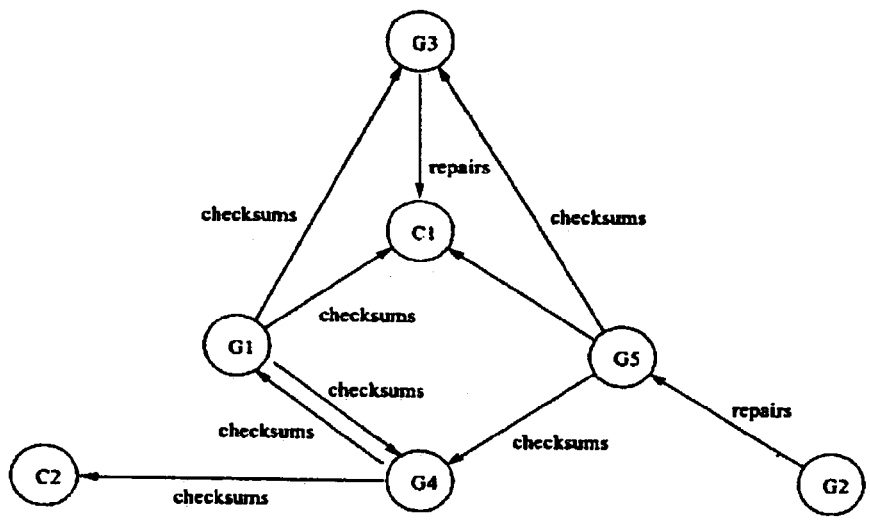
(b) The corresponding guard graph
FIG. 9G

```
1    main:
2           movl     $38, g2                    // g2=38               <38>
3           movl     $main_2+30, %eax
4           subl     g2, %eax
5           movl     %eax, g3                   // g3=main_2+30-g2     <main_2-8>
6           jmp      main_1
7           // g2=<32>, g3=<main_2-8>
8    main_1:
9    pr_fact:
10          leal     -4(%esp), %esp
11          subl     $30, g2                    // g2=g2-30            <8,4>
12          movl     %ebp, (%esp)
13          movl     g2, %ebp
14          addl     %ebp, g3                   // g3=g3+g2            <main_2,pr_fact_1>
15          movl     %esp, %ebp
16          subl     g2, %esp
17          movl     g3, %eax
18          jmp      *%eax
19          // g1=<,?> g2=<8,4>, g3=<main_2,pr_fact_1>
20   main_2:
21          addl     $26, g2                    // g2=g2+26            <34>
22          leal     -8(%ebp), %eax
23          leal     -4(%esp), %esp
24          movl     %eax, (%esp)
25          leal     -4(%esp), %esp
26          movl     $str1, (%esp)
27          leal     -4(%esp), %esp
28          movl     $next1, (%esp)
29          jmp      scanf
30          // g2=<34>
31   next1:  // client start
32          addl     $8, %esp
33          leal     -4(%esp), %esp
34          movl     $pr_fact_1-38, %eax
35          addl     g2, %eax
36          movl     %eax, g3                   // g3=g2+pr_fact_1-38  <pr_fact_1-4>
37          movl     -8(%ebp), %eax
38          movl     %eax, (%esp)
39          leal     -4(%esp), %esp
40          movl     $next2, (%esp)
41          jmp      pr_fact
42          // g2=<34>, g3=<pr_fact_1-4>
43   end1:   // client end
44   next2:
45          addl     $4, %esp
46          movl     %ebp, %esp
47          movl     (%esp), %ebp
48          leal     4(%esp), %esp
49          leal     4(%esp), %esp
50          j,mp     *-4(%esp)
51   pr_fact_1:    // guard installation site
52          movl     $100, g1
53          movl     $next1, %ea:
54          jmp      guard1_1
55          // g1=<?>
56   guard1_1:
```

FIG. 13A

| | | | |
|---|---|---|---|
| 57 | | cmpl | $end1, %eax |
| 58 | | jg | guard1_2 |
| 59 | | jmp | guard1_3 |
| 60 | | // g1=<?> | |
| 61 | guard1_3: | | |
| 62 | | movl | g1, %ecx |
| 63 | | addl | (%eax), %ecx |
| 64 | | movl | %ecx, g1 |
| 65 | | addl | $3, %eax |
| 66 | | jmp | guard1_1 |
| 67 | | // g1=<?> | |
| 68 | guard1_2: | | |
| 69 | | // end of checksumming: (g1, G1) | | // g1=<G1> |
| 70 | | movl | $-G1+1, %eax |
| 71 | | addl | g1, %eax |
| 72 | | movl | %eax, -4(%ebp) |
| 73 | | jmp | .L94 |
| 74 | | // g1=<G1> | |
| 75 | .L94: | | |
| 76 | | leal | 8+G1(%ebp), %eax |
| 77 | | subl | g1, %eax |
| 78 | | movl | (%eax), %eax |
| 79 | | cmpl | $1, %eax |
| 80 | | jg | .L96 |
| 81 | | jmp | .L98 |
| 82 | | // g1=<G1> | |
| 83 | .L96: | | |
| 84 | | movl | -4(%ebp), %eax |
| 85 | | imul | 8(%ebp), %eax |
| 86 | | movl | %eax, -4(%ebp) |
| 87 | | subl | $1, 8(%ebp) |
| 88 | | jmp | .L94 |
| 89 | .L98: | | |
| 90 | | leal | -4(%esp), %esp |
| 91 | | movl | -4(%ebp), %eax |
| 92 | | movl | %eax, (%esp) |
| 93 | | leal | -4(%esp), %esp |
| 94 | | movl | $str2, (%esp) |
| 95 | | leal | -4(%esp), %esp |
| 96 | | movl | $next3, (%esp) |
| 97 | | jmp | printf |
| 98 | next3: | | |
| 99 | | addl | $8, %esp |
| 100 | | movl | %ebp, %esp |
| 101 | | movl | (%esp), %ebp |
| 102 | | leal | 4(%esp), %esp |
| 103 | | leal | 4(%esp), %esp |
| 104 | | jmp | *-4(%esp) |
| 105 | | | |

FIG. 13B

```
1   main:
2           movl    $38, g2                         // g2=38                        <38>
3           movl    $scanf-1000, g5                 // g5=scanf-1000                <scanf-1000>
4           movl    $main_2+30, %eax
5           subl    g1, %eax
6           movl    %eax, g3                        // g3=main_2+30-g2              <main_2-8>
7           jmp     main_1
8           // g2=<38>, g3=<main_2-8>, g5=<scanf-1000>
9   main_1:
10  pr_fact:
11          leal    -4(%esp), %esp
12          subl    $30, g1                         // g2=g2-30                     <8,4>
13          movl    %ebp, (%esp)
14          movl    g2, %ebp
15          addl    %ebp, g3                        // g3=g3+g2                     <main_2,pr_fact_1>
16          movl    %esp, %ebp
17          subl    g2, %esp
18          movl    $1000, %eax
19          addl    g5, %eax
20          movl    %eax, g4                        // g4=g5+1000                   <scanf>
21          movl    g3, %eax
22          jmp     *%eax
23          // g1=<,?> g2=<8,4>, g3=<main_2,pr_fact_1.,  g4=<scanf,>
24  main_2:
25          addl    $26, g2                         // g2=g2+26                     <34>
26          movl    $next1-794320, %eax
27          addl    g2, %eax
28          movl    %eax, g1                        // g1=g2+next1-794320           <next1-794286>
29          leal    -8(%ebp), %eax
30          leal    -4(%esp), %esp
31          movl    %eax, (%esp)
32          leal    -4(%esp), %esp
33          movl    $str1, (%esp)
34          jmp     main_2_1
35          // g1=<next1-794286>, g2=<34>, g4=<scanf>
36  next1:  // client start
37          addl    $8, %esp
38          leal    -4(%esp), %esp
39          movl    $pr_fact_1-38, %eax
40          addl    g2, %eax
41          movl    %eax, g3                        // g3=g2+pr_fact_1-38           <pr_fact_1-4>
42          addl    $next2-794286-next1, g1         // g1=g1+next2-794286-next1     <next2-794286>
43          movl    $pr_fact, g4                    // g4=pr_fact                   <pr_fact>
44          movl    -8(%ebp), %eax
45          movl    %eax, (%esp)
46          jmp     next1_1
47          // g1=<next2-794286>, g2=<34>, g3=<pr_fact_1-4>, g4=<pr_fact>
48  next1_1:
49  main_2_1:
50  .L98_1:
51          leal    -4(%esp), %esp
52          addl    $794286, g1                     // g1=g1+794286                 <next1>
53          movl    g1, %eax
54          movl    %eax, (%esp)
55          movl    g4, %eax
56          jmp     *%eax
```

FIG. 14A

```
57              // g1=<next2,next1,next3>, g2=<34,34,>, g3=<pr_fact_1-4,,>,
58              // g4=<pr_fact,scanf,printf>, g5=<?>
59    end1:     // client end
60    next2:
61              addl      $4, %esp
62              movl      %ebp, %esp
63              movl      (%esp), %ebp
64              leal      4(%esp), %esp
65              leal      4(%esp), %esp
66              jmp       *-4(%esp)
67    pr_fact_1:  // guard installation site
68              movl      $100, g1                    //                            <?>
69              movl      $next1, %eax
70              jmp       guard1_1
71              // g1=<?>
72    guard1_1:
73              cmpl      $end1, %eax
74              jg        guard1_2
75              jmp       guard1_3
76              // g1=<?>
77    guard1_3:
78              movl      g1, %ecx
79              addl      (%eax), %ecx
80              movl      %ecx, g1
81              addl      $3, %eax
82              jmp       guard1_1
83              // g1=<?>
84    guard1_2:
85              // end of checksumming: (g1,G1)
86              movl      $printf-G1, %eax
87              addl      g1, %eax
88              movl      %eax, g4            // g4=g1+printf-G1
89              movl      $-G1+1, %eax
90              addl      g1, %eax
91              movl      %eax, -4(%ebp)
92              jmp       .L94
93              // g1=<g1>, g4=<printf>
94    .L94:
95              leal      8+G1(%ebp), %eax
96              subl      g1, %eax
97              movl      (%eax), %eax
98              cmpl      $1, %eax
99              jg        .L96
100             jmp       .L98
101             // g1=<g1>, g4=<printf>
102   .L96
103             movl      -4(%ebp), %eax
104             imul      8(%ebp), %eax
105             movl      %eax, -4(%ebp)
106             subl      $1, 8(%ebp)
107             jmp       .L94
108             // g4=<printf>
109   .L98:
110             addl      $-G1+next3-794286, g1    // g1=g1-G1+next3-794286   <next3-794286>
111             leal      -4(%esp), %esp
112             movl      -4(%ebp), %eax
```

FIG. 14B

| | | |
|---|---|---|
| 113 | movl | %eax, (%esp) |
| 114 | leal | -4(%esp), %esp |
| 115 | movl | $str2, (%esp) |
| 116 | jmp | .L98_1 |
| 117 | // g1=<next3-794286>, g4=<printf> | |
| 118 | next3: | |
| 119 | addl | $8, %esp |
| 120 | movl | %ebp, %esp |
| 121 | movl | (%esp), %ebp |
| 122 | leal | 4(%esp), %esp |
| 123 | leal | 4(%esp), %esp |
| 124 | jmp | *-4(%esp) |
| 125 | | |

FIG. 14C

Procedure precompute (variable v, link-nodes {x_1,...,x_n},
                                constants {c_1,...,c_n})

Set live(v,x_i) = TRUE and value(v,x_i) = c_i for all i = 1,...,n;

While (there is a link-node x and a variable v such that
        value(v,x) is defined but done(v,x)==FALSE)

Let X = {x_1,...,x_n} be the entire set of link-nodes in the
            same basic block, say B, that contains x;
        Let t be the point within B for inserting evolve( );

If (no evolve( ) has previously been chosen for B)
            Choose a mathematical function evolve(U), where U is a (possibly
                empty) set of (new) global variables, with the following properties:
            (1)    No u in U is reserved (i.e. no u in U that, for some z in pred-
                      links(X), live(u,z)==TRUE but value(u,z) is undefined);
            (2)    For any x_i in X where value(v,x_i) is defined, the common
                      evolve(U) is able to fulfill value(v,x_i) by setting value(u,z)
                      appropriately, for any u in U and z in pred-links(x_i) with
                      unseen(u,z,t)==TRUE;
            (3)    For all x_i in X where value(v,x_i) is undefined, the same
                      evolve(U) is possible to fulfill any desired value for any future
                      definition of value(u,x_i);

End if

If (evolve( ) is newly chosen and is not the trivial identity function)
            Insert code at t of B for computing v=evolve(U);
        End if For (all u in U and z in pred-links(x) where unseen(u,z,t)==TRUE)
            Set live(u,z) = TRUE and value(u,z) equal to some values such that these
            new values, together with other values of U already set along the paths to t
            through z, satisfy value(v,x)==evolve(U);
        End for For (each x_i in X where value(v,x_i) is underfined, and each u in U and z in
        pred-links(x_i) where unseen(u,z,t)==TRUE)
            Set live(u,z) = TRUE;
        End for Set done(v,x) = TRUE;
    End while
End procedure

FIG. 19A

Procedure unseen(variable v, link-node z, program point t)
    If (value(v,z) is undefined, and at the basic block that contains t, v is not defined in the code before t)
        return TRUE;
    Else
        return FALSE;
    End procedure

FIG. 19B

// (a) before change
    . . .
    jmp         .L24

// (b) after change
    . . .
    cmpl        %eax, (%esp)       // args are randomly selected
    jl          .L013              // clone
    jmp         .L24

FIG. 22

| tag | sh f | E(len + sh f) | E(msg + sh f) |

FIG. 24

| High-level instructions | Simpler instructions |
|---|---|
| call     *operand* <br> next:     ... | pushl     $next <br> jmp     *operand* <br> next:     ... |
| ret | leal     4(%esp), %esp <br> jmp     * -4(%esp) |
| enter | pushl     %ebp <br> movl     %esp, %ebp |
| leave | movl     %ebp, %esp <br> popl     %ebp |
| pushl     *operand* | leal     -4(%esp), %esp <br> movl     *operand*, (%esp) |
| popl     *operand* | movl     (%esp), *operand* <br> leal     4(%esp), %esp |

FIG. 27

| Software Program Code | Encrypted customization parameters | Digital signature |

FIG. 28

| *Wrong password* | *After "bypassing" password* |
|---|---|
| password: abc<br>Invalid password! | password: abc<br>n ? 100000<br>next prime = 100001 |
| *Right password* | *After further "corrections"* |
| password: opensesame<br>n ? 100000<br>next prime = 100003 | password: abc<br>n ? 100000<br>Segmentation Fault (core dumped) |

FIG. 29

GUARDS FOR APPLICATION IN SOFTWARE TAMPERPROOFING

This patent application claims the benefit of U.S. Provisional Application No. 60/396,186, filed Jul. 16, 2002; and is a continuation-in-part of U.S. application Ser. No. 09/455,580, filed Dec. 6, 1999 now abandoned, which claims the benefit of U.S. Provisional Application No. 60/152,769, filed Sep. 3, 1999. The disclosure of each above-referenced application is hereby incorporated by reference in its entirety.

BACKGROUND

In the modern software industry, software program vendors suffer huge losses due to the illegal distribution of software programs, a practice known commonly as software piracy. Part of the problem of software piracy is due to the fact that software programs, distributed as electronic files, are vulnerable to modifications by users. Thus, even those software programs that enforce online registrations prior to their legal use as a means of preventing unauthorized use can be modified by a malicious user (a "hacker") to bypass the online registration process. Such compromised software programs can be massively duplicated and distributed, particularly in countries that do not provide the same legal protections to copyright owners as are found under United States law, and also in countries where software program vendors have less control over their products. As a result, software copyright owners lose significant revenue from lost sales and the development of competitive programs based on pirated copies of the copyrighted software.

It is known in the art to embed security mechanisms in the software program code in an attempt to hinder the efforts of hackers. One such mechanism well known in the art is to require the initial user to input a serial number into the software program prior to the initial use of the software program. The software program then will apply this serial number to an embedded algorithm to compute the true serial number of the software program, thereby validating the authenticity of the software program copy. This type of embedded security mechanism and others like it are vulnerable to compromise because such mechanisms often are based entirely on a few machine instructions within the software program. For example, many software programs use only a single instruction, typically a conditional jump, to compare the serial number entered by the initial user with the serial number computed by the software program to determine whether the software program copy is authentic. The use of a single instruction for this important security step provides the hacker with a single point of attack to defeat the security mechanism. To defeat such a mechanism, the hacker merely needs to find the conditional instruction in the code and replace it in the binary file with an unconditional instruction that advances the execution flow of the software program to the desired location, bypassing the serial number comparison step. Another approach employed by hackers to defeat such a security mechanism is to insert a sequence of small null operations that do nothing except advance the execution flow of the software program to the desired location naturally. Either kind of modification allows illegal software program users to freely run the compromised software programs.

There are several more advanced security mechanisms known in the art, but their results and applicability have not been promising to the software industry. One such advanced security mechanism uses special hardware that directly executes an encrypted software program without the software program's underlying binary code ever being disclosed in memory. The details of this method are disclosed in U.S. Pat. No. 4,465,901 to Best. Further disclosure of a similar method is made by White et al. in an article entitled "ABYSS: An Architecture for Software Protection," published in *IEEE Transactions on Software Engineering*, 16(6):619-629, June 1990. While this approach solves the problem, it has a major disadvantage in that encryption keys and special hardware are required for encrypting and executing the software program. Because of the need for encryption keys and special hardware, the result is a security mechanism that is more expensive and provides less user flexibility than a security mechanism which relies entirely on software-based techniques.

Another security mechanism known in the art is the use of code obfuscation, which makes the code difficult for a hacker to understand and analyze. Methods of code obfuscation are disclosed by Collberg et al. in an article entitled, "Breaking Abstractions and Unstructuring Data Structures," published in *IEEE International Conference on Computer Languages, ICCL '98*, Chicago, Ill., USA, May 1998; by Collberg et al. in an article entitled, "A Taxonomy of Obfuscating Transformations," published as Technical Report 148, Department of Computer Science, The University of Auckland, Private Bag 92019, Auckland, New Zealand, 1998; by Bashar et al. in an article entitled, "Low-Threat Security Patches and Tools," published as Technical Report CSD-TR-96-075, Coast TR 97-10, COAST Laboratory, Department of Computer Sciences, Purdue University, 1996; and by Mambo et al. in an article entitled, "A Tentative Approach to Constructing Tamper-Resistant Software," published in *New Security Paradigms Workshop. Proceedings*, pages 23-33, New York, N.Y., USA, 1998. Unfortunately, techniques currently known in the art of code obfuscation still are not adequate to prevent sophisticated software program hackers from identifying and modifying attack targets in the code.

Joepgen et al. disclose in their article entitled, "Software by Means of the 'Protprog' Method, Part II" published in *Elektronik*, 42(17):52-56, August 1993, a security mechanism utilizing "self-modifying code," wherein the software program code generates other code at run-time.

Schulman discloses in his article entitled, "Examining the Windows AARD Detection Code," published in *Dr. Dobb's Journal*, 18(9):42,44-8,89, September 1993, another security mechanism utilizing code encryption and decryption, wherein partially encrypted code self-decrypts at run-time.

Aucsmith discloses in his article entitled, "Tamper Resistant Software: An Implementation," Ross Anderson, editor, published in *Information Hiding—Proceedings of the First International Workshop*, volume 1174 of *LNCS*, pages 317-333, May/June 1996, yet another security mechanism which utilizes a hybrid of the self-modifying code technique and the code encryption/decryption technique. U.S. Pat. No. 5,892,899 to Aucsmith et al. discloses a similar mechanism.

Several disadvantages are present in the prior art security mechanisms. First, the mechanisms which utilize self-modifying and self-decrypting code produce an extra burden on the computing resources at run-time. Second, the Integrity Verification Kernels ("IVK") disclosed by Aucsmith in his article are relatively large segments of code. Because the IVKs must be decrypted during program execution and then subsequently encrypted, the program execution performance degrades. In addition, the design of Aucsmith's IVKs make the IVK concept difficult to apply to larger IVKs. The processing time involved in decrypting and encrypting the larger IVKs may degrade program execution performance to the point where it is intolerable to the end-user. Furthermore, the first cell of each IVK is unencrypted. The large size of the IVKs and the presence of the unencrypted first cell may provide clues to a hacker as to the location of the security mechanism within the code. Third, the security mechanism disclosed by Aucsmith in his article requires special services from the operating system software for proper execution. The resultant interaction between the security mechanism and the operating systems software may direct a hacker to the location of the security mechanism or to sensitive areas of the code. Finally, most prior art security mechanisms produce immediate program execution failures upon tampering. Such immediate failures provide additional clues for hackers as to the location of the security mechanisms or the sensitive areas of the code.

Thus, such prior art software security mechanisms tend to be restricted in their applicability, and they have not been widely adopted by the software industry. It is desired in the software industry to develop a method for protecting a software application program from unauthorized modification which will not require special hardware, self-modifying code, or code encryption and decryption. It is further desired that the method will not require special operating system services and that the method will produce subtle errors rather than immediate program failure.

SUMMARY

An embodiment of the present invention comprises a software-only method for solving the software program security problem. The method of this embodiment utilizes self-protecting code ("SPC"), whereby a software program is armed internally with self-protection mechanisms that may render the software program unusable whenever its protected code is tampered with. The software program's self-protection mechanism is transparent to normal users. If no software program tampering has occurred, the software program executes normally as if it was unprotected. If tampering has occurred, the SPC operates to interrupt normal application software program execution. The SPC may modify the software program instructions or software program data which resides in the computer's random access memory. The modified instructions or data will not become evident until the next time the software program accesses the memory location containing the instructions or data. The end result will be erroneous software program execution such as errors in the results of mathematical algorithms. At its extreme case, the end result may be complete failure of program execution. Alternatively, the SPC may be designed to operate in a less transparent manner. It may operate to halt program execution immediately, or may cause a message to be sent to the user's computer terminal or printer, or may caused a message to be stored in computer memory for future use by the software program. The method may utilize, but does not require, cryptographic techniques.

An embodiment of the present invention comprises a system that may comprise a computer program which receives as input at least one assembly language software program, object code software program, or binary executable software program to be protected, a set of optional watermarks to be embedded into the assembly language software programs, a set of object files or libraries with which the set of assembly language software programs will be linked, and the customization parameters required by method of the present invention. The output of the system will be a binary executable software program with embedded SPC. The system of the present invention may comprise part of a standard compiler for use with a high-level computer programming language. In an embodiment, the operation of the system is automatic.

In an embodiment, the present invention comprises a method for adding tamper resistance to a software program, the method comprising the step of installing a plurality of guards in a software program, each of the plurality of guards comprising at least one program instruction, wherein each of the plurality of guards is operable to verify the integrity of at least one program instruction of at least one other of the plurality of guards, and wherein the integrity of at least one program instruction of each of the plurality of guards is verified by at least one other of the plurality of guards. In an aspect of this embodiment, the method further comprises the step of generating an executable version of the software program having the plurality of guards installed therein, so that the program instructions of the plurality of guards are executed by running the executable version of the software program.

In an embodiment, the present invention comprises a method for adding tamper resistance to a software program, the method comprising the steps of storing a first integer a in the software program; storing a multiplicative product pq of a second integer p and a third integer q in the software program; identifying a code block in the software program, the code block comprising at least one program instruction of at least one other of the plurality of guards; computing a value C for the code block, the value C being computed in a manner that makes it likely that the value C would change if the code block is modified; computing a multiplicative inverse C', the multiplicative inverse C' satisfying the following: C'*C modulo(p−1)(q−1)=1; computing a constant R according to the following: $R=a^{C'}$ modulo pq; and storing the constant R in the software program. In an aspect of this embodiment, the method further comprises the steps of running the software program, thereby causing the program instructions of the plurality of guards to be executed; and for at least one code block in the software program, while the software program is running, computing a value X for the at least one code block, the value X being computed in the same manner as was the value C for the at least one code block, and taking a defensive action if: $R^X$ modulo pq≠a.

In an embodiment, the present invention comprises a method for adding tamper resistance to a software program, the method comprising the steps of selecting an asymmetric encryption key pair comprising a public key and a private key; storing the public key in the software program; identifying a code block in the software program, the code block comprising at least one program instruction of at least one other of the plurality of guards; calculating a baseline value for the code block, the baseline value being computed in a manner that makes it likely that the value would change if the code block is modified; encrypting the baseline value using the private key; and storing the encrypted baseline value in the software program. In an aspect of this embodiment, the method further comprises the steps of running the software program, thereby causing the program instructions of the plurality of guards to be executed; and for at least one code block in the software program, while the software program is running, computing a runtime value of the at least one code block, the runtime value being computed in the same manner as was the baseline for the at least one code block, decrypting the baseline value using the public key, and taking a defensive action if the decrypted baseline value is not the same as the runtime value.

In an embodiment, the present invention comprises a method for producing tamper resistant copies of a software program, the method comprising the steps of installing a first watermark in a first copy of a software program; installing a second watermark in a second copy of a software program; installing a watermark guard in the first copy of a software program, the watermark guard comprising at least one program instruction, the watermark guard being operable to verify the integrity of the first watermark; and installing the watermark guard in the second copy of the software program, the watermark guard being operable to verify the integrity of the second watermark, wherein the watermark guard is installed in the same location in the second copy of the software program as in the first copy of the software program. In an aspect this embodiment, the method further comprises the step of installing at least one other guard in the first copy of the software program and the second copy of the software program, each of the at least one other guards comprising at least one program instruction, wherein at least one of the at least one other guards is operable to verify the integrity of at least one program instruction of the watermark guard, wherein each the at least one other guard is the same in, and is installed in the same location in, the first copy of the software program and the second copy of the software program.

In an embodiment, the present invention comprises a method for producing a plurality of tamper resistant copies of a software program, the method comprising the steps of storing a first integer V in all of the plurality of copies of the software program; storing a multiplicative product pq of a second integer p and a third integer q in all of the plurality of copies of the software program; storing a one-way function H( ) in all of the plurality of copies of the software program; and for each of the plurality of copies of the software program, storing a watermark W in the copy of the software program, generating H(W) comprising a result of executing one-way function H( ) with watermark W comprising an input argument thereto, computing a multiplicative inverse W' satisfying the following: W'*H(W) modulo $(p-1)(q-1)=1$, computing a constant Q according to the following: $Q=V^{W'}$ modulo pq, and storing the constant Q in the copy of the software program. In an aspect this embodiment, the method further comprises, for at least one of the plurality of copies of the software program, the steps of running the at least one of the plurality of copies of the software program; and taking a defensive action if: $Q^{H(W)}$ modulo pq≠V.

In an embodiment, the present invention comprises a method for producing a plurality of tamper resistant copies of a software programs, the method comprising the steps of selecting an asymmetric encryption key pair comprising a public key and a private key; storing the public key in the software program in all of the plurality of copies of the software program; storing a one-way function in all of the plurality of copies of the software program; and for each of the plurality of copies of the software program, storing a watermark in the copy of the software program, generating a baseline value comprising the result of executing the one-way function with the watermark comprising an input argument thereto, encrypting the baseline value with the private key, and storing the encrypted baseline value in the software program. In an aspect of this embodiment, the method further comprises, for at least one of the plurality of copies of the software program, the steps of running the at least one of the plurality of copies of the software program; while the executable version is running, generating a runtime value comprising the result of executing the one-way function with the watermark comprising an input argument thereto; decrypting the baseline value; and taking a defensive action if the runtime value differs from the decrypted baseline value.

In an embodiment, the present invention comprises a method for producing a software program comprising mutually reliant program parameters, the method comprising the steps of storing a first integer V in a software program; storing a multiplicative product pq of a second integer p and a third integer q in the software program; storing a one-way function H( ) in the software program; storing one or more program parameters in the software program; generating baseline constant U comprising two or more of the program parameters; generating baseline value J, the baseline value J comprising a result of executing one-way function H( ) with baseline constant U comprising an input argument thereto; computing a multiplicative inverse U' satisfying the following: U'*J modulo$(p-1)(q-1)=1$; computing a constant Q according to the following: $Q=V^{U'}$ modulo pq; and storing the constant Q in the software program. In an aspect of this embodiment, the method further comprises the steps of running the software program; while the software program is running, generating runtime constant U comprising two or more of the program parameters; generating runtime value K, the runtime value K comprising a result of executing one-way function H( ) with runtime constant U comprising an input argument thereto; and taking a defensive action if $Q^K$ modulo pq≠V.

In an embodiment, the present invention comprises a method for producing a software program comprising mutually reliant program parameters, the method comprising the steps of selecting an asymmetric encryption key pair comprising a public key and a private key; storing one or more program parameters in the software program; storing the public key in the software program; generating baseline constant U comprising two or more of the program parameters; generating baseline value J, the baseline value J comprising a result of executing one-way function H( ) with baseline constant U comprising an input argument thereto; encrypting the baseline value J with the private key; and storing the encrypted baseline value J in the software program. In an aspect of this embodiment, the method further comprises the steps of running the software program; while the software program is running, generating runtime constant U comprising two or more of the program parameters; generating runtime value K, the runtime value K comprising a result of executing one-way function H( ) with runtime constant U comprising an input argument thereto; decrypting the baseline value J; and taking a defensive action if the runtime value K differs from the decrypted baseline value J.

In an embodiment, the present invention comprises a method for producing a plurality of tamper resistant copies of a software program wherein each copy of the software program comprises mutually reliant program parameters, the method comprising the steps of installing two or more program parameters in a first copy of a software program; generating a first value comprising the two or more program parameters installed in the first copy of the software program, the first value being likely to change if one or more of the program parameters installed in the first copy of the software program is changed; storing the first value in the first copy of the software program; installing two or more program parameters in a second copy of a software program; generating a second value comprising the two or more program parameters installed in the second copy of the software program, the second value being likely to change if one or more of the program parameters installed in the second copy of the software program is changed; storing the second value in the second copy of the software program; installing a program parameter guard in the first copy of a software program, the program parameter guard comprising at least one program instruction, the program parameter guard being operable to verify the integrity of the first value; and installing the program parameter guard in the second copy of the software program, the program parameter guard being operable to verify the integrity of the second value, wherein the program parameter guard is installed in the same location in the second copy of the software program as in the first copy of the software program.

In an embodiment, the present invention comprises a method for adding tamper resistance to a software program, the method comprising the steps of identifying a first code block in a software program; creating a second code block, the second code block comprising a copy of the first code block; disguising the second code block; and installing at least one repair guard in the software program, each of the at least one repair guards comprising at least one program instruction. In an aspect of this embodiment, the method further comprises the steps of executing the at least one program instruction of at least one of the at least one repair guards; undisguising the second code block; and overwriting the first client code block with the undisguised second code block copy.

In an embodiment, the present invention comprises method for adding tamper resistance to a software program, the method comprising the steps of installing a plurality of guards in a software program, each of the plurality of guards comprising at least one guard program instruction; and installing guard selection program instructions in the software program, the guard selection program instructions being operable to alter the control flow of the software program. In an aspect of this embodiment, the guard selection program instructions, when executed during running of the software program, alter the control flow of the software program by causing the execution of one or more of the guard program instructions to be skipped. In an aspect of this embodiment, wherein one or more of the guard program instructions ordinarily would not be executed when running the software program, the guard selection program instructions, when executed during running of the software program, alter the control flow of the software program by causing at least one of the one or more of the guard program instructions to be executed.

In an embodiment, the present invention comprises a method for adding tamper resistance to a software program, the method comprising the steps of installing two or more repair guards in a software program, each the repair guard comprising one or more program instruction that, when executed during running of the software program, are operable to overwrite one or more program instructions of the software program with properly functioning program instructions; installing guard selection program instructions in the software program, the guard selection program instructions, when executed during the running of the software program, causing one or more of the repair guards to be executed.

In an embodiment, the present invention comprises a recordable computer readable media having a tamper resistant software program recorded thereon, comprising a plurality of guards installed in a software program, each of the plurality of guards comprising at least one program instruction, wherein each of the plurality of guards is operable to verify the integrity of at least one program instruction of at least one other of the plurality of guards, and wherein the integrity of at least one program instruction of each of the plurality of guards is verified by at least one other of the plurality of guards.

In an embodiment, the present invention a plurality of copies of a recordable computer readable media having a tamper resistant software program thereon, comprising a first watermark installed in a first copy of a software program recorded on a first copy of a recordable computer readable media; a second watermark installed in a second copy of the software program recorded on a second copy of the recordable computer readable media; a watermark guard installed in the first copy of the software program, the watermark guard comprising at least one program instruction, the watermark guard being operable to verify the integrity of the first watermark; and the watermark guard installed in the second copy of the software program, the watermark guard being operable to verify the integrity of the second watermark, wherein the watermark guard is installed in the same location in the second copy of the software program as in the first copy of the software program.

In an embodiment, the present invention a plurality of copies of a recordable computer readable media having a tamper resistant software program thereon, comprising two or more program parameters installed in a first copy of a software program recorded on a first copy of a recordable computer readable media; a first value installed in the first copy of the software program, the first value comprising the two or more program parameters; two or more program parameters installed in a second copy of the software program recorded on a second copy of the recordable computer readable media; a second value installed in the second copy of the software program, the second value comprising the two or more program parameters; a program parameter guard installed in the first copy of a software program, the program parameter guard comprising at least one program instruction, the program parameter guard being operable to verify the integrity of the first value; and the program parameter guard installed in the second copy of the software program, the program parameter guard being operable to verify the integrity of the second value, wherein the program parameter guard installed in the same location in, the second copy of the software program as in the first copy of the software program.

In an embodiment, the present invention comprises a recordable computer readable media having a tamper resistant software program recorded thereon, comprising a first code block in a software program; a second code block in the software program, the second code block comprising a disguised copy of the first code block; and at least one repair guard installed in the software program, at least one of the at least one repair guards comprising one or more program instructions operable when executed to automatically undisguised the second code block and overwrite the first code block with the undisguised second code block.

In an embodiment, the present invention comprises a recordable computer readable media having a tamper resistant software program recorded thereon, comprising a plurality of guards, each of the plurality of guards comprising at least one guard program instruction; and guard selection program instructions, the guard selection program instructions being operable to alter the control flow of the software program. In an aspect of this embodiment, the guard selection program instructions are operable to alter the control flow of the software program by causing the execution of one or more of the guard program instructions to be skipped. In an aspect of this embodiment, the guard selection program instructions are operable to alter the control flow of the software program by causing the execution of at least one of the one or more of the guard program instructions that otherwise would be skipped.

In an embodiment, the present invention comprises a method for adding tamper resistance to a software program, the software program comprising a first software program variable and a second software program variable, wherein the first software program variable does not depend on the second software program variable, the method comprising the step of installing at least one guard in the software program, the at least one guard linking the first software program variable and the second software program variable so that an unauthorized change to the first software program variable changes the second software program variable.

In an embodiment, the present invention comprises a method for adding tamper resistance to a software program, the software program comprising a first code block and a second code block, wherein the first code block functions independently of the second code block, the method comprising the step of installing at least one guard in the software program, the at least one guard causing functioning of the second code block to depend on proper functioning of the first code block so that an unauthorized change to the first code block changes the functioning of the second code block.

In an embodiment, the present invention comprises a recordable computer readable media having a computer program for adding tamper resistant features to a software program recorded thereon, comprising program instructions operable to install a plurality of guards in the software program, each of the plurality of guards comprising at least one guard program instruction, wherein each of the plurality of guards is operable to verify the integrity of at least one guard program instruction of at least one other of the plurality of guards, and wherein the integrity of at least one guard program instruction of each of the plurality of guards is verified by at least one other of the plurality of guards; and program instructions operable to generate an executable version of the software program having the plurality of guards installed therein.

In an embodiment, the present invention comprises a recordable computer readable media having a computer program for adding tamper resistant features to a software program recorded thereon, comprising program instructions operable to install a first watermark in a first copy of a software program; program instructions operable to install a second watermark in a second copy of a software program; program instructions operable to install a watermark guard in the first copy of a software program, the watermark guard comprising at least one guard program instruction, the watermark guard being operable to verify the integrity of the first watermark; and program instructions operable to install the watermark guard in the second copy of the software program, the watermark guard being operable to verify the integrity of the second watermark.

In an embodiment, the present invention comprises a recordable computer readable media having a computer program for adding tamper resistant features to a software program recorded thereon, comprising program instructions operable to install two or more program parameters in a first copy of a software program; program instructions operable to generate a first value comprising the two or more program parameters installed in the first copy of the software program, the first value being likely to change if one or more of the program parameters installed in the first copy of the software program is changed; program instructions operable to store the first value in the first copy of the software program; program instructions operable to install two or more program parameters in a second copy of a software program; program instructions operable to generate a second value comprising the two or more program parameters installed in the second copy of the software program, the second value being likely to change if one or more of the program parameters installed in the second copy of the software program is changed; program instructions operable to store the second value in the second copy of the software program; program instructions operable to install a program parameter guard in the first copy of a software program, the program parameter guard comprising at least one guard program instruction, the program parameter guard being operable to verify the integrity of the first value; and program instructions operable to install the program parameter guard in the second copy of the software program, the program parameter guard being operable to verify the integrity of the second value, wherein the program parameter guard is installed in the same location in the second copy of the software program as in the first copy of the software program.

In an embodiment, the present invention comprises a recordable computer readable media having a computer program for adding tamper resistant features to a software program recorded thereon, comprising program instructions operable to identify a first code block in a software program; program instructions operable to create a second code block, the second code block comprising a copy of the first code block; program instructions operable to disguise the second code block; and program instructions operable to install at least one repair guard in the software program, each of the at least one repair guards comprising at least one guard program instruction.

BRIEF DESCRIPTION OF THE DRAWINGS

The features and advantages of this invention, and the manner of attaining them, will be more apparent and better understood by reference to the following descriptions of embodiments of the invention, taken in conjunction with the accompanying drawings, wherein:

FIG. 3 shows two examples of checksumming templates according to the present invention.

FIG. 4 shows an example of expression rewriting to incorporate conditional identities according to the present invention.

FIGS. 6A-B show an example of assembly language code which computes and prints the factorial of a positive integer.

FIGS. 7A-B shows the assembly language code of FIGS. 6A-B with a checksumming guard installed according to the present invention at the site identified in FIGS. 7A-B.

FIGS. 13A-B shows the sample assembly language code of FIGS. 6A-B after its code has completed the first phase of code merging according to CFG merging assembly language software code disguising technique of the present invention.

FIGS. 14A-C shows the sample assembly language code from FIGS. 13A-B after the second phase of code merging according to the CFG merging assembly language software code disguising technique of the present invention.

FIGS. 19A-B show an algorithm for performing data precomputation according to the present invention.

FIG. 22 shows an example of a randomized jump-based decision based on two variables after the process of CFG cloning according to the present invention has been performed.

FIG. 24 shows the process of encoding a watermark message into a sequence of byte strings according to the present invention.

FIG. 27 shows a table illustrating several examples according to the present invention where high-level semantics shown in the left column of the table are replaced by groups of simpler instructions with the same semantics shown in the right column.

FIG. 28 shows a conceptual diagram illustrating the attachment of a digital signature and encrypted customization parameters to the end of an application software program file according to the present invention.

FIG. 29 shows a table illustrating the actions of a self-protecting software program of the present invention which produces incorrect results whenever its code is altered, even on inserting a single null instruction into the code.

DESCRIPTION

Figure 1A:
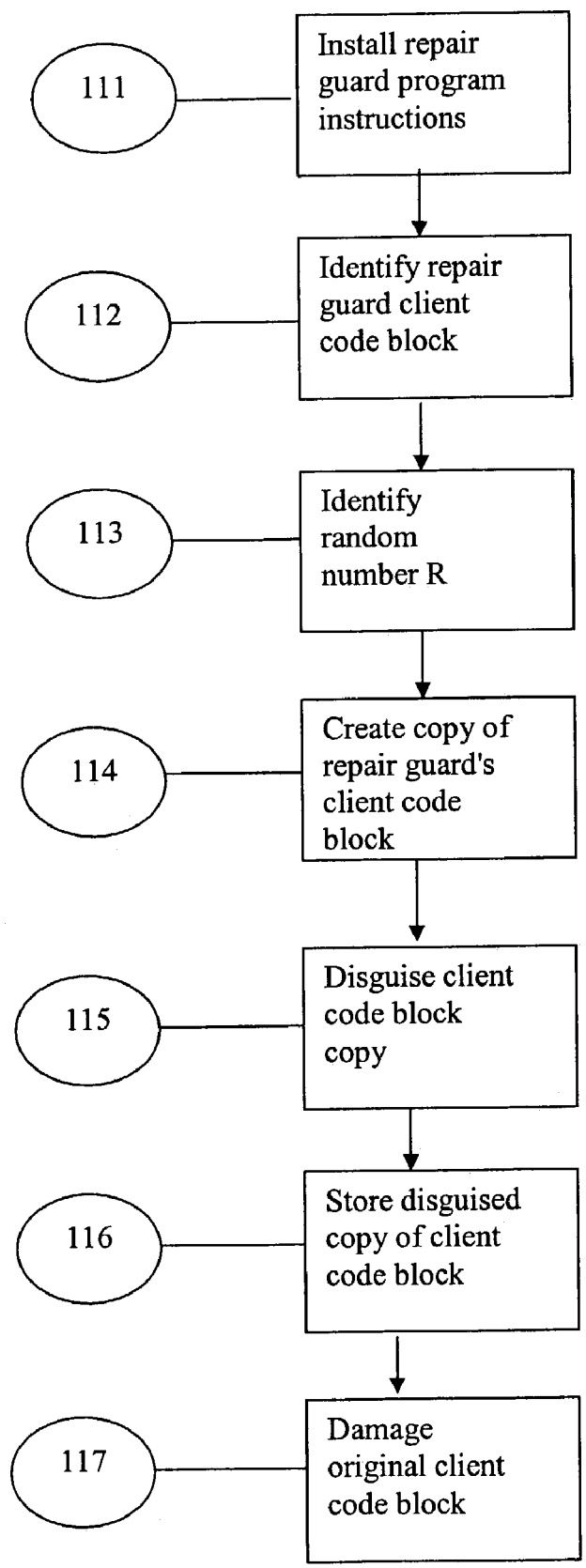
FIG. 1A shows a flow chart illustrating a process for installing a repair guard according to the present invention.

The present invention comprises a software-only method for solving the problem of unauthorized modification of software program code, and a system for practicing the method. The method utilizes self-protecting code, whereby the protected application software programs are armed with internal self-protection mechanisms that may render the application software program unusable if a predetermined portion of the application software program code is tampered with. The present invention may utilize, but does not require, cryptographic techniques. In an embodiment, the operation of the system of the present invention is automatic.

In an embodiment of the present invention, an "application software program" is one that is executed by an operating system, and is portable in the sense that source code for an application software program may be compiled by techniques well known in the art into one of many different assembly languages for use with one of many different microprocessors and one of many different operating systems. An application software program may be multi-threaded. In an embodiment, the present invention is adapted to guard an application software program comprising an operating system program.

As used in the specification and the claims, a "guard" is a portion of software code of an application software program that makes the software code of the application software program less susceptible to tampering. A guard comprises at least one program instruction. A program instruction comprises at least one byte sequence.

A "code block" of an application software program is a portion of the application software program containing any byte sequence, but is less than the entire application software program. The same byte sequence may comprise one or more code blocks of an application software program. Often, a code block to be protected by a guard, called a "client code block," may be an entire function or named procedure, although a client code block could be smaller than a single instruction. A guard may have more than one client code block.

In a first embodiment, a guard according to the present invention comprises a "repair guard." A repair guard is operable to repair application software program code at run-time. A repair guard according to the present invention may be implemented according to one of two embodiments. In a first embodiment, a predetermined segment of application software program code is intentionally damaged. The first embodiment of the repair guard is operable to overwrite the damaged code at run-time. If the repair guard is defeated, the intentionally damaged code remains in the application software program. Thus, the application software program will not operate correctly.

In a second embodiment of a repair guard according to the present invention, the application software program code is not intentionally damaged. Instead, vulnerable portions of the application software program are identified. It is anticipated that a hacker may try to alter the vulnerable portions of the application software program code. The repair guard is operable to overwrite these vulnerable portions of the application software program code at run-time. Accordingly, the hacker's efforts are frustrated when the altered portions of the application software program code is overwritten by the repair guard.

Referring now to FIG. 1A, there is shown a flow chart illustrating a process for installing a repair guard according to the present invention. Beginning with a working application software program, in the step shown as block 111 of FIG. 1A program instructions comprising a repair guard are installed in the application software program. Next, in the step shown as block 112 of FIG. 1A, a client code block for the repair guard is identified. The client code block of a repair guard according to the present invention comprises one or more program instructions of the application software program. In the step shown as block 113 of FIG. 1A, a random number R is identified. Next, in the step shown as block 114 of FIG. 1A, a copy of the repair guard's client code block is made. In the step shown as block 115 of FIG. 1A, the client code block copy (called a "repair code block") is disguised. In one embodiment of a repair guard according to the present invention, the repair code block is disguised by performing a bitwise XOR operation between the repair code block and random number R. In other embodiments the repair code block may be disguised by encryption or by another technique that can later be reversed to undisguise the repair code block, as discussed hereinafter. Next, in the step shown as block 116 of FIG. 1A, the disguised repair code block is stored in the application software program. In one embodiment of a repair guard according to the present invention, the disguised repair code block is stored such that at run-time it appears to be program data for the application software program. Finally, in the step shown as block 117 of FIG. 1A, the original client code block remaining in the application software program is intentionally damaged. Preferably, the client code block is damaged to the extent that the application software program is inoperable unless the code is repaired.

The following shows exemplary assembly language code of a sample repair guard that, when executed, repairs its client code block located at memory range [clientAddr, clientAddr+clientLen] to its original form. The repair code block has been disguised by an XOR operation and is stored in the memory area designated as "copy." As discussed hereinafter certain parameters in a guard template (such as the "clientAddr," "clientLen," and "mask" shown in this example) are initialized to predetermined values when the guard is instantiated. Thus, the same guard template can be parameterized differently for different guard instantiations. The code below is written in a publicly available NASM (Netwide Assembler) syntax for Intel 32-bit architectures.

```
Sample repair guard:
    BITS 32
    SECTION .text
    Extern clientAddr, clientLen, mask
    ;       for (ebx = 0 to clientLen-4 step 4)
    ;              *(clientAddr+ebx) = *(copy+ebx) xor mask
    guard:
        push    eax
        push    ebx
        mov     ebx, 0
L1:
        cmp     ebx, clientLen - 4
        jg      end
        mov     eax, dword[copy+ebx]
        xor     eax, mask      ; unmask the masked copy
        mov     [clientAddr+ebx], eax
        lea     ebx, [ebx+4]
        jmp     L1
    end:
        pop     ebx
        pop     eax
        SECTION .data
    copy resb   100    ; stores the masked copy of client code
```

Figure 1B:
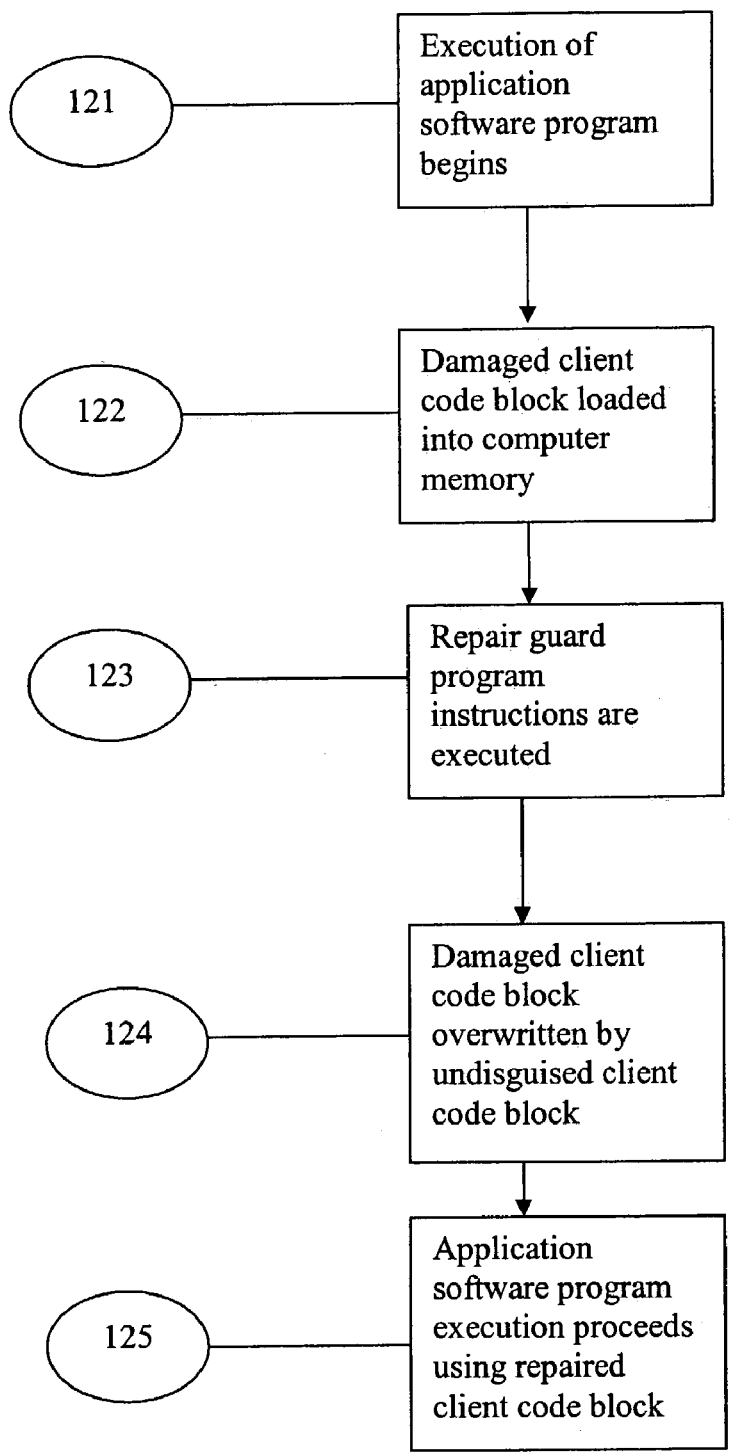
FIG. 1B shows a flow chart illustrating the operation of an embodiment of a repair guard according to the present invention.

Referring now to FIG. 1B, there is shown a flow chart illustrating the operation of an implementation of the first embodiment of a repair guard according to the present invention. In the step shown as block 121 of FIG. 1B, execution of the application software program begins. Next, in the step shown as block 122, the damaged client code block is loaded into computer memory.

Program execution continues until, in the step shown as block 123 of FIG. 1B, the program instructions comprising the repair guard are executed. During execution of the repair guard's program instructions, the disguised repair code block is retrieved. Then, the disguised repair code block is undisguised in this embodiment of the present invention by performing a bitwise XOR operation with the repair code block and random number R. It is known that performing a bitwise XOR operation between two instances of the same vector results in a vector of all zeroes. Likewise, performing a bitwise XOR operation between a vector of all zeroes and any other vector V results in vector V. Accordingly, because the repair code block was disguised using a bitwise XOR operation between the repair code block and random number R, a second bitwise XOR operation "cancels" the random number R and reveals the repair code block. If encryption or another disguise technique was used in disguising the repair code block, the repair code block is undisguised in this step by applying the reverse of that disguise technique (e.g., decryption).

Next, in the step shown as block 124 of FIG. 1B, the damaged client code block is overwritten in computer memory by the undisguised repair code block. Finally, in the step shown as block 125, execution of the application software program proceeds using the undisguised repair code block.

The operation of the second embodiment of a repair guard according to the present invention is substantially the same as the flow chart shown in FIG. 1B. The difference between the operation of the first and the second embodiments is that the client code block in the second embodiment is not necessarily damaged before it is overwritten.

An extreme form of a repair guard is a guard called a "code-writing" guard. A code-writing guard according to the present invention rewrites large fragments of the application software program at run-time.

A second embodiment of a guard according to the present invention comprises a "silent guard." A silent guard according to the present invention comprises a portion of software code of an application software program that evaluates the integrity of one or more data items, and takes a predetermined and possibly delayed action inconsistent with the proper execution of the application software program (a "defensive action") if the silent guard detects a deficiency in the integrity of the evaluated data item(s).

In an embodiment, a silent guard may operate to initialize a variable to a desired value before the variable is used in a computation. Absent proper execution of the silent guard, the variable may not have the appropriate value when it is used in the computation, possibly causing the application software program to perform inaccurately or to fail.

In another embodiment, a silent guard according to the present invention comprises a variable whose value is computed during execution of the application software program. Typically, the variable selected for silent guarding is a program variable used by the application software program to carry out its intended function. However, the variable selected for silent guarding may be a specialized variable installed in the application software program for the purpose of the silent guard. A variable may be selected for silent guarding because the value of the variable is vulnerable to attack or modification by a hacker. An attack on or unauthorized modification of such a variable results in detrimental effects to program execution. For example, a variable whose value comprises a password entered by a user of the application software program may be selected for silent guarding. If such a variable is unauthorizedly modified, a hacker may gain access to an application software program to which he otherwise would not be entitled.

According to an embodiment of a silent guard, the variable selected for silent guarding has an expected value, i.e., the value the variable should have at a particular point in program execution. In an embodiment, the expected value may be determined by an adaptation of the method for data precomputation discussed hereinafter, or by other methods known in the art. In an embodiment, a silent guard comprises a comparison of the run-time value of the variable selected for silent guarding against its expected value. If the comparison reveals that the run-time value of the variable is the same as its expected value, application software program execution proceeds as expected. A defensive action results if the comparison reveals a difference between the run-time value of the variable selected for silent guarding and its expected value.

The run-time value of a variable selected for silent guarding may change one or more times during execution of the application software program. For example, the run-time value assigned to the variable as a result of a first computation may be overwritten by a second computation, and then overwritten again by a third computation. A silent guard according to the present invention is adaptable for this circumstance. The expected value of the variable selected for silent guarding is its expected value at the point in the execution of the application software program where the comparison is made. Thus, the same variable may be protected by a silent guard more than once in an application software program.

In an embodiment of a silent guard according to the present invention, the comparison of the run-time value of the variable selected for silent guarding against its expected value comprises a conditional computation. According to this embodiment, one or more mathematical expressions comprising the comparison of the run-time value of the variable selected for silent guarding against its expected value are inserted into one or more program instructions from the application software program such that correct execution of the one or more application software program instructions depends upon the run-time value of the variable selected for silent guarding being the same as its expected value.

In an embodiment, the comparison using the run-time value of the variable selected for silent guarding may be indirect. In this embodiment, the run-time value of the variable selected for silent guarding is processed at run-time by an algorithm. The expected value of the variable also is processed by the algorithm, either concurrently or beforehand. In this embodiment, the algorithm's output using the run-time value of the variable is compared to the algorithm's output using the expected value of the variable. A defensive action results if the comparison reveals a difference therebetween. As before, the comparison may be embodied in one or more mathematical expressions inserted into one or more program instructions from the application software program, so that correct execution of the one or more application software program instructions will depend upon the run-time value of the variable selected for silent guarding being the same as its expected value.

The following pseudocode segment contains an exemplary implementation of a silent guard. In this example, variable X has an expected value "TRUE." The label "L" indicates the point in the application software program where execution of the non-guard program instructions is resumed. The pseudocode is of the form:

Compute X
If (X = TRUE) go to L
Take Defensive Action
L: Resume execution of non-guard program instructions According to this pseudocode segment, the application software program first computes the value of variable X. Then the computed value of variable X is compared to its expected value "TRUE." If the computed value of variable X is equal to "TRUE," program execution advances to the point in the application software program corresponding to the label "L," where execution of the non-guard program instructions is resumed. If the computed value of variable X is not equal to "TRUE," the silent guard takes a defensive action. Note that in this example, it is not important that the expected value of X is the Boolean value "TRUE." The expected value of X could have been any number (integer or real), any character string, or a Boolean value. It should also be noted that, although the foregoing example and other examples used herein to explain the operation of silent guards use an "if-then-else" formulation, that represents merely one possible implementation of a silent guard. In most applications, a silent guard will be installed such that its operation is more implicit.

The following pseudocode segment illustrates the use of a conditional computation according to the present invention. In the pseudocode segment of the following example, variable V is a program variable used in the application software program. As in a previous example, the silent guard comprises a variable X whose expected value is "TRUE." Also shown is a second variable X1 whose value is computed during the computation of variable X. Variable X1 has an expected value T1. This example also comprises a flag variable F. The value of flag variable F is initialized to 0, and is changed to 1 after the silent guard program instructions are executed. Line numbers are shown in the following example to assist in the explanation; however, the use of line numbers in this example and other examples herein does not necessarily mean that actual program code based on these pseudocode instructions will consist of only the number of lines shown in the example. It will be appreciated by those of skill in the art that other program instructions may be interspersed between pseudocode program instructions shown below to be adjacent without affecting the output of the pseudocode segment. For example, the pseudocode program instruction of line 7 below (identified by label "L") need not be located immediately after the pseudocode program instruction of line 6. Likewise, any of the other pseudocode program instructions shown below to be adjacent may, when implemented as program instructions in a programming language, be separated by one or more other program instructions.

```
1        F = 0
2        Compute X1
3        Compute X
4        F = 1
5        If (X = TRUE) Go To L
6        Take Defensive Action
7    L   If (F = 0) Go To L1
8        V = Z * (A*Z + B) + 72    //sample computation of V
9        Y1 = X1-T1
10       V = V+Y1
11   L1  Continue
```

In this example, the application software program is protected in three ways. First, if the value of variable X computed at line 3 does not equal TRUE in the comparison step at line 5, the program will take a defensive action, as shown at line 6.

Second, flag variable F acts as a silent guard. If the application software program is altered in a way such that the value of flag variable F is not set to 1 in the pseudocode program instruction shown at line 4, the computation of V shown at line 9 will be skipped. For example, if the control flow of the application software program is altered unexpectedly (such as by the actions of a hacker attempting to defeat a guard) in way that bypasses the execution of the pseudocode program instruction shown at line 4, the value of flag variable F remains 0. When the program instruction shown at line 7 is processed, execution of the application software program advances to line 11, bypassing the program instructions shown at lines 8-10. Thus, calculation of the value of program variable V is skipped. Program variable V retains whatever value it had prior to execution of this section of the application software program. If program variable V is to be used later in the application software program, computations relying on program variable V likely will be inaccurate. If program variable V is used frequently in the application software program, the inaccurate value of program variable V may propagate into many errors in the application software program. Conversely, if program variable V is used infrequently in the application software program, the inaccurate value of program variable V may not manifest into a discernable error until much later in program execution. In either case, it may be difficult to detect the source of the program execution errors.

The third protection contained in the foregoing pseudocode example arises from the fact that the value of program variable V computed at line 10 will be correct only if the value of Y1 is 0. Thus, the pseudocode program instruction "Y1=X1-T1" shown at line 9 comprises a conditional computation according to the present invention. The value of Y1 will be computed correctly only if the value of variable X1 computed at line 2 is the same as its expected value T1. Accordingly, if the client code block of variable X1 is altered unexpectedly, such as by the actions of a hacker, the value of computed variable X1 will not be the same as its expected value T1. If X1≠T1, the value of variable Y1 computed at line 9 will be inaccurate and, thus, program variable V will be inaccurately computed at line 10. As before, depending on where and how program variable V is used in the application software program, the inaccurately computed value of program variable V may not become manifest until later in program execution. A hacker altering the computation of variable X1 may have difficulty connecting the altered computation of variable X1 with the failure caused by the inaccurately computed program variable V.

A third embodiment of a guard according to the present invention comprises a "checksumming guard." A checksumming guard according to the present invention comprises a portion of software code of an application software program that evaluates the integrity of one or more code blocks of the same application software program, or of another guard, and takes a defensive action if the checksumming guard detects a deficiency in the integrity of the evaluated code block(s) of the application software program. A checksumming guard differs from a silent guard in that a silent guard evaluates the integrity of one or more data items, while a checksumming guard evaluates the integrity of one or more code blocks.

A defensive action taken by a checksumming guard could be to halt program execution or to cause a message to be sent to the user's computer terminal or printer, but such a defensive action taken immediately upon the detection of the integrity deficiency could be undesirable because it could assist a hacker in determining the location of the checksumming guard and disabling the checksumming guard within the application software program. In one embodiment of the present invention, the defensive action is to modify the contents of all or a portion of the data upon which the application software program operates. Accordingly, as the application software program continues to execute, the modified data likely will cause other noticeable errors, and it will be more difficult for a hacker to determine when and where the data was modified. Alternatively, the defensive action could be to overwrite the contents of a portion of the executable program instructions in computer memory. Any modification could be done with pre-determined data or data randomly and automatically generated by the checksumming guard. Data areas to be modified could be specified in advance by the person creating the tamper-resistant software, or preferably could be selected randomly and automatically by the present invention. In another embodiment of the present invention, the defensive action is to cause a message to be stored in computer memory for future use by the application software program.

In an embodiment of the present invention, a checksumming guard uses one or more checksums to verify the integrity of one or more client code blocks. A "checksum" is a value calculated from one or more client code blocks that is likely to change if such code block(s) is/are modified. It is preferred (but not required) that a checksumming function according to the present invention uses a "one-way" function which, according to this embodiment, can be any function whereby the checksum of a client code block is computed in a manner that makes it impossible thereafter to derive the client code block from the value of the checksum, or that makes it impossible thereafter to derive another client code block that results in the same checksum as the original client code block. For example, a checksum of a client code block may be computed by squaring a preliminary checksum, and then calculating its modulo n, where n is the product of two secret prime numbers. The checksum value is the value of the squared preliminary checksum modulo n and is stored in the application software program. The attacker thereafter cannot compute square root of the squared preliminary checksum modulo n without knowing the two secret prime numbers. Other examples of one-way functions include a cryptographic, one-way hash function and the well known MD4, MD5, and Sha-1 algorithms, as well as other one-way functions as would occur to those of ordinary skill in the art.

Normally, checksumming guards will be designated to protect code blocks of an application software program in which particularly sensitive data is processed, such as encryption or decryption routines (if any), processing of passwords used by the application software program, or where important calculations are made. Optionally, a checksumming guard may contain, between its beginning and ending program instructions, other program instructions from the original application program, so that the checksumming guard code and the original code are interleaved.

A client code block to be monitored by a checksumming guard may include only static byte sequences that do not change during program execution, or may include self-modifying code or self-decrypting code. If the client code block includes self-modifying code or self-decrypting code, it is essential that the self-modifying code or self-decrypting code be in the state of self-modification or self-decryption expected by the checksumming guard at the point of program execution where integrity of the client code block is verified by the checksumming guard. If the self-modifying code or self-decrypting code is not in the expected state, the checksumming guard may erroneously take a defensive action.

Figure 2A:
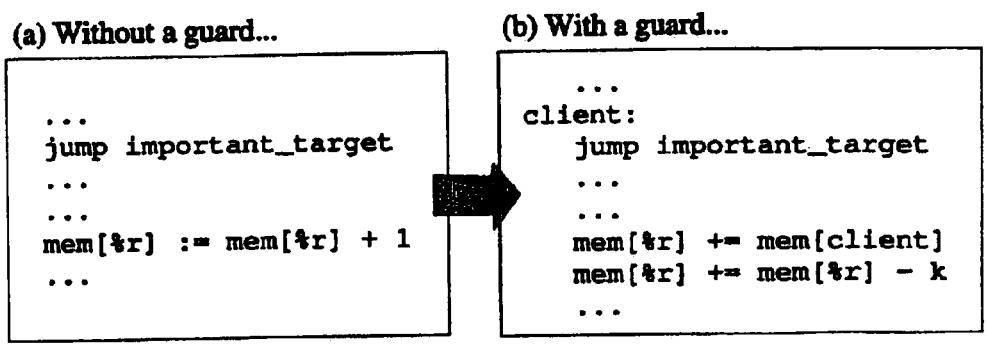
FIG. 2A shows software pseudocode in operation without a guard, and then with a simple guard according to the present invention.
Figure 2:
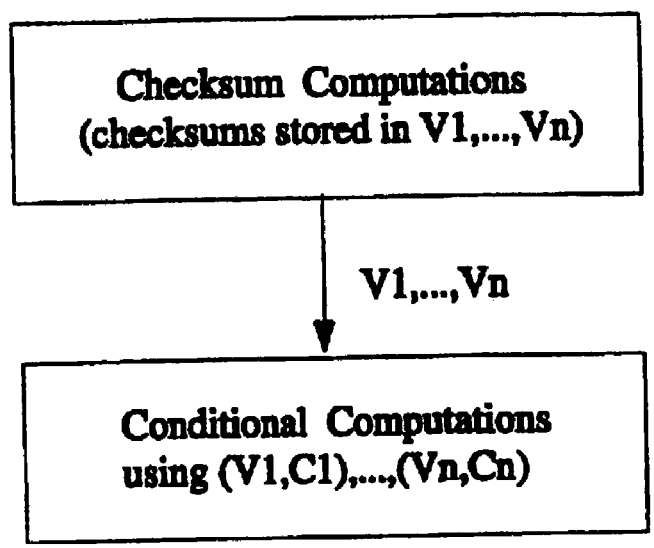
FIG. 2B shows the first and second computational component of a checksumming guard according to the present invention.

FIG. 2A shows software pseudocode in operation without a guard, and then with a simple checksumming guard example of the present invention. The pseudocode in part (a) of FIG. 1 having no guard has been transformed to the pseudocode in part (b) of FIG. 2A through the installation of a checksumming guard. Both part (a) and part (b) are functionally equivalent, except that the checksumming guard in part (b) of FIG. 2A protects the jump instruction (the client code block) from being modified, provided that mem[client] contains the whole jump instruction. In part (b) of FIG. 2A, k has the value of mem[client]−1, and the code increments mem[%r] correctly if and only if the jump instruction is intact. If the jump instruction is not intact, the defensive action taken is that mem [%r] is not correctly incremented.

Guards may be installed into application software programs, such as those written in a high level programming language such as C, C++, Pascal, or Fortran, or those written in the assembly language of any computer hardware architecture known in the art, or those written in binary executable form or object code form. Because they are not restricted to high-level application software program syntax and control structures, instruction-level primitives allow assembly language code to be flexibly transformed to an appropriate state for self-protection. Assembly language code compiled from code written in one of the high-level software programming languages well known in the art, such as, for example, code written in C, C++, Pascal, or Fortran, or compiled Java bytecode, may be used as application software program code. Assembly language code from other sources may be used as the application software program code, provided the assembly language code is an assembly language code that does not base its computations on fixed absolute addresses. Generally, binary executable code or object code may be used as application software program code provided the binary executable code or the object code does not base its computations on fixed absolute addresses. However, if the binary executable code or the object code bases its computations on fixed absolute addresses, the binary executable code or the object code still may be used as application software program code if the binary executable code or the object code is converted to a form in which the dependence on the use of fixed absolute addresses is eliminated. The vast majority of commercial software development results in assembly language code which can serve as application software program code for the present invention.

In addition to the installation of guards, the present invention permits a set of messages of virtually any size to be embedded into the guarded application software program as one or more data strings, which may be encrypted using encryption techniques known in the art, or disguised as programming instructions using encoding techniques known in the art. Such a message is known as a software "watermark" or "fingerprint." These optional watermarks or fingerprints often contain information about the vendor or the proper licensee of the application software program. It is desired that watermarks or fingerprints be tamper resistant, a characteristic called "resilience." Watermark or fingerprint resilience may be enhanced by encryption of the watermark or fingerprint, or by disguising the watermark or fingerprint as application software program instructions using well known encoding techniques. In addition to or instead of the aforementioned techniques, the present invention may improve watermark or fingerprint resilience by hiding the watermarks or fingerprints in the code and protecting the watermarks or fingerprints by the same self-protection mechanisms that protect the application software program. Thus, attempts to alter a watermark such as, for example, altering the vendor or licensee information, will trigger a guard and may disable the use of the application software program. Such tamper-resistant watermarks or fingerprints are useful for tracing copyright violators who illegally alter or redistribute application software programs.

The present invention permits the user to specify parameters for customizing the guard installation process. One example of a guard installation customization parameter is the number of guards to be installed into an application software program. The user may specify the number of guards to be installed. Alternatively, the user may permit the present invention to specify automatically the number of guards to be installed. For example, the present invention may specify automatically the number of guards to be installed by randomization, or may specify automatically the number of guards to be installed based on a measurement of the complexity of the application software program using a software complexity metric known in the art. In another embodiment, the present invention may specify automatically the number of guards to be installed based on an analysis of the application software program, its intended use, and/or its intended environment. For example, if the application software program contains valuable trade secrets, if the application software program is to be used to process classified information, if high reliability is required from the application software program, and/or if the environment in which the application software program is to be used is such that tampering is likely, the application software program would be protected automatically with more guards than an application software program which does not possess such features and/or is not exposed to such threats.

Another example of a guard installation customization parameter involves the use of a random number generator seed. The seed will drive a random number generator to produce a randomized sequence of numbers, which in turn will be used to achieve randomization across protection schemes or within the same protection scheme. The end result is that even if the same copies of an application software program are protected with the same self-protection scheme, their actual protections will be different, as if they were protected with different schemes. Randomization in application software program protection is particularly effective in thwarting attacks against a widely distributed application software program, such as a word processing application software program for use in a home or office environment. The random nature of the application software program protection precludes the same tampering method from being applied to differently protected copies of an application software program.

Another advantage of the method of the present invention is that the user may link external object files or library resources with the self-protecting application software program.

The output of the method of the present invention is a binary executable version of the application software program, internally armed with at least one guard and optionally embedded with guarded watermarks.

FIG. 2B shows a first and a second computational component of an embodiment of a checksumming guard according to the present invention. Together, the first and second computational components are called a "checksumming guard template." The checksumming guard template is converted into a checksumming guard during generation of the final binary executable file. The first computational component computes one or more checksums of the client code block(s). The second computational component performs "conditional computations" for the host during program execution in which the checksum of one or more client code blocks are compared to known or derived values. When the checksum matches the known or derived value, the checksumming guard permits normal host software computations to proceed. When the checksum differs from the known or derived value, the checksumming guard will "fire," resulting in possibly delayed defensive action from the application software program.

The first computational component of a checksumming guard is based on a predefined checksumming template. The second computational component of a checksumming guard has no predefined structure. Its structure depends on the application software program.

The first computational component of a checksumming guard is constructed from at least one predefined checksumming template that specifies checksum computations. There are many possible forms of such templates. In one embodiment of the present invention, the checksumming templates are provided for the user by the present invention, giving the user the ability to select a desired checksumming template(s) to use by name or other identifying characteristic. In another embodiment of the present invention, the user may develop customized checksumming templates for his own use without relying on the present invention to provide checksumming templates. Another embodiment of the present invention combines the features of these embodiments, providing the user with a set of checksumming templates which may be selected by name or other identifying characteristic, while also providing the user the ability to develop customized checksumming templates for his own use. FIG. 3 shows two examples of checksumming templates according to the present invention written in INTEL®-like assembly language code instructions.

The first checksumming template example illustrated in FIG. 3, template 1, describes a simple checksum computation, which produces a single checksum of its client code block. The second checksumming template example illustrated in FIG. 3, template 2, produces two checksums based on different operations. In each of template 1 and template 2, there are special parameters such as CHECKSUM_*, $START_*, and $END_* that denote checksum variables and the starting and ending segment addresses of the client code block, respectively. These parameters, as well as others, such as LABEL_* and TEMP_* will be mapped to their corresponding host variables or values in the process of checksumming guard installation. Note that the checksumming templates also contain random-valued parameters $RANDOM_* which are randomly initialized during the checksumming guard installation. These random-valued parameters can be made to adjust the rigor of checksumming, even for simple checksumming schemes. For example, the smaller the initialized values of $RANDOM_2 in each of template 1 and template 2, the more sensitive the checksumming schemes in each.

It is preferable that the first computational component of a checksumming guard not be made too complicated, because simpler checksumming guards are more likely to remain undetected by a hacker in the application software program than are complex checksumming guards. Furthermore, the strength of the application software program protection preferably does not depend on a single checksumming guard at one location. Instead, it preferably depends on a distributed network of checksumming guards that collectively perform checksumming on the same or on different client code blocks. This technique is called "distributed checksumming."

The number of different checksumming templates available to be used as the first computational component of a checksumming guard is not a critical factor. Code disguise transformations performed on the application software program after checksumming guard installation will disguise the code, hindering detection of recurring checksumming guard code by a hacker. The disguise transformation code inserted creates new protection capabilities that protect the both the checksumming guards and the application software program from tampering.

Prior to installing a checksumming guard, the user may specify to the system that creates the tamper resistant software how many checksumming guards to deploy within the application software program, which client code to protect, which of the plurality of available checksumming templates to use, and at which point(s) in the application software program code the checksumming guard is to be installed. Such specification may be made through a user interface means known in the art such as, for example, a graphical user interface. In one embodiment of the present invention, these factors may be selected randomly and automatically by the system that creates the tamper resistant software. After these decisions are made, the first step in the checksumming guard installation process is installing each checksumming template into the host. Parameters in the checksumming template are mapped to host variables or values, and the resulting code then is inserted at the chosen installation point. Checksum parameters may be mapped to new global variables. Other parameters such as client addresses, code labels, and temporary variables may be mapped to corresponding addresses, new labels, and unused registers (or to new global variables if all registers are live at the insertion point) in the application software program, respectively.

Following the installation of each checksumming template, the next step in the checksumming guard installation process is generating the second computational component of the checksumming guard. In an embodiment, the second computational component contains one or more expressions from the application software program that have been modified by the insertion of one or more conditional identity functions such that correct execution of the one or more application software program expressions will depend upon the presence of one or more checksums computed by the first computational component of the checksumming guard which match predetermined values for, or derived from, the one or more checksums.

First, at least one application software program expression to be modified by the insertion of one or more conditional identity functions must be selected. Optionally, the at least one application software program expression is selection by the user. An expression selected for modification must be at a location in the application software program execution flow such that upon reaching the expression during execution, the one or more checksum variables to be used in the modified expression always will contain checksums computed by the first computational component of the checksumming guards which have not been modified by application software program execution subsequent to their computation One or more "conditional identities" formed by the checksum variables and their corresponding constant values are inserted into each selected expression. Conditional identities are any expressions that, using the available checksum variables and corresponding constant values, conditionally compute "0" or "1" or another number or value as required to maintain computational accuracy of the application software program expression selected for modification. Conditional identities may be selected by the user, or generated randomly and automatically by the system that creates the tamper resistant software. Each expression then is rewritten to incorporate the one or more conditional identity functions concealing the real checksum values. The rewriting will appear to transform the real checksum values to other different numbers. The corresponding constant values with which the checksum variables form conditional identities are generated during the patching step of the present invention explained hereinafter.

FIG. 4 shows an example of expression rewriting to incorporate conditional identities according to the present invention. In FIG. 4, expression (1) is transformed to expression (2) via a process of inserting into expression (1) mathematical identity elements (in this case 0's) in such a way that the result is not affected. The identity elements are then replaced in expression (3) by appropriate expressions formed by pairs of computed checksum values (u and w) and their corresponding constant values ($u_o$ and $w_o$) against which they will be verified. Expression (3) then is rearranged to hide the changes. The final result is expression (4), which is conditionally equivalent to expression (1).

The next step in the checksumming guard installation process is to mark those data values derived from the checksum values. All checksum values are unknown to the system at this stage because they will be computed during the patching step of the present invention (discussed hereinafter) from the contents of an output binary image that has not yet been created. Therefore, any data values derived from such unknown sources must be recomputed and rewritten to the code once they become known during the patching step of the present invention. At this stage, the system only marks the locations for all data values to be derived from unknown checksum values, and saves the sequences of operations that will derive the data values from the unknown checksums.

Figure 5:
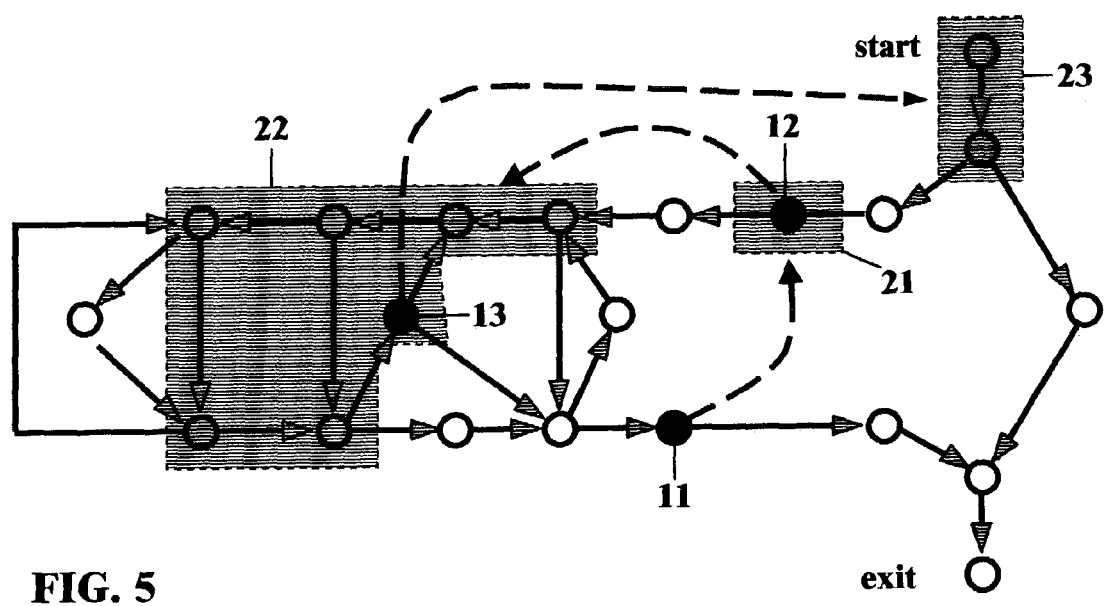
FIG. 5 shows a sample control flow graph of an application software program protected by a distributed network of three guards according to the present invention.

Self-protection may be based on a distributed network of guards that protect the application software program and each other in a cooperative manner. FIG. 5 shows a sample control flow graph ("CFG") of an application software program protected by a distributed network of three guards according to the present invention. The three guards are shown in the darker circles, and labeled as guard 11, guard 12, and guard 13. Guard 11 is responsible for protecting its client code, shown as a shaded region and labeled as client code block 21. Guard 12 is responsible for protecting its client code, shown as a shaded region and labeled as client code block 22. Guard 13 is responsible for protecting its client code, shown as a shaded region and labeled as client code block 23.

Self-protection is reinforced by having guards protect each other. In FIG. 5, guard 11 protects client code block 21, which contains guard 12. Also in FIG. 5, guard 12 protects client code block 22, which contains guard 13. The three guards form a protection chain, making the task of modifying the application software program more difficult. For example, to defeat guard 13 which protects the start of the application software program, guard 11 and checksumming guard 12 have to be defeated as well.

Because guards may be installed almost anywhere in the code, and because guards can protect each other in many ways, defeating a self-protecting software program could require a laborious effort of wholesale "code debugging"—an effort that may become greater than that of rewriting the application software program from scratch. FIGS. 6A-B show an example of assembly language code which computes and prints the factorial of a positive integer. FIGS. 7A-B show the assembly language code of FIGS. 6A-B with a checksumming guard installed according to the present invention at the site identified in FIG. 7A at line 39.

There are several additional advantages of a scheme employing protection by a distributed network of guards. For example, unlike the approach disclosed by Aucsmith in his article of using few security kernels to protect the application software program, with each security kernel requiring a large number of instructions for proper operation, distributed protection by a larger number of smaller checksumming guards requiring fewer instructions provides the following advantages: (a) checksumming client code block(s) by a distributed networks of checksumming guards may be simplified because the load is shared among the checksumming guards in the network; (b) a distributed networks of checksumming guards can be installed in a wide variety of logical formations to defend the client code block(s); and (c) due to the small size of the checksumming guards, each checksumming guard may be more easily concealed in the application software program code to prevent discovery by a hacker.

A protection scheme employing a distributed network of guards relies on a balance between the level of protection it offers and the amount of additional degradation to application software program performance the user will tolerate. Increasing the level of protection means more guards are used to protect more client code blocks. Each additional guard requires storage space and increases computational overhead on the application software program. A heavily protected application software program with a large number of guards may result in a substantial loss of computational speed. While the method of the present invention implements several protection schemes and could select one or more client code blocks at random to be protected, it is preferable that the user of the present invention specify which portions of the software program to protect and what level of protection is desired.

The client code blocks to be protected may be marked and labeled with the desired level of protection or specific protection scheme specified by the user. The user may do so, for example, through a graphical user interface that allows specific client code blocks to be designated, or by identifying the names of routines or basic blocks containing the client code blocks. Alternatively, at the option of the user, the client code blocks to be protected may be selected randomly and automatically. Other means of identifying the client code blocks known in the art may be utilized, such as identification of the client code blocks by name as an input parameter to a software program embodying the present invention. For high volume production of self-protecting software programs originating from the same software program source, such user-supplied information may be specified only once, and then replicated automatically.

Each portion of the code to be protected then is identified at the basic block level so that basic blocks are the smallest units of code to be protected. For additional security, the existing set of marked basic blocks may be extended to a larger set that contains all ancestor basic blocks of all paths of length "N" or less that precede each originally marked basic block. This is to ensure "code protection range" comprising the "neighborhood of radius N" of each sensitive basic block is protected as well. The neighborhood of radius N of each originally marked basic block is protected in the same way as the basic block, and if a newly marked basic block has overlapped protection, it is given correspondingly larger protection.

Figure 8:
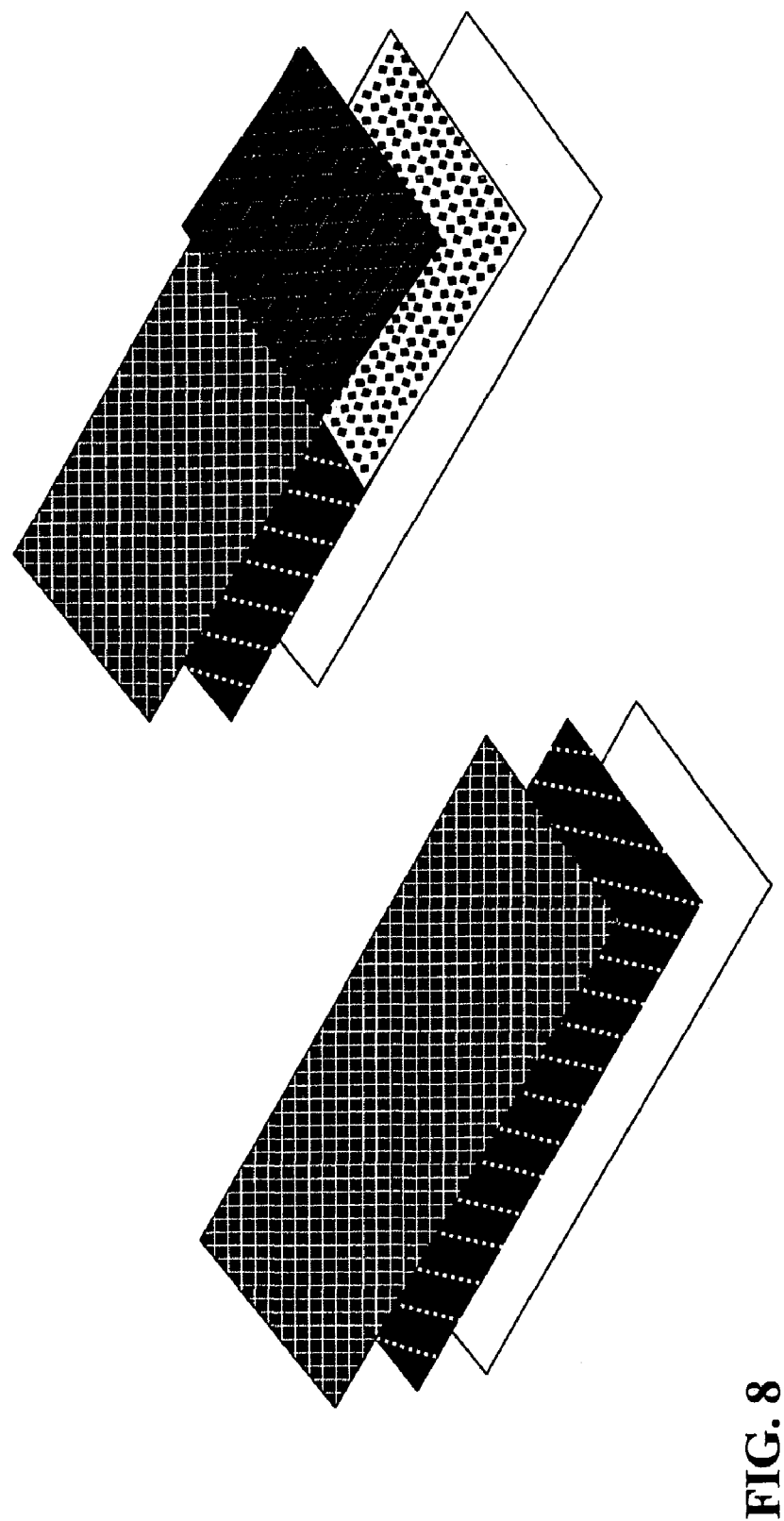
FIG. 8 shows a graphical representation of two client code block protection schemes according to the present invention, wherein the same underlying client code block is protected by a first and a second protection layer of guards, each protection layer comprised of a different network of guards.

FIG. 8 shows a graphical representation of two client code block protection schemes according to the present invention, wherein the same underlying client code block is protected by a first and a second protection layer of guards, each protection layer comprised of a different network of guards. Part (a) of FIG. 8 illustrates as the bottom layer a client code block protected by a first and a second protection layer of guards, each protection layer comprised of a single guard protecting the entire scope of the code block. Part (b) of FIG. 8 illustrates the same client code block protected by a first and a second protection layer of guards as in part (a), but each protection layer in part (b) is comprised of two different guards instead of a single guard. The different shades shown in part (a) and part (b) indicate the different guards using different functions. For example, the client code blocks in FIG. 8 may be protected by checksumming guards, repair guards, or a combination of checksumming and repair guards.

Each protection scheme illustrated in FIG. 8 has advantages and disadvantages. The scheme illustrated in part (a) provides less security but requires less code. The scheme illustrated in part (b) uses more guards, thereby adds more code to the application software program, but enjoys a benefit of better security.

The present invention includes a flexible method for specifying the formations of the distributed networks of guards. Such a method allows the guard network formations to be specified coarsely or precisely, depending on the user's needs. For testing purposes or particular software programs, specifically defined guard network formations may be needed. For high volume production of self-protecting software programs, details of guard network formations may be left unspecified by the user in favor of randomized automatic specification by the present invention in a manner that meets the levels of security, cost, and software program execution performance desired by the user.

One example of a distributed network of guards according to the present invention is called a directed-acyclic graph ("DAG"), where each node with an out-edge represents a guard and the node or nodes to which it points represent its client code. A DAG has no cycles, so guards do not protect each other in a circular manner.

Figure 9:
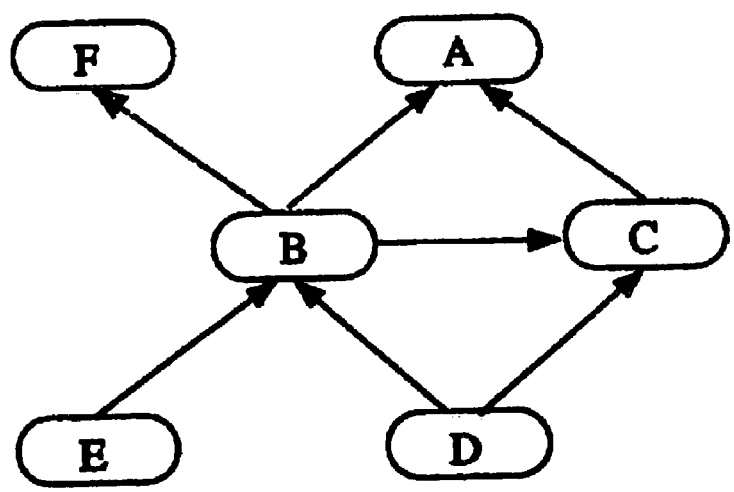
FIG. 9A shows a diagrammatic example of guarding network according to the present invention.
FIG. 9B shows a diagrammatic example of a cyclic guard formation according to the present invention.
FIG. 9C shows a diagrammatic example of a polycyclic guard formation according to the present invention.
FIG. 9D shows a diagrammatic example of a dynamically determined guard formation according to the present invention.
FIG. 9E shows a diagrammatic example of a dynamically determined guard formation according to the present invention.
FIG. 9F shows a diagrammatic example of a dynamically determined guard formation according to the present invention.
FIG. 9G shows a diagrammatic example of a network of guards according to the present invention.
FIG. 9H shows a diagrammatic example of a partial guard graph showing the dominance relationship in the network of guards of FIG. 9G.
FIG. 9I shows a diagrammatic example of scenarios in which a network of guards can be installed into the execution flow of a software program without violating the partial ordering of their executions shown in FIG. 9H.

FIG. 9A shows an example of a directed-acyclic graph according to the present invention, wherein the guard formation is a DAG whose nodes are either "brigade" nodes or "client group" nodes. A brigade node is a node with out-edges. A brigade node represents a group of checksumming and/or repair guards that, collectively, protect a number of client code blocks. For example, nodes B, C, D, and E in FIG. 9A are brigade nodes. A client group node is a node pointed to by a brigade node. A client group node represents a set of basic blocks protected by a brigade node. For example, in FIG. 9A, A is a client group protected by both B and C, while A, C, and F are the client groups of B. Different client group nodes do not have basic blocks in common.

Each DAG formation has a set of client group nodes with no out-edges called "roots," each of which denotes a disjoint set of host basic blocks protected by corresponding brigade nodes in the formation. For example, nodes A and F are the roots of the formation in the FIG. 9A.

This general guard formation scheme can be used for hiding low-level details of actual guard deployments which will be randomized within each brigade node, and for specifying precisely a particular network of guards when the number of guards in each brigade node is set to one. A software program can be protected by more than one guard formation.

In an embodiment of the present invention, for each application software program, the user may specify to the system that creates the tamper resistant software a set of guard formation graphs, the set comprising at least one guard formation graph of the same general form as that shown in FIG. 9A. The set of guard formation graphs will contain general information about the guard protection scheme, but the details of what the guards are and how they protect the code may be left to the system that creates the tamper resistant software to implement.

Alternatively, the set of guard formation graphs, or any graph in the set of guard formation graphs, may be generated automatically by the system that creates the tamper resistant software based on a first and a second guard formation graph customization parameter to be supplied by the user. The first guard formation graph customization parameter is the number of brigade nodes protecting a root. The first guard formation graph customization parameter specifies the minimum level of protection assigned to each root node. The second guard formation graph customization parameter is the number of additional brigade nodes to be added to the formation. The second guard formation graph customization parameter may achieve a better and randomized final protection scheme. After the first guard formation graph customization parameter is applied, the beginning formation will be initialized with the roots being protected by the given number of brigade nodes. Application of the second guard formation graph customization parameter results in more brigade nodes being added to the formation in a way that each new brigade node protects a random subset of the nodes in the existing guard formation graph.

Each brigade node in every guard formation graph specified for an application software program is installed in an order in which its installation is complete before it becomes protected by another brigade node. To install each brigade node comprising at least one checksumming guard and associate it with its set of client group nodes, the following is done:

(1) Divide each client group node of basic blocks that has not previously been divided into subgroups of basic blocks, into subgroups and then for each subgroup form a code block using its basic blocks arranged in a randomized order. This code block is ready to be protected by checksumming guards. Dividing a client group node into subgroups of basic blocks allows protected client code to be distributed in the final application software program listing.

(2) Assign checksumming guards to protect each code block. This involves selecting a checksumming template for each checksumming guard, and selecting a portion of code within the code block to be its client code. The entire code block may, optionally, be selected as the client code.

(3) Install each checksumming guard into a basic block that is not protected by a previously installed checksumming guard. This prevents the checksumming guards from forming a logical protection cycle (although logical protection cycles are desirable in some cases, as discussed hereinafter). The installation site of each checksumming guard may be selected either randomly, or by the user who specifies the location at which the checksumming guard is to be installed, or through analysis of an execution profile of the original application software program, for example, in order to avoid frequently executed regions of the application software program code where the presence of the checksumming guard code may have a larger negative effect on software program execution performance.

A network of guards comprising an acyclic guard formation may be vulnerable to hackers. Using code analysis techniques known in the art, it may be possible for a hacker to detect one or more of the guards in the acyclic guard formation. As noted previously herein, if the hacker detects and attempts to override a guard whose integrity is protected by another guard, the altered guard will be detected and a defensive action will result, disrupting program operation. However, if the hacker detects an unguarded guard, such as the first guard in an acyclic guard formation, the hacker may be able to override the guard with impunity. Thereafter, the hacker may be able to analyze the program instructions comprising the overridden guard to determine its client code block. If the client code block comprises a second guard in the acyclic guard formation, the hacker may be able to override the second guard. The hacker using this technique may be able to step through each guard in the acyclic guard formation until all guards in the acyclic guard formation have been defeated. Accordingly, it is desirable in some instances to have guards form logical protection cycles. In a logical protection cycle, the integrity of each guard is protected by at least one other guard. There is no unprotected guard from which a hacker can launch an attack on the guard formation. The present invention is adaptable to permit cyclical guard formations.

In a cyclic guard formation according to the present invention, the integrity of each guard is protected by another guard. Likewise, every guard in a cyclic guard formation according to the present invention operates to protect the integrity of another guard. Thus, where checksumming guards $G_0, \ldots, G_{k-1}$ are checksumming guards in a cyclic guard formation and $0 \leq i < k$ (where i is an integer index variable and $1 < k$), every checksumming guard $G_i$ in a cyclic guard formation has a client code block comprising another checksumming guard $G_{i+1 \bmod k}$. Accordingly, each checksumming guard $G_i$ comprises software code operable to compute the checksum of the client code block comprising checksumming guard $G_{i+1 \bmod k}$. Those of ordinary skill in the art will appreciate that the use of modular arithmetic is necessary to describe the cyclic nature of the guard formation. For notational simplicity, the variable t is used hereinafter to represent the expression "i+1 mod k." In equation form:

$$t = (i+1) \bmod{k}$$

Figure 9B:
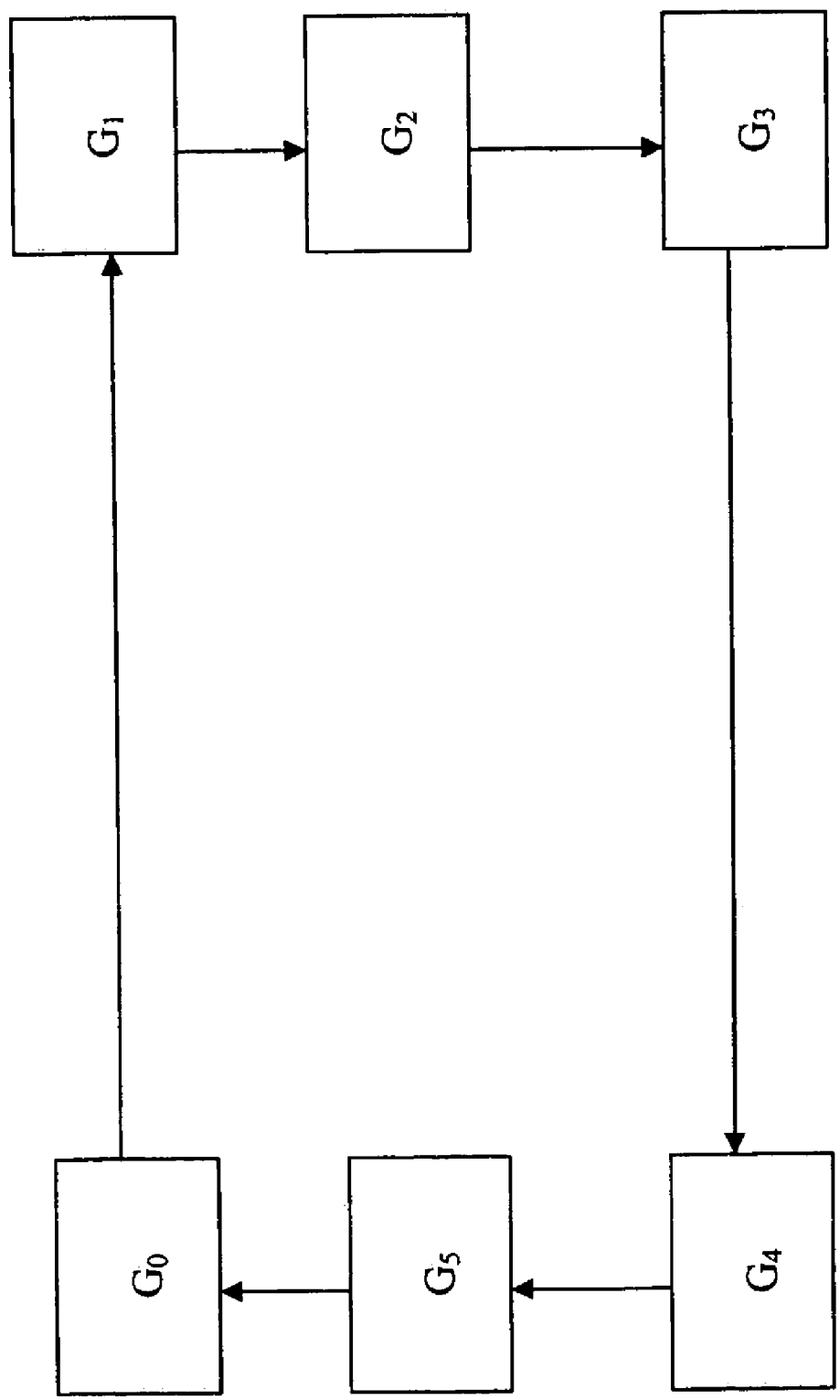

FIG. 9B shows a diagrammatic example of a cyclic guard formation according to the present invention comprising six guards. In an implementation of the formation shown in FIG. 9B, checksumming guard $G_0$ protects the integrity of checksumming guard $G_1$; checksumming guard $G_1$ protects the integrity of checksumming guard $G_2$; checksumming guard $G_2$ protects the integrity of checksumming guard $G_3$; checksumming guard $G_3$ protects the integrity of checksumming guard $G_4$; checksumming guard $G_4$ protects the integrity of checksumming guard $G_5$; and checksumming guard $G_5$ protects the integrity of checksumming guard $G_0$.

According to an embodiment of a cyclic guard formation, during the process of installing a checksumming guard $G_i$ in an application software program, an integer $a_i$ is stored within the program instructions comprising the checksumming guard $G_i$. Integer $a_i$ is a randomly selected integer having a constant value. Preferably, a different integer $a_i$ is stored within each checksumming guard $G_i$ in an application software program, but this is not required.

Associated with each checksumming guard $G_i$ in this embodiment of a cyclic guard formation, but not stored within the program instructions comprising the checksumming guard $G_i$, are two integers $p_i$ and $q_i$, each of which has a predetermined and constant value. Neither $p_i$ nor $q_i$ is stored anywhere within the application software program containing the checksumming guard $G_i$. According to this embodiment of a cyclic guard formation, each integer $p_i$ and integer $q_i$ comprises the following properties:

Each is a prime number $p_i \neq q_i$ $p_i$ modulo $a_i \neq 0$ $a_i$ modulo $p_i \neq 0$ $q_i$ modulo $a_i \neq 0$ $a_i$ modulo $q_i \neq 0$ The multiplicative product of integers $p_i$ and $q_i$ (denoted hereinafter as "$p_i q_i$") is computed as part of process of installing each checksumming guard $G_i$ in the application software program. Multiplicative product $p_i q_i$ then is stored within the program instructions comprising the checksumming guard $G_i$. Integers $p_i$ and $q_i$ are selected so that it is difficult for an attacker to derive integers $p_i$ and $q_i$ from multiplicative product $p_iq_i$. In an embodiment, integers $p_i$ and $q_i$ are large numbers.

Each unaltered client code block comprising a checksumming guard $G_t$ has a specific checksum, denoted as original checksum "$C_t$." Each original checksum $C_t$ according to this embodiment of a cyclic checksumming guard formation has a multiplicative inverse modulo$(p_i-1)(q_i-1)$, where "$(p_i-1)(q_i-1)$" denotes the multiplicative product of integer $(p_i-1)$ and integer $(q_i-1)$. The multiplicative inverse of original checksum $C_t$ modulo$(p_i-1)(q_i-1)$ is represented hereinafter by "$C'_t$," and satisfies the equation:

$$C'_t * C_t \text{ modulo}(p_i-1)(q_i-1)=1$$

According to this embodiment of a cyclic guard formation, neither integer $(p_i-1)$ nor integer $(q_i-1)$ are stored within the program instructions comprising the checksumming guard $G_i$, and the multiplicative product $(p_i-1)(q_i-1)$ also is not stored within the program instructions comprising the checksumming guard $G_i$. Neither integer $(p_i-1)$, integer $(q_i-1)$, nor multiplicative product $(p_i-1)(q_i-1)$ are stored anywhere within the application software program comprising checksumming guard $G_i$.

Multiplicative inverse $C'_t$ is computed as part of process of installing checksumming guard $G_i$ in the application software program. However, multiplicative inverse $C'_t$ is not stored within the program instructions comprising the checksumming guard $G_i$. Multiplicative inverse $C'_t$ is not stored anywhere within the application software program. A practitioner of the present invention is advised that, to ensure that a multiplicative inverse $C'_t$ exists in every case, the values of $p_i$ and $q_i$ are selected so that for a given original checksum $C_t$ there is a multiplicative inverse $C'_t$ which satisfies the above-defined equation. In an implementation of the present invention, random values of integers $p_i$ and $q_i$ are tested until a set of $p_i$ and $q_i$ is found which satisfies the above-defined equation.

A constant $R_i$ is associated with each checksumming guard $G_i$ in an embodiment of a cyclic guard formation according to the present invention. The value of each constant $R_i$ is calculated according to the following equation:

$$R_i = a_i^{C'_t} \text{ modulo } p_iq_i$$

Constant $R_i$ is computed as part of process of installing checksumming guard $G_i$ in the application software program after (1) integer $a_i$ is selected for checksumming guard $G_i$, (2) integers $p_i$ and $q_i$ are selected and multiplicative product $p_iq_i$ is calculated, and (3) original checksum $C_t$ and its multiplicative inverse $C'_t$ are computed. Recall that integers $p_i$ and $q_i$, original checksum $C_t$, and multiplicative inverse $C'_t$ are not retained anywhere in the application software program after constant $R_i$ is computed.

Each constant $R_i$ is stored in the application software program. Although each constant $R_i$ is associated with a checksumming guard $G_i$ in this embodiment of a cyclic checksumming guard formation, the constant $R_i$ is not necessarily stored within the program instructions comprising its associated checksumming guard $G_i$. Each constant $R_i$ may be stored anywhere in the application software program, provided, however, that in this embodiment of a cyclic guard formation, at least one constant $R_i$ must be stored outside the cyclic guard formation. In other words, at least one constant $R_i$ must not form part of the client code block of any checksumming guard $G_i$ in the cyclic guard formation.

In operation of a cyclic guard formation according to this embodiment, when the program instructions comprising a checksumming guard $G_i$ are executed during run-time, the checksum of the client code block comprising checksumming guard $G_t$ is calculated at least one time. The checksum of the client code block comprising checksumming guard $G_t$ calculated during program execution is denoted as calculated checksum "$X_t$."

Using the value of constant $R_i$ stored in the application software program, and the value of checksum $X_t$ calculated during run-time, checksumming guard $G_i$ then performs a conditional computation to determine if the client code block comprising checksumming guard $G_t$ has changed. If the client code block comprising checksumming guard $G_t$ is unchanged, calculated checksum $X_t$ will be the same as original checksum $C_t$, and a conditional computation comprising the following equation will hold true:

$$R_i^{X_t} \text{ modulo } p_iq_i = a_i$$

This is because:

$$R_i^{X_t} \text{ modulo } p_iq_i = (a_i^{C'_t})^{X_t} \text{ modulo } p_iq_i$$

and $$(a_i^{C'_t})^{X_t} \text{ modulo } p_iq_i = a_i$$

Recall that that neither original checksum $C_t$ nor its multiplicative inverse $C'_t$ appear anywhere in the application software program. Multiplicative inverse $C'_t$ is shown in the above equations only to explain the operation of the $R_i^{X_t}$ modulo $p_iq_i = a_i$ property.

If the conditional computation comprising the $R_i^{X_t}$ modulo $p_iq_i = a_i$ equation holds true, execution of the application software program proceeds normally. However, if the client code block comprising checksumming guard $G_t$ has changed, such as, for example, through the actions of a hacker, checksum $X_t$ calculated during program execution will be different from original checksum $C_t$ calculated during the installation of checksumming guard $G_i$. The conditional computation comprising the above function will not hold true, and checksumming guard $G_i$ will take a defensive action.

In an embodiment of the present invention comprising a cyclic guard formation, one or more instances of the $R_i^{X_t}$ modulo $p_iq_i = a_i$ property may be adapted to comprise one or more conditional identity functions. Such a conditional identity function then may be added to one or more expressions from the application software program as described herein, so that correct execution of the one or more application software program expressions depends upon the value of checksum $X_t$ calculated by checksumming guard $G_i$ during program execution. When a calculated checksum $X_t$ matches the anticipated value (i.e., original checksum $C_t$), the conditional identity function evaluates to "0" or "1," as required to maintain computational accuracy of the application software program expression selected for modification, and the application software program execution proceeds normally. When a calculated checksum $X_t$ differs from the anticipated value, the conditional identity function does not evaluate to "0" or "1" or another number or value (as required to maintain computational accuracy), resulting in a defensive action.

The fact that integers $p_i$ and $q_i$ are not known to, and not readily discoverable by, an attacker makes it difficult for the attacker to modify a checksumming guard $G_t$ and perform a corresponding modification to constant $R_i$ that maintains the $R_i^{X_t}$ modulo $p_iq_i = a_i$ property. A modification to a checksumming guard $G_t$ changes its checksum in a way detectable by checksumming guard $G_i$. Thus, to modify a checksumming guard $G_t$ without causing checksumming guard $G_i$ to take a defensive action upon detection of the different checksum of modified checksumming guard $G_t$ requires concurrently computing a new multiplicative inverse (modulo$(p_i-1)(q_i-1)$) of the checksum of modified checksumming guard $G_t$, which is difficult to carry out without knowing integers $p_i$, $q_i$, $(p_i-1)$, and/or $(q_i-1)$.

In another embodiment of a distributed network of guards according to the present invention, the principles discussed above in regard to cyclic guard formations may be adapted to apply to "polycyclic guard formations." Polycyclic guard formations according to the present invention are strongly connected. In a polycyclic guard formation according to the present invention, the integrity of each guard is protected by at least one other guard. Likewise, every guard in a polycyclic guard formation according to the present invention operates to protect the integrity of at least one other guard.

In an embodiment of a polycyclic guard formation according to the present invention, polycyclic guard formation N comprises n guards which, in this embodiment, are designated as checksumming guards $G_0, \ldots, G_{n-1}$. Each such checksumming guard $G_i$ in polycyclic guard formation N has one or more client code blocks, wherein each client code block comprises at least one other checksumming guard $G_j$ (where i and j are integer index variables) in polycyclic guard formation N. The following properties apply in this embodiment of a polycyclic guard formation according to the present invention:

$0 \leq i < n$
$0 \leq j < n$
$1 < n$

The set of one or more checksumming guards $G_j$ comprising the client code of a checksumming guard $G_i$ is called list L(i). Each checksumming guard $G_i$ is operable to compute the checksum of each client code block comprising at least one checksumming guard $G_j$ in list L(i).

Figure 9C:
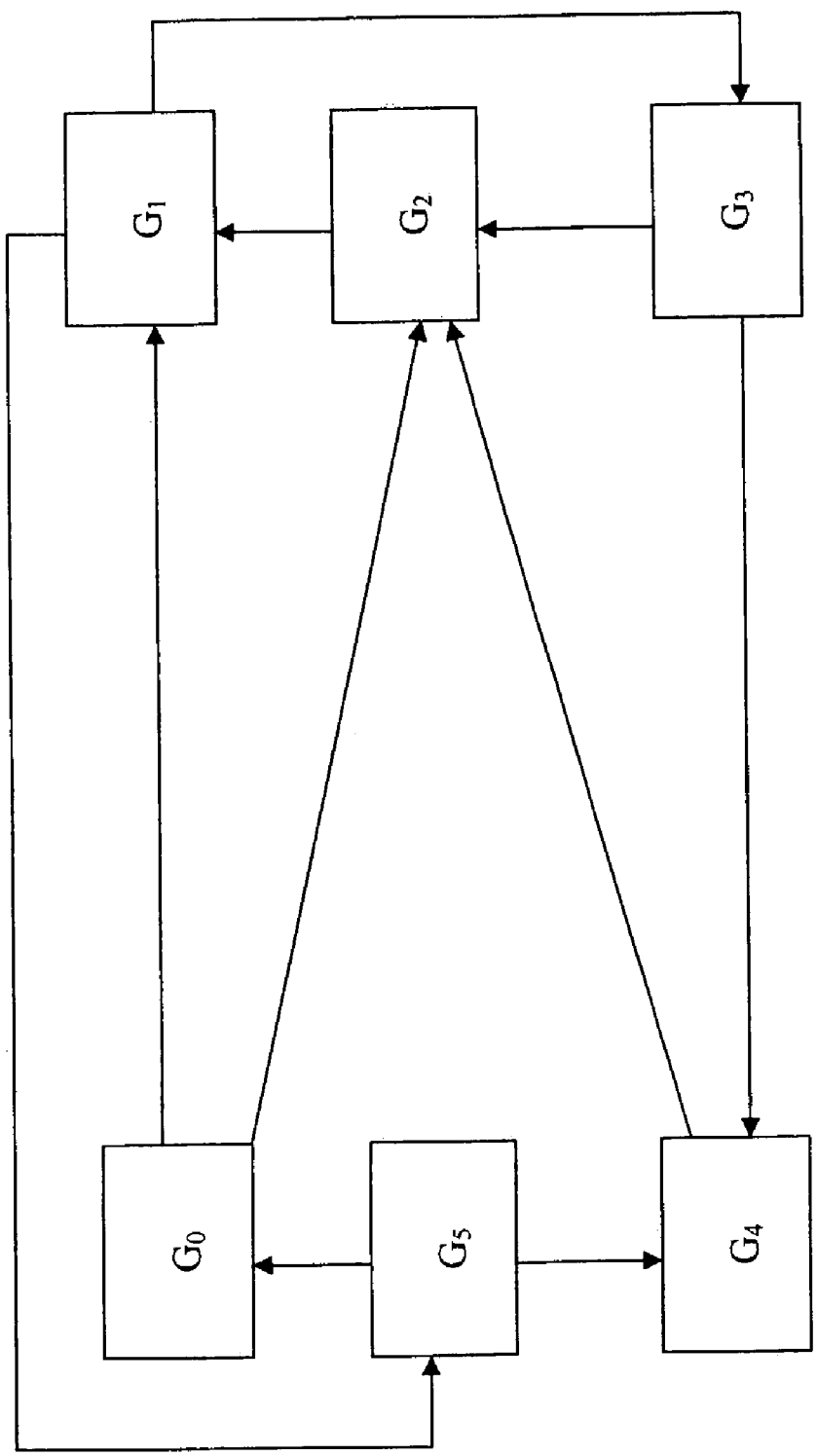

FIG. 9C shows a diagrammatic example of a polycyclic guard formation according to the present invention comprising six guards. In an implementation of the formation shown in FIG. 9C, checksumming guard $G_0$ protects the integrity of checksumming guards $G_1$ and $G_2$; checksumming guard $G_1$ protects the integrity of checksumming guards $G_3$ and $G_5$; checksumming guard $G_2$ protects the integrity of checksumming, guard $G_1$; checksumming guard $G_3$ protects the integrity of checksumming guards $G_2$ and $G_4$; checksumming guard $G_4$ protects the integrity of checksumming guard $G_2$; and checksumming guard $G_5$ protects the integrity of checksumming guards $G_0$ and $G_4$.

An embodiment of a polycyclic guard formation comprises many of the features of a cyclic guard formation embodiment previously discussed herein. In an embodiment of a polycyclic guard formation, an integer $a_i$ is stored within the program instructions comprising each checksumming guard $G_i$ during the process of installing the checksumming guard $G_i$ in the application software program. Integer $a_i$ is a randomly selected integer having a constant value. A different integer $a_i$ is stored within each checksumming guard $G_i$, but this is not required.

Associated with each checksumming guard $G_i$ in this embodiment of a polycyclic guard formation, but not stored within the program instructions comprising the checksumming guard $G_i$, are two integers $p_i$ and $q_i$, each of which has a predetermined and constant value, and each of which comprises the properties discussed previously herein in regard to a cyclic guard formation. Neither integer $p_i$ nor integer $q_i$ is stored anywhere within the application software program comprising checksumming guard $G_i$. A multiplicative product $p_i q_i$ is computed as part of process of installing a checksumming guard $G_i$ in the application software program. Multiplicative product $p_i q_i$ then is stored within the program instructions comprising the checksumming guard $G_i$, as was the case in a cyclic guard formation.

In an embodiment of a polycyclic guard formation, each unaltered client code bock comprising a checksumming guard $G_j$ has a specific checksum, denoted as original checksum "$C_j$." Each original checksum $C_j$ according to this embodiment of a polycyclic guard formation has a multiplicative inverse modulo$(p_i-1)(q_i-1)$. The multiplicative inverse of original checksum $C_j$ modulo$(p_i-1)(q_i-1)$ is represented hereinafter by "$C'_j$," and satisfies the equation:

$$C'_j * C_j \text{ modulo}(p_i-1)(q_i-1)=1$$

Multiplicative inverse $C'_j$ is computed as part of process of installing checksumming guard $G_i$ in the application software program. However, multiplicative inverse $C'_j$ is not stored within the program instructions comprising the checksumming guard $G_i$. Multiplicative inverse $C'_j$ is not stored anywhere within the application software program. As recommended in regard to a cyclic guard formation, a practitioner using this embodiment of a polycyclic guard formation is advised that, to make sure that such a multiplicative inverse exists, the values of $p_i$ and $q_i$ are selected so that for every original checksum $C_j$ there is a multiplicative inverse $C'_j$ which satisfies the above-defined equation. In an implementation of the present invention, random values of $p_i$ and $q_i$ are tested until a set of $p_i$ and $q_i$ is found which satisfies the above-defined equation.

According to this embodiment of a polycyclic guard formation, neither integer $(p_i-1)$ nor integer $(q_i-1)$ are stored within the program instructions comprising the checksumming guard $G_i$, and the multiplicative product $(p_i-1)(q_i-1)$ also is not stored within the program instructions comprising the checksumming guard $G_i$. Neither integer $(p_i-1)$, integer $(q_i-1)$, nor multiplicative product $(p_i-1)(q_i-1)$ is stored anywhere within the application software program comprising checksumming guard $G_i$.

A constant $R_{i,j}$ is associated with each relationship between a checksumming guard $G_i$ and its client code block comprising a checksumming guard $G_j$ according to this embodiment of a polycyclic guard formation. The value of each constant $R_{i,j}$ is calculated according to the following equation:

$$R_{i,j} = a_i^{C'_j} \text{ modulo } p_i q_i$$

Constant $R_{i,j}$ is computed as part of process of installing checksumming guard $G_i$ in the application software program after (1) integer $a_i$ is selected for checksumming guard $G_i$, (2) integers $p_i$ and $q_i$ are selected and multiplicative product $p_i q_i$ is calculated, and (3) original checksum $C_j$ and its multiplicative inverse $C'_j$ are computed. Recall that integers $p_i$ and $q_i$, original checksum $C_j$, and multiplicative inverse $C'_j$ are not retained anywhere in the application software program after constant $R_{i,j}$ is computed.

Each constant $R_{i,j}$ is stored in the application software program. Each constant $R_{i,j}$ may be stored anywhere in the application software program, provided, however, that in a polycyclic guard formation at least one constant $R_{i,j}$ must be stored outside the polycyclic guard formation. In other words, at least one constant $R_{i,j}$ must not form part of the client code block of any checksumming guard $G_i$ in the polycyclic guard formation.

In operation of a polycyclic guard formation according to this embodiment, when the application software program instructions comprising a checksumming guard $G_i$ are executed during run-time, the checksum of the client code block comprising checksumming guard $G_j$ is calculated at least one time. The checksum of the client code block comprising checksumming guard $G_j$ calculated during program execution is denoted as calculated checksum "$X_j$."

Using the value of constant $R_i$ stored in the application software program, and the value of checksum $X_j$ calculated during run-time, checksumming guard $G_i$ then performs a conditional computation to determine if the client code block comprising checksumming guard $G_j$ has been changed. If the client code block comprising checksumming guard $G_j$ is unchanged, calculated checksum $X_j$ will be the same as original checksum $C_j$, and a conditional computation comprising the following equation holds true:

$$R_{i,j}{}^{X_j} \text{ modulo } p_i q_i = a_i$$

This is because:

$$R_{i,j}{}^{X_j} \text{ modulo } p_i q_i = (a_i{}^{C'_j})^{X_j} \text{ modulo } p_i q_i$$

and $$(a_i{}^{C'_j})^{X_j} \text{ modulo } p_i q_i = a_i.$$

Recall, however, that neither original checksum $C_j$ nor its multiplicative inverse $C'_j$ appear anywhere in the application software program. Multiplicative inverse $C'_j$ is shown in the above equations only to explain the operation of the $R_{i,j}{}^{X_j}$ modulo $p_i q_i = a_i$ property.

If the conditional computation comprising the $R_{i,j}{}^{X_j}$ modulo $p_i q_i = a_i$ equation holds true, execution of the application software program proceeds normally. However, if the client code block comprising checksumming guard $G_j$ has changed, such as, for example, through the actions of a hacker, checksum $X_j$ calculated during program execution will be different from original checksum $C_j$ calculated during installation of checksumming guard $G_i$. The conditional computation comprising the above function will not hold true, and checksumming guard $G_i$ will take a defensive action.

In an embodiment of the present invention comprising a polycyclic guard formation, one or more instances of the $R_{i,j}{}^{X_j}$ modulo $p_i q_i = a_i$ property may be adapted to comprise one or more conditional identity functions. Such a conditional identity function then may be added to one or more expressions from the application software program as described herein, so that correct execution of the one or more application software program expressions depends upon the value of checksum $X_j$ calculated by checksumming guard $G_i$ during program execution. When a calculated checksum $X_j$ matches the anticipated value (i.e., original checksum $C_j$), the conditional identity function evaluates to "0" or "1," as required to maintain computational accuracy of the application software program expression selected for modification, and the application software program execution proceeds normally. When a calculated checksum $X_j$ differs from the anticipated value, the conditional identity function does not evaluate to "0" or "1" or another number or value (as required to maintain computational accuracy), resulting in a defensive action.

As was the case in the cyclic guard formation, the fact that $p_i$ and $q_i$ in a polycyclic guard formation are not known to, and not readily discoverable by, an attacker makes it difficult for the attacker to modify a checksumming guard $G_j$ and perform a corresponding modification to constant $R_{i,j}$ that maintains the $R_{i,j}{}^{X_j}$ modulo $p_i q_i = a_i$ property. A modification to a checksumming guard $G_j$ changes its checksum in a way detectable by checksumming guard $G_i$. Thus, to modify a checksumming guard $G_j$ without causing checksumming guard $G_i$ to take a defensive action upon detection of the different checksum of modified checksumming guard $G_j$, requires concurrently computing a new multiplicative inverse (modulo$(p_i-1)(q_i-1)$) of the checksum of modified checksumming guard $G_j$, which is difficult to carry out without knowing integers $p_i$, $q_i$, $(p_i-1)$, and/or $(q_i-1)$.

In a second embodiment of a polycyclic guard formation according to the present invention, an asymmetric key encryption technique comprising a public-private key pair is used. Encryption is known by those of skill in the art to be a process by which data is translated into an unintelligible form using a predefined encryption algorithm. In asymmetric key encryption the data can be encrypted and decrypted by two different "keys." In practice, one such key is made available to the public, and the other such key is held privately.

According to this second embodiment of a polycyclic guard formation, "$E(\bullet)$" denotes the public key, and "$D(\bullet)$" denotes the private key. Public key $E(\bullet)$ is stored within the application software program. Optionally, the public key $E(\bullet)$ can be stored in the program instructions comprising a checksumming guard, but this is not required. Private key $D(\bullet)$ is not stored anywhere in the application software program.

A polycyclic guard formation N according to this second embodiment comprises n guards, which in an implementation of this embodiment comprise checksumming guards $G_0$, . . . ,$G_{n-1}$. Every checksumming guard $G_i$ in polycyclic guard formation N has one or more client code blocks, and wherein each such client code block comprises at least one other checksumming guard $G_j$ in polycyclic guard formation N. The following properties apply in this second embodiment of a polycyclic guard formation:

$0 \leq i < n$
$0 \leq j < n$
$1 < n$

The set of one or more checksumming guards $G_j$ comprising the client code of a checksumming guard $G_i$ in this second embodiment of a polycyclic guard formation is called list L(i). Each checksumming guard $G_i$ is operable to compute the checksum of each client code block comprising a checksumming guard $G_j$ in list L(i). As in the first embodiment of a polycyclic guard formation according to the present invention, in this embodiment each unaltered client code bock comprising a checksumming guard $G_j$ has a specific checksum, denoted as original checksum $C_j$.

Associated with each checksumming guard $G_j$ in this second embodiment of a polycyclic guard formation is a constant $R_j$, whose value is the same as the value of original checksum $C_j$ encrypted using the private key. In equation form:

$$R_j = D(C_j)$$

During the process of installing checksumming guard $G_i$ in the application software program, the value of original checksum $C_j$ is computed. Then, constant $R_j$ is computed using the value of original checksum $C_j$ and the private key $D(\bullet)$. The value of original checksum $C_j$ and private key $D(\bullet)$ are not retained anywhere in the application software program after constant $R_j$ is computed.

Each constant $R_j$ is stored in the application software program. Each constant $R_j$ may be stored anywhere in the application software program, provided, however, that in a polycyclic guard formation at least one constant $R_j$ must be stored outside the polycyclic guard formation. In other words, at least one constant $R_j$ must not form part of the client code block of any checksumming guard $G_i$ in the polycyclic guard formation.

The operation of this second embodiment of a polycyclic guard formation according to the present invention is similar to the operation of the first embodiment. When the program instructions comprising a checksumming guard $G_i$ are executed during run-time, the checksum of the client code block comprising checksumming guard $G_j$ is calculated at least one time. The checksum of the client code block comprising checksumming guard $G_j$ calculated during program execution is denoted as calculated checksum $X_j$. Checksumming guard $G_i$ performs a conditional computation to determine if the client code block comprising checksumming guard $G_j$ has changed. If the client code block comprising checksumming guard $G_j$ is unchanged, the value of calculated checksum $X_j$ will be the same as the value of constant $R_j$ decrypted using the public key, indicating that the value of calculated checksum $X_j$ is the same as the value of original checksum $C_j$ calculated during installation of checksumming guard $G_i$. In other words, if the client code block comprising checksumming guard $G_j$ is unchanged, a conditional computation comprising the following equation holds true:

$$X_j = E(R_j)$$

If the conditional computation comprising the $X_j=E(R_j)$ equation holds true, execution of the application software program proceeds normally. However, if the client code block comprising checksumming guard $G_j$ has changed, such as, for example, through the actions of a hacker, checksum $X_j$ calculated during program execution will be different from value of constant $R_j$ decrypted using the public key, indicating that the value of calculated checksum $X_j$ is different from the value of original checksum $C_j$ calculated during installation of checksumming guard $G_i$. Thus, the conditional computation comprising the above equation will not hold true, and checksumming guard $G_i$ will take a defensive action.

Alternatively, instead of a single public-private key pair for all checksumming guards in this second embodiment of a polycyclic guard formation, a different public-private key pair could be used for each checksumming guard $G_i$ in polycyclic guard formation N. In this alternative implementation, "$E_i(\cdot)$" denotes the public key of checksumming guard $G_i$, and "$D_i(\cdot)$" denotes the private key of checksumming guard $G_i$.

According to this alternative implementation of a polycyclic guard formation, a constant $R_{i,j}$ is associated with each relationship between a checksumming guard $G_i$ and a client code block comprising a checksumming guard $G_j$. Each constant $R_{i,j}$ is calculated as follows:

$$R_{i,j} = D_i(C_j)$$

During the process of installing each checksumming guard $G_i$ in the application software program, the value of original checksum $C_j$ is computed. Then, constant $R_{i,j}$ is computed using the computed value of original checksum $C_j$ and the private key $D_i(\cdot)$. The values of original checksum $C_j$ and private key $D_i(\cdot)$ are not retained anywhere in the application software program after constant $R_{i,j}$ is computed.

Each constant $R_{i,j}$ is stored in the application software program. Each constant $R_{i,j}$ may be stored anywhere in the application software program, provided, however, that in a polycyclic guard formation at least one $R_{i,j}$ must be stored outside the polycyclic guard formation. In other words, at least one $R_{i,j}$ must not form part of the client code block of any checksumming guard $G_i$ in the polycyclic guard formation.

In operation, when the program instructions comprising a checksumming guard $G_i$ are executed during run-time, the checksum $X_j$ of the client code block comprising checksumming guard $G_j$ is calculated at least one time. Checksumming guard $G_i$ performs a conditional computation to determine if the client code block comprising checksumming guard $G_j$ has changed. If the client code block comprising checksumming guard $G_j$ is unchanged, the value of calculated checksum $X_j$ will be the same as the value of constant $R_{i,j}$ decrypted using the public key, indicating that the value of checksum $X_j$ calculated during run-time is the same as the value of original checksum $C_j$ calculated during the installation of checksumming guard $G_i$. In other words, if the client code block comprising checksumming guard $G_j$ is unchanged, a conditional computation comprising the following equation holds true:

$$X_j = E_i(R_{i,j})$$

If the conditional computation comprising the $X_j=E_i(R_{i,j})$ equation holds true, execution of the application software program proceeds normally. However, if the client code block comprising checksumming guard $G_j$ has changed, such as, for example, through the actions of a hacker, checksum $X_j$ calculated during program execution is different from original checksum $C_j$ calculated during installation of checksumming guard $G_i$. Thus, the value of calculated checksum $X_j$ is not the same as the value of constant $R_{i,j}$ decrypted using the public key. The conditional computation comprising the above equation will not hold true, and checksumming guard $G_i$ will take a defensive action.

In an implementation of this second embodiment of a polycyclic guard formation according to the present invention, each comparison of calculated checksum $X_j$ to decrypted constant $R_j$ (or $R_{i,j}$ as the case may be) may be adapted to comprise one or more conditional identity functions. Such a conditional identity function then may be added to one or more expressions from the application software program as described herein, so that correct execution of the one or more application software program expressions depends upon the value of checksum $X_j$ calculated by checksumming guard $G_i$ during program execution. When a calculated checksum $X_j$ matches the anticipated value (i.e., original checksum $C_j$), the conditional identity function evaluates to "0" or "1," as required to maintain computational accuracy of the application software program expression selected for modification, and the application software program execution proceeds normally. When a calculated checksum $X_j$ differs from the anticipated value, the conditional identity function does not evaluate to "0" or "1" or another number or value (as required to maintain computational accuracy), resulting in a defensive action.

In this second embodiment of a polycyclic guard formation according to the present invention, it is necessary for the value of original checksum $C_j$ and calculated checksum $X_j$ to be computed using a one-way function, such as, for example, a one-way hash function. If checksumming is not performed using a one-way function, a hacker can replace $R_j$ (or $R_{i,j}$ as the case may be) by a random number r of his choice. Thus, random number r could be used in place of $D(C_j)$. Then the hacker could manipulate the client code block of checksumming guard $G_i$ until its calculated checksum $X_j$ equals $E(r)$, such as, for example, by adding or subtracting bits in the checksummed client code block, and/or by the use of other manipulation techniques as would occur to those of ordinary skill in the art. Manipulating the client code block of a checksumming guard $G_i$ until calculated checksum $X_j$ equals the targeted E(r) becomes impossible if calculated checksum $X_j$ is computed using a one-way function, because changes to the client code block of a checksumming guard $G_i$ may not result in proportionate changes to calculated checksum $X_j$.

It is within the scope of the present invention that a network of guards may be dynamically determined at the time of program execution. Accordingly, the appearance of a network of guards in a particular copy of an application software program may change from one execution of the application software program to the next. Thus, a hacker observing operation of the copy of the application software program will have difficulty identifying and defeating all guards present in the program.

According to an embodiment of a dynamically determined network of guards, list L(i) comprises the set of one or more checksumming guards $G_j$ comprising the client code of a checksumming guard $G_i$. Checksumming guard $G_i$ is operable to compute the checksum of one or more client code blocks comprising a checksumming guard $G_j$ in list L(i). At run-time, a subset of list L(i) comprising one or more (but preferably fewer than all) checksumming guards $G_j$ of list L(i) is selected for protection by checksumming guard $G_i$. In other words, the program instructions of checksumming guard $G_i$ calculate checksums of only the client code blocks comprising those checksumming guards $G_j$ of list L(i) selected at run-time, and then perform one or more conditional computations using one or more of the values of the calculated checksums.

In a first embodiment of an application software program comprising a dynamically determined network of guards, prior to program execution the program code of the application software program comprises a plurality of checksumming guards $G_i$. Prior to program execution, the program code of each checksumming guard $G_i$ comprises the ability to calculate checksums of all checksumming guards $G_j$ of list L(i), and to perform conditional computations using the calculated checksums. However, in this first embodiment of an application software program adapted to dynamically determine a network of guards, the program code of the application software program also comprises one or more conditional instructions which "disable" certain program instructions based on, for example, the presence, absence, or value of a certain variable. The disabled program instructions comprise those program instructions which otherwise would have caused checksumming guard $G_i$ to calculate checksums of certain checksumming guards $G_j$ of list L(i), and to perform conditional computations using the calculated checksums.

In a second embodiment of an application software program comprising a dynamically determined network of guards, prior to program execution the program code of the application software program also comprises a plurality of checksumming guards $G_i$. However, prior to program execution, the program code of each checksumming guard $G_i$ does not have the ability to calculate checksums of all checksumming guards $G_j$ of list L(i), or to perform conditional computations using the calculated checksums. However, in this second embodiment of an application software program adapted to dynamically determine a network of guards, the program code of the application software program also comprises one or more conditional instructions which "activate" certain program instructions based on, for example, the presence, absence, or value of a certain variable. The activated program instructions comprise those program instructions that cause checksumming guard $G_i$ to calculate checksums of certain checksumming guards $G_j$ of list L(i) and to perform conditional computations using the calculated checksums.

Although the operation of dynamic networks of guards is discussed herein in terms of "disabled" and "active" checksumming guards, the program instructions comprising every checksumming guard (whether disabled or active) in the application software program remains present in each copy of the application software program.

Figure 9D:
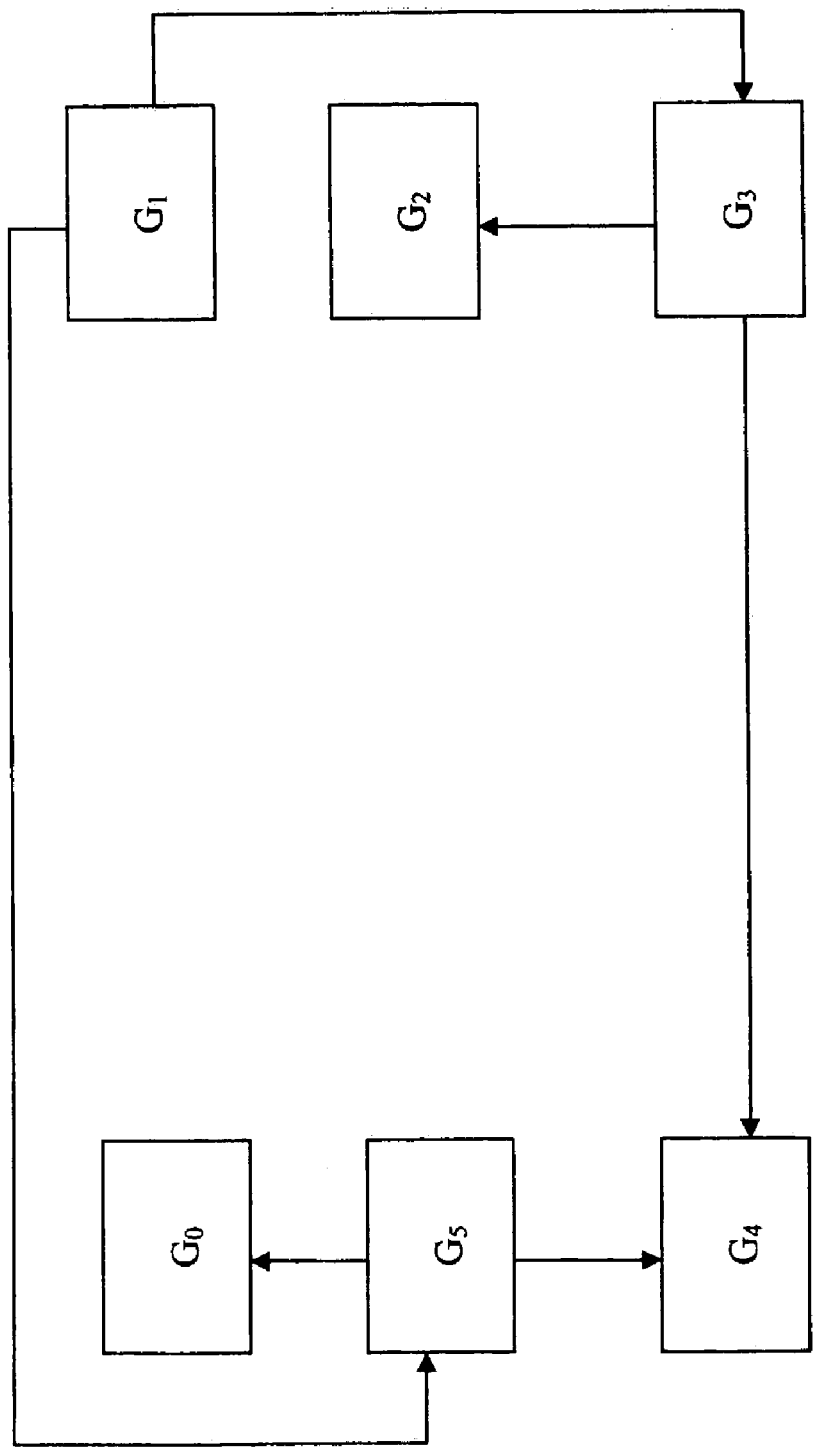
Figure 9E:
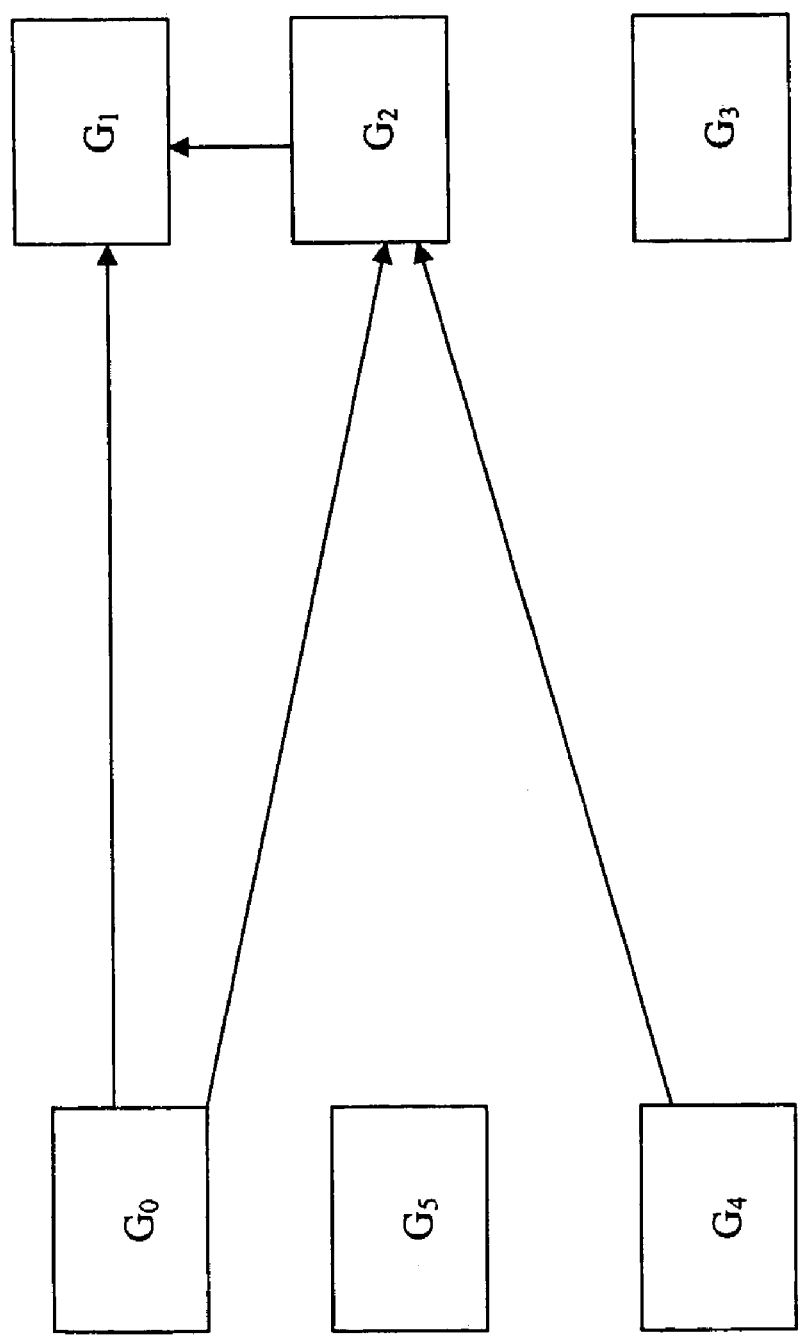
Figure 9F:
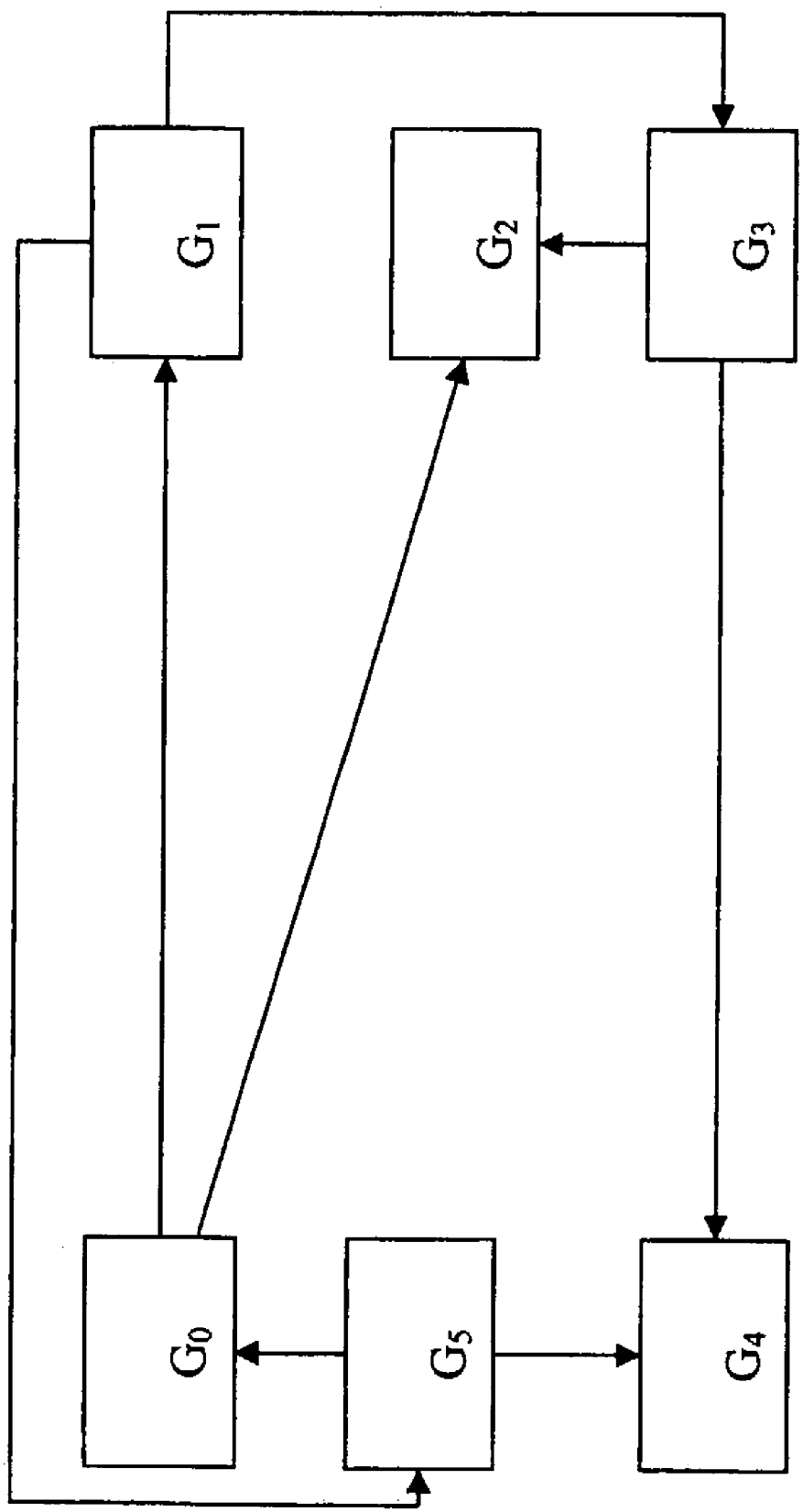

Examples of dynamically determined networks of guards can be shown by reference to FIGS. 9C-F. FIG. 9C shows a diagrammatic example of a network of guards according to the present invention comprising six guards. In an implementation of the network of guards shown in FIG. 9C, the guards comprise checksumming guards. FIGS. 9D-F each show a diagrammatic example of a dynamically determined network of guards according to the present invention, based on the network of guards shown in FIG. 9C.

A simple example of the implementation of a dynamic network of guards is shown in FIGS. 9D-E. The implementation of the network of guards shown in FIG. 9D is the inverse of the implementation of the network of guards shown in FIG. 9E. Thus, in the implementation of the network of guards shown in FIG. 9D, checksumming guards $G_0$, $G_2$, and $G_4$ are disabled, leaving checksumming guards $G_1$, $G_3$, and $G_5$ as the remaining active guards in the network. In the implementation of the network of guards shown in FIG. 9E, checksumming guards $G_1$, $G_3$, and $G_5$ are disabled, leaving checksumming guards $G_0$, $G_2$, and $G_4$ as the remaining active guards in the network. As shown in FIGS. 9D-E, the disabled guards remain in the application software program, but their program instructions are not executed.

In an implementation of a dynamic network of guards according to FIGS. 9D-E, the means for selecting the guard formation of FIG. 9D versus the guard formation of FIG. 9E is contained in the program code of the application software program. For example, the application software program may comprise a Boolean variable, the value of which is "true" (or "1") under certain conditions, and is "false" (or "0") under other conditions. The value of the Boolean variable may control whether the network of guards according to FIG. 9D, or the network of guards according to FIG. 9E, is selected during execution of the application software program. For example, if the Boolean variable evaluates to "true," the guard network of FIG. 9D is selected, and if the Boolean variable evaluates to "false," the guard network of FIG. 9E is selected. In an embodiment, the evaluation is performed only one time during execution of the application software program, before the program instructions comprising any of the guards in the guard formation are executed. Thus, the selected guard formation is static for the remainder of the execution of the application software program n this embodiment.

The use of a Boolean variable is merely one example of a process for dynamically determining a network of guards. In another example, the application may contain a sine function whose output based on a given angle controls the dynamic network of guards. For example, if $\sin(x) \leq -0.5$, a first network of guards is used; if $-0.5 < \sin(x) \leq 0.5$, a second network of guards is used; if $\sin(x) > 0.5$, a third network of guards is used.

In another example, in an application software program comprising a computer game, the player may be required to move to the left or to the right (or up/down, forward/ backward, etc.). It is known to use a global variable to capture leftward or rightward movement. A dynamically determined network of guards according to the present invention may determine which guards to disable or activate based on the value of this movement variable.

The means for controlling the dynamic determination of a network of guards can differ from one application software program to the next, or from one implementation of a dynamic network of guards in an application software program to the next. Any variable in an application software program whose value is subject to change randomly or pseudo-randomly is a good candidate for a variable to control a dynamically determined network of guards. In addition, a variable may comprise an input to an algorithm which controls the dynamically determined network of guards.

FIG. 9F shows another example of a dynamically determined network of guards according to the present invention, based on the network of guards shown in FIG. 9C. Based on, for example, the presence, absence, or value of a certain variable, or based on the result of a certain function, checksumming guards $G_2$ and $G_4$ are disabled in the implementation of the network of guards shown in FIG. 9F.

Repair guards according to the present invention also may be adapted to be dynamically determined. In an embodiment of dynamically determined repair guards, two or more repair guards are adapted so that a repair involves actions that change dynamically, but that cumulatively amount to the same repair. For example, a network of guards may comprise two or more repair guards, each of which comprises the ability to overwrite a client code block in the application software program with one of a plurality of repair code blocks. In operation, the application software program is adapted so that the repair code block(s) which overwrite client code within the application software program are randomly selected, but cumulative operation of the randomly selected repair code blocks amounts to the full repair of the client code block.

In an exemplary implementation of dynamically determined repair guards, the desired code repair in an application software program consists of adding 7 to an important constant in the program before the constant is used. A first repair guard has a first repair code block which comprises overwriting the client code block in the application software program so that a variable x is added to the important constant. The value of variable x changes with each execution of the application software program. A second repair guard has a first repair code block which comprises overwriting the client code block in the application software program in a manner that "7−x" is added to the important constant. Both repair guards are executed in concert, and the cumulative effect of this repair is that "x+7−x" is added to the important constant, thus initializing the constant to the desired value.

In an adaptation of this example, the first repair guard also has a second repair code block which comprises overwriting the client code block in the application software program so that 7 added directly to the important constant (no variables are used). The second repair guard also has a second repair code block comprising a null operation. Again, both repair guards are executed in concert, and the cumulative effect of this repair is that 7 is added to the important constant, initializing the constant to the desired value. Alternatively, the application software program may be adapted so that when the second repair code block of the first repair guard is selected, the second repair guard is not executed. The result again is that 7 is added to the important constant in the program before the constant is used.

An application software program may be adapted so that the repair code block(s) which overwrite client code within the application software program are randomly selected from a group of repair code block(s) in a way that results in the repair guards operating in a concerted manner to accomplished a desired repair.

Multithreaded application software programs also may be adapted to comprise dynamically determined repair guards. For example, in a first execution a repair could be accomplished by a first repair guard, and in a second execution a repair could be accomplished by a second guard.

FIG. 9G shows another example of a network of guards according to the present invention. In the network of guards shown in FIG. 9G, two security-sensitive regions of an application software program, labeled as "C1" and "C2," are protected by both checksumming guards and repair guards. Part (a) of FIG. 9G shows a computer memory image of the application software program in which regions C1 and C2 are guarded by guards G1, G2, G3, G4, and G5. Guards G1, G4, and G5 are checksumming guards, and guards G2 and G3 are repair guards.

This network of guards is alternatively depicted in a guard graph shown in part (b) of FIG. 9G. The dependencies between and among guards G1, G2, G3, G4, and G5, and regions C1 and C2 can be understood by analyzing the arrows ("→") shown in part (b) of FIG. 9G. Accordingly, region C1 is repaired by repair guard G3 before region C1 executes. The repaired region C1 subsequently will be checksummed by checksumming guards G1 and G5. However, repair guard G2 must repair checksumming guard G5 before checksumming guard G5 executes.

In operation, a network of guards must appear in the execution flow of an application software program in an appropriate way. For example, a repair guard has to be inserted into a point in the execution flow that is to be reached first (in execution order) before its client code block is reached. In other words, a repair guard "dominates" its client code in their respective execution flow locations. Similarly, a checksumming guard must appear in the execution flow of an application software program at a point where its client code already is present in computer memory. Thus, the client code block of a checksumming guard dominates the checksumming guard in their respective execution flow locations.

Figure 9H:
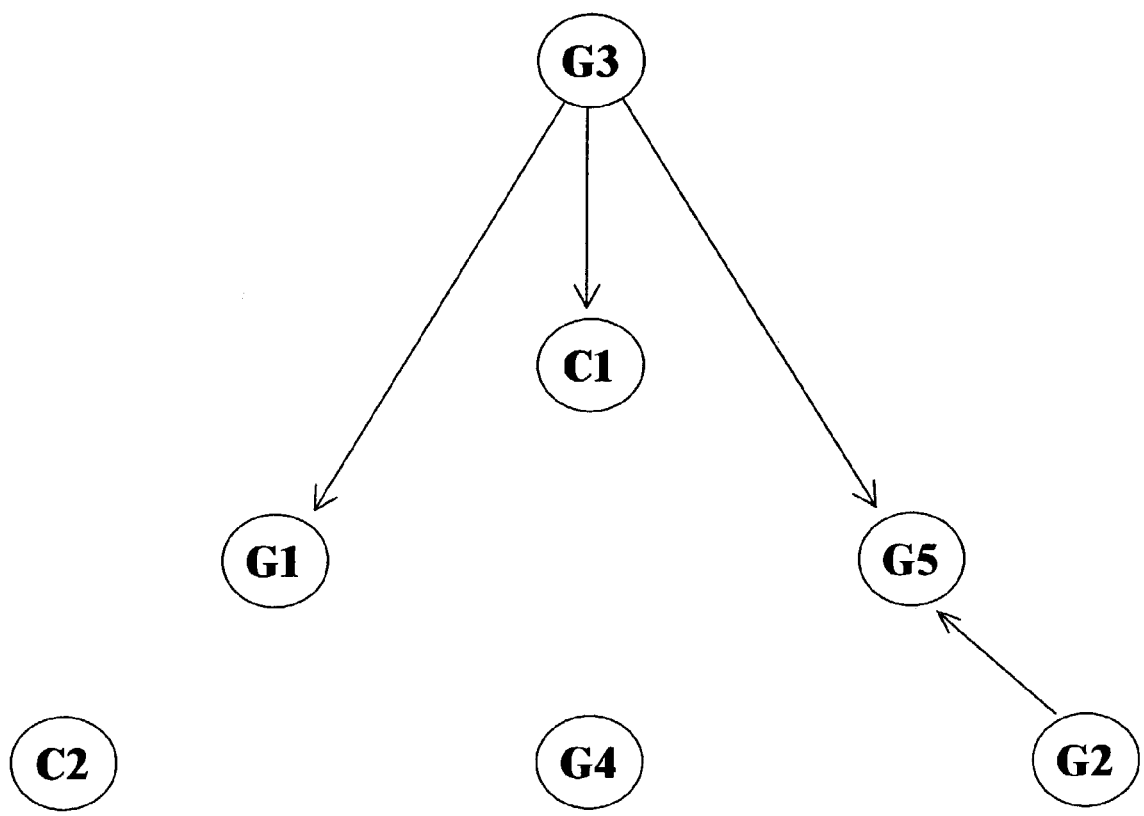
Figure 9I:
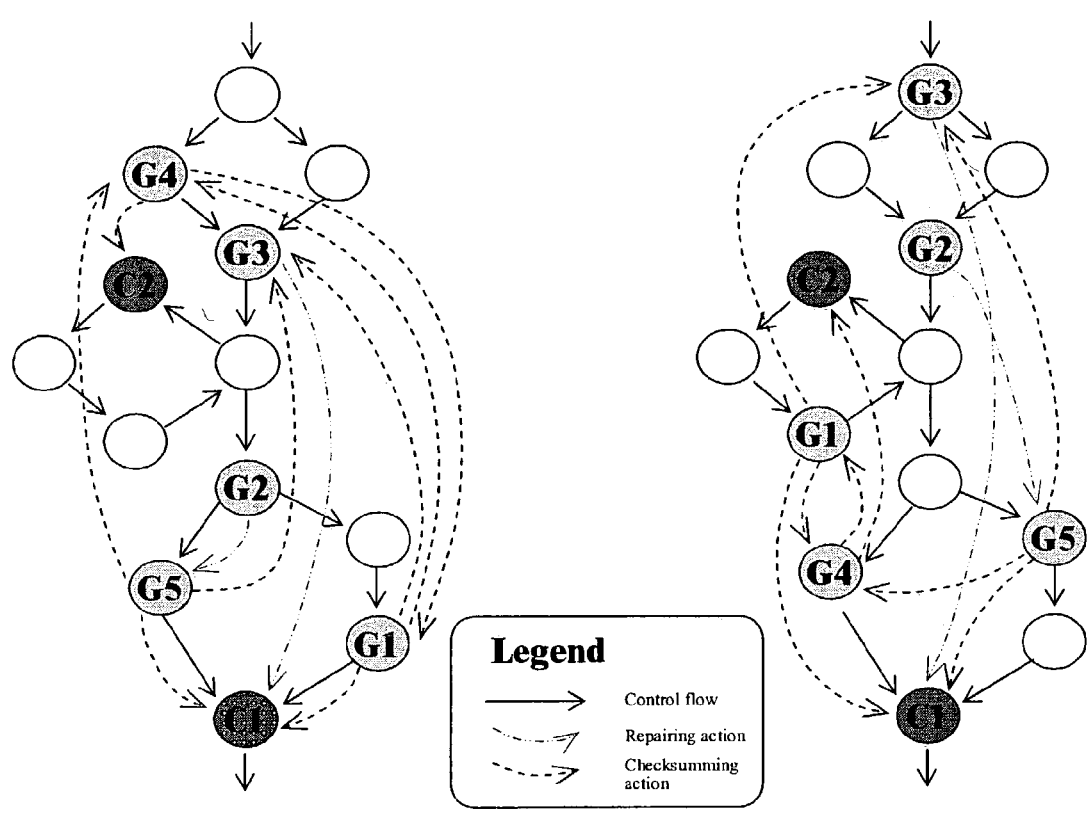

FIG. 9H shows a partial guard graph that depicts the dominance relationships between different pairs of the nodes shown in part (b) of FIG. 9G. Dominance is shown by the direction of the arrows in FIG. 9H. Thus, "G3→G1" means the location of repair guard G3 dominates that of checksumming guard G1. FIG. 9I shows two possible scenarios in which the network of guards can be installed into the execution flow of an application software program without violating the partial ordering of their executions specified in FIG. 9H. The larger an application software program, the more ways there are to deploy a network of guards.

A software program protection scheme relying entirely on one guard or on a distributed network of guards is vulnerable to a collusion attack, in which two or more similarly protected copies of the application software program are compared instruction-by-instruction. Any differences in the code will signal possible presence of a guard. To thwart such attacks, the application software program code may be disguised.

The technique of code disguise is a method that, given a valid software program, rearranges or otherwise modifies the software program to produce another valid and functionally equivalent software program that is difficult to understand and analyze; and that is also becomes guarded against tampering. Simple obfuscating transformations such as register reallocation and reshuffling of instructions and/or basic blocks have limited effectiveness. These transformations tend to produce local changes to the code, while leaving the global control flow patterns almost intact. Local changes which maintain the same global control flow patterns make code deobfuscation, the reverse transformation of code obfuscation, and similar analyses of the code almost as easy as before obfuscation. Effective code disguise therefore requires more aggressive methods than obfuscation for rendering the code unintelligible.

A technique for obfuscating application software program code comprising guards involves the use of mathematical identities. For example, given the same input, two different mathematical expressions may provide the same output value. Thus, they can be substituted for one another with no loss of computational accuracy. In another example, a result of a first mathematical expression may be used in a second mathematical expression without affecting the computational accuracy of the second mathematical expression. However, the second mathematical expression is made more difficult to analyze.

This technique can be demonstrated by an example based on the following sample pseudocode segment previously introduced herein:

```
1        F = 0
2        Compute X1
3        Compute X
4        F = 1
5        If (X = TRUE) Go To L
6        Take Defensive Action
7    L   If (F = 0) Go To L1
8        V = Z * (A*Z + B) + 72     //sample computation of V
9        Y1 = X1−T1
10       V = V+Y1
11   L1  Continue
```

To disguise the guarding contained in this sample pseudocode segment, an identity function I(Z,Z1) is introduced. The identity function I(Z,Z1) evaluates to 0 when Z=Z1. Accordingly, such an identity function may be a simple expression such as I(Z,Z1)=Z1−Z. Alternatively, such an identity function may comprise a complex algorithm having thousands of lines of software program code.

To illustrate disguise using an identity function, the pseudocode expression shown at line 9 in the above pseudocode segment is replaced by Y1=I(T1,X1)*F in the following example. The resulting pseudocode segment is as follows:

```
1        F = 0
2        Compute X1
3        Compute X
4        F = 1
5        If (X = TRUE) Go To L
6        Take Defensive Action
7    L   If (F = 0) Go To L1
8        V = Z * (A*Z + B) + 72     //sample computation of V
9        Y1 = I(T1,X1) * F
10       V = V+Y1
11   L1  Continue
```

In this pseudocode segment, Y1 will equal 0 if either the value of F is 0 (i.e., the pseudocode program instruction shown as line 4 has not been executed) or if identity function I(T1,X1) evaluates to 0 (i.e., the pseudocode program instruction shown at line 2 has been executed and variable X1 equals the expected value T1). Note, however, that if the value of F is 0, execution of the pseudocode program instruction shown at line 7 causes the computation of Y1 at line 9 to be skipped. The application software program does not execute properly unless the value of F is incremented properly. The use of variable X1 in identity function I(T1, X1) illustrates a silent guard according to the present invention. The application software program does not execute properly unless the value of variable X1 equals the expected value T1. The value of variable X1 will not equal the expected value T1 if the client code block comprising variable X1 has been altered.

If Y1=0, then the value of program variable V does not change in the computation shown as line 10. However, if Y1≠0, the computation of program variable V at line 10 will result in an inaccurate value for program variable V.

The purpose of using an identity function to disguise the guarding scheme is twofold. First, there is no test to identify a possible point of failure. Unlike an explicit conditional branching or conditional jump statement which may be relatively easy to detect by a hacker, the operation of a mathematical identify function according to the present invention is implicit. Thus, the use of mathematical identities may be less readily detectable.

Second, because the identity function I(T1,X1) may comprise a large number of lines of program code, such code disguises the calculation of program variable V. Indeed, although the computation of program variable V is shown in the above pseudocode list as occurring prior to the computation of variable Y1, where identity function I(T1,X1) comprises a plurality of lines of program code, the expression(s) computing program variable V may be interleaved among the plurality of lines of program code comprising identity function I(T1,X1).

Flag variable F also can be disguised using an identity relationship. In one example, a new variable R is introduced. Variable R is initialized to a random value. Flag variable F is initialized to be equal to R. Variable R and flag variable F then are subjected to one or more, computations, with the result remaining that the value of flag variable F is 1 after the guard code (beginning at label G) is executed. In one example, the pseudocode segment from the previous example is adapted as follows:

```
1        R = random value
2        F = R
3        Compute X1
4        Compute X
5        R = F² − F*R
6        F = R + 1
7        If (X = TRUE) Go To L
8        Take Defensive Action
9    L   If (F = 0) Go To L1
10       V = Z * (A*Z + B) + 72     //sample computation of V
11       Y1 = I(T1,X1)*F
12       V = V+Y1
13   L1  Continue
```

It will be appreciate that execution of the pseudocode program instructions shown as lines 1, 2, and 5 in the above pseudocode segment results in the value of variable R being 0. Accordingly, the value of flag variable F computed at line 6 in the pseudocode segment results in the value of flag variable F being 1.

Further disguise may be accomplished by cascading guards. "Cascading" identifies a guard installation scheme wherein the program instructions of a first guard compute certain components used in a second guard. The cascading disguise technique may be used alone or in combination with other disguise and guarding technique(s).

Disguising a guarding scheme by the use of cascading guards can be demonstrated by the following example, using the same sample pseudocode segment used elsewhere herein. In this example, identity function I(T1,X1) comprises two sub-functions, S1(T1,X1) and S2(T1,X1), which have expected values S1true and S2true, respectively. S1(T1,X1) evaluates to S1true if T1=X1. S2(T1,X1) evaluates to S2true under the same conditions. Identity function I(T1,X1) evaluates to 0 only if T1=X1, S1(T1,X1)=S1true, and S2(T1,X1)=S2true.

For additional disguise, three more identity functions, I2(x), I3(x), and I4(x), are introduced in this example. The identity function I2(x) evaluates to 1 for any input x. The identity function I3(x) evaluates to 0 for any input x. The identity function I4(x) evaluates to 0 for any input x. Finally, a second flag variable F2 is introduced. The purpose of flag variable F2 is to record whether this portion of the application software program has been executed. The sample pseudocode segment is as follows:

```
1       F = 0
2       Compute X1
3       Compute X
4       F = 1
5       If (X = TRUE) Go To L
6       Take Defensive Action
7    L  If (F = 0) Go To L1
8       V1 = S1(T1,X1)
9       V = Z * (A*Z + B) + 72      //sample computation of V
10      V2 = S2(T1,X1)
11      Y1 = I(V1,V2,T1,X1) * F
12      V1 = I2(V)*V1
13      V = V + Y1
14      V2 = I3(Y1) + V2
15      V = V + I4(V1)
16      F2 = I2(V2)
17   L1 Continue
```

Note that even though this pseudocode segment is longer than before, the value of program variable V computed by the pseudocode segment is unchanged.

Cascading of guards arises in this example through the use of the computed values V1 and V2 elsewhere in the application software program, but only if the value of flag variable. F2 is 1 (indicating that the preceding pseudocode segment was executed and values V1 and V2 were computed). The computed values of variables V1 and V2 then can be compared to the expected values S1true and S2true, respectively. The following pseudocode segment illustrates this principle:

```
1       F = 0
2       F2 = 0
3       Compute X1
4       Compute X
5       F = 1
6       If (X = TRUE) Go To L
7       Take Defensive Action
8    L  If (F = 0) Go To L1
9       V1 =S1(T1,X1)
10      V = Z * (A*Z + B) + 72      //sample computation of V
11      V2 = S2(T1,X1)
12      Y1 =I(V1,V2,T1,X1) * F
13      V1 = I2(V)*V1
14      V = V + Y1
15      V2 = I3(Y1) + V2
16      V = V + I4(V1)
17      F2 = I2(V2)
18   L1 Continue
19   L2 If(F2 = 0) Go To L3
20      Y2 = I(V1,S1true)
21      V3 = Z1 * (A*Z1 + B) + 27   //sample computation of V3
22      Y3 = I(V2,S2true)
23      V3 = V3+Y2+Y3
24   L3 Continue
```

It is desired in this example to calculate the value of program variable V3 at line 23. Note that correct computation of program variable V3 relies in part on the proper execution of the pseudocode program instructions shown at lines 3, 4, 9, 11, 13, 15, and 17. In turn, the proper execution of the pseudocode program instructions shown at lines 3 and 4 depend on the integrity of the computation of variables X1 and X, respectively. This process can be repeated to further entangle the descendents of the guard code with the program code. This further ties the guard code to the program as well as aiding in the detection of tampering.

Other program instructions may be interspersed between pseudocode program instructions shown above to be adjacent without affecting the output of the pseudocode segment. For example, the pseudocode program instruction of line 19 above (identified by label "L2") need not be located immediately after the pseudocode program instruction of line 18. Likewise, any of the other pseudocode program instructions shown above to be adjacent may, when implemented as program instructions in a programming language, be separated by one or more other program instructions.

The foregoing example of cascading guards according to the present invention also illustrates a feature of the present invention called "code swell." Code swell comprises a process for software program disguise comprising replacing a single program instruction with multiple instructions that provide an equivalent computation. It is a generalization of the idea of a mathematical identity to that of a computational identity.

As discussed previously herein, silent guarding can involve comparing an expected value of a variable with the value of the same variable computed at run-time. For example, if an application software program comprises a password p whose value should be 81, a simple silent guard according to the present invention may comprise variable t whose value is calculated as $\sqrt{p}$. Accordingly, the expected value of variable t is computed as $t=\sqrt{81}=9$. Note that only the expected value of variable t is stored in the application software program, and not the expected value of password p. At run-time, the password p entered by a user of the application software program is tested for validity by comparing the expected value of t and the computed value $\sqrt{p}$. If the password p entered is 81, then $t=\sqrt{p}=9$, and application software program operation proceeds normally. If not, the silent guard comprising variable t takes a defensive action.

An application of code swell to this simple example follows. It is known in the art that the following equation is true for any non-negative integer x:

$$(x+1)^2-x^2-2x=1$$

A practitioner of code swell according to the present invention may substitute variable t into the above equation as follows:

$$(t+1)^2-t^2-2t=1$$

This equation then may be adapted for the present example by inserting the following program instructions into the application software program:

$$t=\sqrt{p}$$

$$v=(t+1)^2-t^2-18$$

$$x=x*v$$

where x is a program variable used in the application software program. Note that if p=81, then V=1 and the value of program variable x is computed correctly. However, if p≠81, then v≠1. If v≠1, the value of program variable x is computed incorrectly, and the program is corrupted. The expression x=x*v is an example of a conditional computation.

The calculation of variable t in this example (i.e., the expression $t=\sqrt{p}$) is performed in advance of the code swell (i.e., before the expression $v=(t+1)_2t^2-18$). Preferably, the calculation of variable t is separated from the code swell expression by one or more other program instructions so as to hide and camouflage the connection between the silent guard and the variable it is guarding.

Code swell also is useful in a more complex context, where several program variables are involved in a much larger code swell. Two program variables are used in this example: x and y. Program variable y is in current use. It is desired to compute x=y. One example of code swell (without guarding) using a computational identify is as follows:
  a, b, c, d are program variables selected arbitrarily
  $a_{11}, a_{12}, a_{21}, a_{22}$, v, w are new variables introduced for use in the code swell
  $c_1, c_2, r_1, r_2$ are generated constants where $$1 \leq c_1, c_2 \leq 20$$

$$0 < r_1, r_2 < 1$$

The code swell computation is then:

$$a_{11}=c_1+a^2+b^2$$

$$a_{12}=r_1a^2+(1-r_1)b^2$$

$$a_{21}=r_2c^2+(1-r_2)d^2$$

$$a_{22}=c_1+c^2+d^2$$

$$v=(a_{11}+a_{12})*y$$

$$w=(a_{21}+a_{22})*y$$

Next, the following system of two linear equations is solved for x and y using standard codes for Gauss elimination (or Cramer's Rule):

$$a_{11}*x+a_{12}*y=v$$

$$a_{21}*x+a_{22}*y=w$$

If this computation is expressed in 3-address code, it may transform the simple expression x=y into more than 20 program instructions. Further, there may be multiple uses of the variables a, b, c, d and quantities derived from them in the application software program. For example, if variable b has an expected value (e.g., it operates as a silent guard variable or a checksumming guard checksum), then that value can be substituted into the code swell at some point. Thus, if the application software program has been tampered with such that the value of the variable b is incorrect, the computation of x is corrupted and the application software program fails in a mysterious way.

The code swell disguise method has at least four beneficial properties to aid in tamperproofing.
  It expands x=y (and similar simple expressions) into a large number of program instructions to help disguise the application software program code.
  It ties several program variables (e.g., a, b, c, d in the above example) into computation of variable x to further disguise and protect the application software program. This may be especially useful to thwart attack techniques comprising variable tracing.
  It provides many opportunities for guards. In the above example, it is possible that one or more of the variables a, b, c and d could be silent guard variables or checksumming guard checksums.
  There are a huge number of variations of this single code swell so that a practitioner never has to use the same exact form twice. These variations can be generated randomly and automatically by the system of the present invention.

The CFG of a software program is a static representation of all possible execution flows of the software program that may occur during program execution. A statically known and structured CFG usually leads to a more accurate analysis and thus a better understanding of the software program. For example, as discussed by Cifuentes in an article entitled, "Structuring Decompiled Graphs," published in *Proceedings of the International Conference on Compiler Construction*, pages 91-105, Linkoping, Sweden, 1996, a structured assembly language software program produced from a source code written in a high-level software programming language such as C, can be decompiled back to a corresponding C language software program, permitting better interpretation of the code. In cases where decompilation is impossible, aggressive automated software program analysis based on the statically known CFG still is possible using methods discussed by Larus in an article entitled, "Whole Program Paths," published in *SIGPLAN PLDI*, May 1999; and by Larus et al. in an article entitled, "EEL: Machine-Independent Executable Editing," published in *SIGPLAN PLDI*, June 1995. To frustrate software program analysis and understanding, the CFG must be unstructured and made statically unintelligible.

In addition to a well structured and obvious control flow, assembly language code produced by compilers for high-level software programming languages possesses two other disadvantages. The first disadvantage arises from the fact that such assembly language code produced by such compilers is very likely to contain many code segments of certain idiomatic patterns which may provide hints to understanding the CFG. For example, the GNU GCC compiler produces the same segments of code for enclosing each function body:

```
// entry
pushl    %ebp              // save old stack frame pointer
movl     %esp, %ebp        // allocate new frame
subl     <const>, %esp     // allocate local variables
...
// exit
```

-continued

| leave | // deallocate local vars & frame |
| ret | // return to caller |

Similarly, each function call site is coded in another familiar code pattern:

```
// call site of f
push1      <value1>        // push arg1 into stack
...
push1      <valueN>        // push argN into stack
call       f               // call the function
add1       <4xN>, %esp     // restore stack after call
```

These patterns expose the functionality of the software program, allowing a hacker to dissect the code one subroutine at a time.

The second disadvantage of such assembly language code arises from the fact that assembly language code compiled from high-level source code usually has fixed notation for stack variables, for example, base register plus offset. This notation to some degree preserves the integrity of corresponding variables in the high-level source code. For example, the assembly language code segment below identifies the uses and/or definitions of its variables:

// b = a * (a + b)
mov1 −4(%ebp), %eax // % eax := a
add1 −8(%ebp), % eax // % eax := % eax + b
imul −4(%ebp), %eax // % eax :=% eax * a
mov1 %eax, −8(%ebp) // b := %eax A first, a second, and a third new assembly language software code disguise technique are disclosed herein. The first new disguise technique is called "CFG-merging." The second new disguise technique is called "CFG-cloning." The third new disguise technique is called "data-aliasing." The new disguise techniques will produce unintelligible code and facilitate self-protection by: (a) reducing idiomatic code patterns in the code through the use of CFG-merging; (b) destroying modularity of subroutines through the use of CFG-merging; (c) creating new, nondeterministic control flows through the use of CFG-cloning; (d) blurring variable boundaries through the use of data-aliasing; (e) concealing constant data values in the assembly language code through the use of data-aliasing; and (f) as a result of the foregoing techniques, building a network of inter-dependent data values throughout the code, thereby allowing guards to take a defensive action due to corruption in any part of the network, the defensive action inducing errors that are more likely to be global and subtle.

Figure 10:
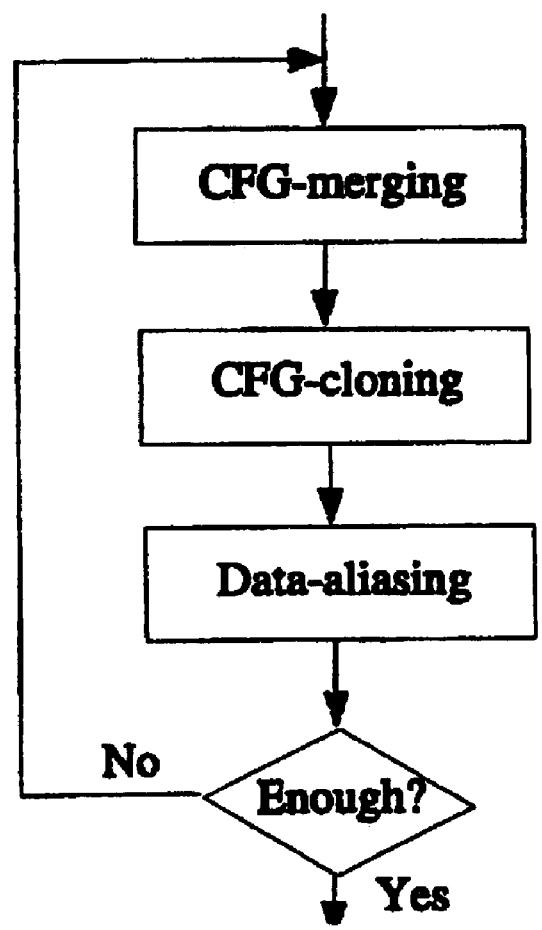
FIG. 10 shows a flowchart illustrating an embodiment of the assembly language code disguise process according to the present invention.

The first, second, and third new disguise techniques may be used individually. Alternatively, any two of the three new disguise techniques may be used in combination. An additional alternative may be the use of all three new disguise techniques in combination. Repetitive use of the new disguise techniques on the application software program assembly language code may enhance the level of disguise and protection achieved. One embodiment of the code disguise process of the present invention is comprised of discrete applications of the three techniques on the code for a certain number of cycles. FIG. 10 shows a flowchart illustrating this embodiment of the code disguise process according to the present invention.

Techniques of code obfuscation applicable to high-level programming languages such as Java and C are known in the art. According to Mambo et al., techniques of code obfuscation in assembly language code remain scarce. The present invention includes three simple yet effective code disguise techniques for assembly language software programs. In addition, these three techniques can provide guarding capabilities for assembly language software programs.

Generally, binary executable code or object code may be used as application software program code provided the binary executable code or the object code does not base its computations on fixed absolute addresses. Nonetheless, if the binary executable code or the object code bases its computations on fixed absolute addresses, the binary executable code or the object code still may be used as application software program code if the binary executable code or the object code is converted to a form in which the dependence on the use of fixed absolute addresses is eliminated.

Figure 11:
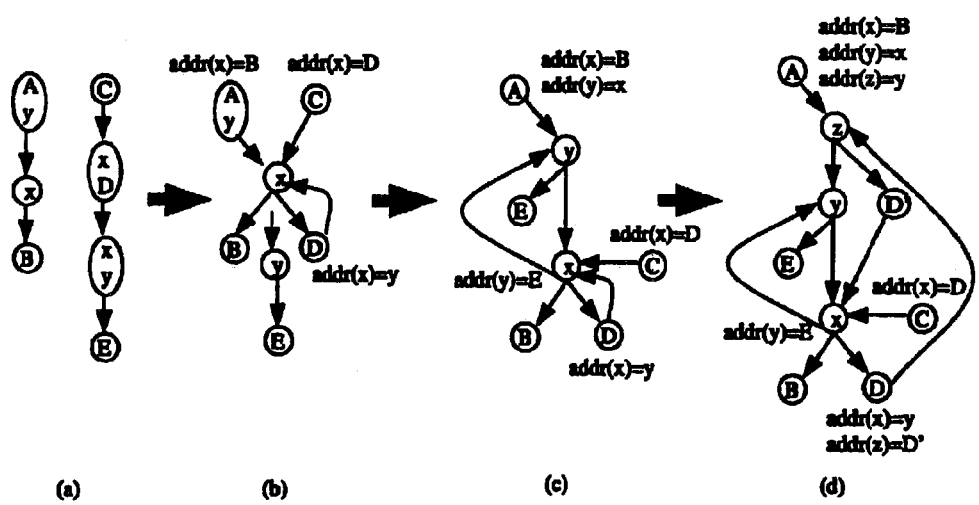
FIG. 11 shows the merging process of two unrelated flows in a simple CFG according to the present invention.

The first assembly language software code disguise technique is called CFG-merging. CFG-merging involves changes to the original CFG which force unrelated control flows to converge, thereby creating merge points at which different data values mix together. FIG. 11 shows the merging process of two unrelated flows in a simple CFG according to the CFG-merging assembly language software code disguise technique of the present invention. From part (a) to part (c) of FIG. 11, merging occurs among the x's and y's, respectively. In part (d) of FIG. 11, merging occurs between the edge from nodes A to y and an internal edge in node D. Pre-assignments of jump target addresses in the merged nodes are illustrated. The resulting CFG is very different from the original.

Figure 12:
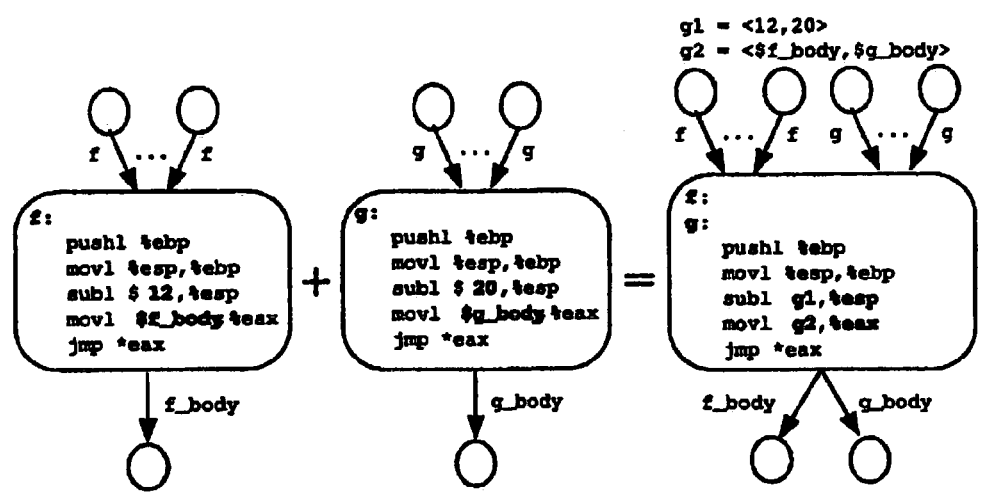
FIG. 12 shows two basic blocks being merged according to the present invention.

CFG-merging works by combining similar intra-block code segments of the assembly language software program together. Different code segments are considered "similar" if they are empty code segments that contain no program instructions, or if they are code segments that have the same program instructions with same variables in the same order. The variables may have the same or different immediate values at corresponding positions. FIG. 12 shows two basic blocks being merged according to the CFG-merging assembly language software code disguise technique of the present invention, wherein the conflicting set of immediate values is replaced by a variable initialized to hold the values in the different paths that lead to the same basic block. A set or vector of corresponding immediate values, one from each segment, are said to be in "conflict" if at least one pair of the values are different.

The CFG-merging assembly language software code disguise technique of the present invention consists of a first and a second phase of code merging. In the first phase of code merging, similar idiomatic code segments produced by typical compilers are merged. In the second phase of code merging, similar segments of the code resulting from the first phase of code merging are merged in a randomized manner.

After multiple iterations of the first and second phase of code merging, the resulting code and CFG look very different from the original. For example, FIGS. 13A-B shows the sample application software program code from FIGS. 7A-B after two code blocks from FIGS. 7A-B have been merged. The two code blocks to be merged are the code blocks comprising the first four instructions in basic block "main," shown in FIG. 7A as lines 2 through 5, and the first four instructions in basic block "pr_fact," shown in FIG. 7A as lines 34 through 37. The first step in transforming the sample application software program code from FIGS. 7A-B to the merged application software program code in FIGS. 13A-B, is to make the candidate code blocks to be merged form individual basic blocks by themselves. The basic block "main" is divided into two basic blocks, "main_1" and "main_2." The basic block "main_1" will contain the first four instructions originally contained in basic block "main," and a new, fifth instruction directing the control flow of the application software program to the next basic block to be executed. The basic block "main_2" will contain the remaining instructions from basic block "main."

Similarly, the basic block "pr_fact" is divided into two basic blocks, "pr_fact and "pr_fact_1." The basic block "pr_fact" will contain the first four instructions originally contained in basic block "pr_fact," and a new, fifth instruction directing the control flow of the application software program to the next basic block to be executed. The basic block "pr_fact_1" will contain the remaining instructions from basic block "pr_fact."

Because each candidate code block to be merged must have at least one predecessor basic block, a new basic block "main" containing only a trivial jump instruction is created and inserted in front of basic block "main_1." Having a predecessor basic block before a merged basic block ensures that data values needed in the merged basic block can be precomputed by the data precomputation methods discussed hereinafter before the final binary executable version of the merged block is created. The following shows the results of this step:

```
main:
        jmp     main_1
main_1:                         // a block to be merged
        leal    -4(%esp), %esp
        movl    %ebp, (%esp)
        movl    %esp, %ebp
        subl    $8, %esp
        jmp     main_2          // end of the block
main_2:
        leal    -8(%ebp), %eax
        leal    -4(%esp), %esp
        movl    %eax, (%esp)
        leal    -4(%esp), %esp
        movl    $str1, (%esp)
        leal    -4(%esp), %esp
        movl    $next1, (%esp)
        jmp     scanf
...
pr_fact:                        // a block to be merged
        leal    -4(%esp), %esp
        movl    %ebp, (%esp)
        movl    %esp, %ebp
        subl    $4, %esp
        jmp     pr_fact_1       // end of the block
pr_fact_1:
        // guard installation site
        movl    $100, g1
        movl    $next1, %eax
...
```

In the next step, the basic blocks "main_1" and "pr_fact" are merged, forming a new basic block with the two labels: "main_1" and "pr_fact." The merged basic block initially will contain two sets of conflicting constants, which must be resolved for proper execution of the application software program. The fourth instruction of the basic block "main_1" uses the constant value "8," while the fourth instruction of the basic block "pr_fact" uses the constant value "4." The fifth instruction of the basic block "main_1" uses the constant value "main_2," while the fifth instruction of the basic block "pr_fact" uses the constant value "pr_fact_1." The conflicts are eliminated by replacing the values "8" and the "4" in the fourth instruction of the merged basic block with the new global variable "g2," and by replacing the values "main_2" and "pr_fact_1" in the fifth instruction of the merged basic block with the new global variable "g3."

These new global variables must be initialized by the process of data precomputation so they will contain the appropriate value at time of use. In this example, the notation "g2=<8,4>" denotes that variable "g2" must contain the value "8" when the execution flow comes from a predecessor of the original basic block "main$_{13}$ 1," and that it must contain the value "4" when the execution flow comes from a predecessor of the original basic block "pr_fact". Similarly, the notation "g3=<main_2,pr_fact_1>" denotes that variable "g3" must contain the value "main_2" when the execution flow comes from a predecessor of the original basic block "main_1," and that it must contain the value "pr_fact_1" when the execution flow comes from a predecessor of the original basic block "pr_fact." The following shows the results of this interim step:

```
main:
        jmp     main_1
main_1:                         // the merged block
pr_fact:
        leal    -4(%esp), %esp
        movl    %ebp, (%esp)
        movl    %esp, %ebp
        subl    g2, %esp
        jmp     *g3             // end of the block
        // g2=<8,4>, g3=<main_2, pr_fact_1>
main_2:
        leal    -8(%ebp), %eax
        leal    -4(%esp), %esp
        movl    %eax, (%esp)
        leal    -4(%esp), %esp
        movl    $str1, (%esp)
        leal    -4(%esp), %esp
        movl    $next1, (%esp)
        jmp     scanf
...
```

The next step is to initialize the new global variables by performing data precomputation. The application software program code in FIGS. 13A-B shows an example of the finished result of the data-precomputations of global variables "g2" and "g3" according to the method of data precomputation discussed hereinafter. As shown in the newly merged basic block in FIG. 13A, an instruction has been modified, and additional instructions have been added to the code so that the global variables "g2" and "g3" will contain the proper values at time of use, and so that the program execution control flow will proceed correctly. Specifically, the instructions shown in FIG. 13A on lines 11, 13, 14, and 17, have been added to the code. The "jmp" instruction shown in FIG. 13A on line 18 has been modified.

FIGS. 14A-C shows the resulting code after last three instructions of each of the three basic blocks "next1," "main_2," and ".L98" in FIGS. 13A-B have been merged together. The newly merged basic block is shown at lines 48-59 of FIGS. 14A-B as the basic block labeled by "next1_1," "main_2_1," and ".L98_1." The process of merging these three basic blocks generally is the same as discussed above. Specifically, each set of instructions to be merged is split from its parent basic block into a new basic block. The new basic blocks are merged together. The conflicting constants are replaced by new global variables (in this case, g1 and g4). Finally, the new global variables are initialized by the process of data precomputation.

After each phase of code merging, multiple distinct control flows become coalesced at a new fusion point where the different data flows mix together. The resulting CFG usually will be a strange-looking graph within which the original execution flows are hidden. The code becomes better disguised through additional iterations of the CFG-merging technique. If the code was compiled from a high-level source code, it will be difficult for it to be decompiled back to the source code after merging the code in this manner.

Figure 15:
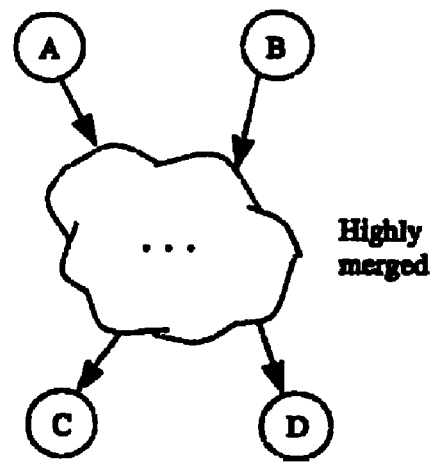
FIG. 15 shows a diagrammatic example of a control flow graph with its central portion disguised as a result of intensive merging according to the present invention.

FIG. 15 shows a diagrammatic example of a CFG with its central portion disguised as a result of intensive merging according to the present invention between the two control flows that go from A to D and from B to C, respectively. To a hacker, it is not apparent that the execution flows from A to D. However, the present invention requires that such flow information from the original CFG be preserved and known, despite the many rounds of merging that may have drastically changed the graph. If such flow information is not preserved, the cost of analyzing and disguising the code may grow at an exponential rate.

Figure 16:
FIG. 16 shows a diagrammatic example of a single link-node contained in a basic block of an original CFG according to the present invention.

The present invention uses a simple data structure called a "link-node" to preserve the integrity of the original CFG through the code-disguise process. A link-node represents the in-flow and out-flow information of a basic block in the original CFG of an application software program before CFG-merging. FIG. 16 shows a diagrammatic example of a single link-node contained in a basic block of an original CFG according to the present invention. The link-node maintains the in-flow and out-flow information of the basic block.

Figure 17:
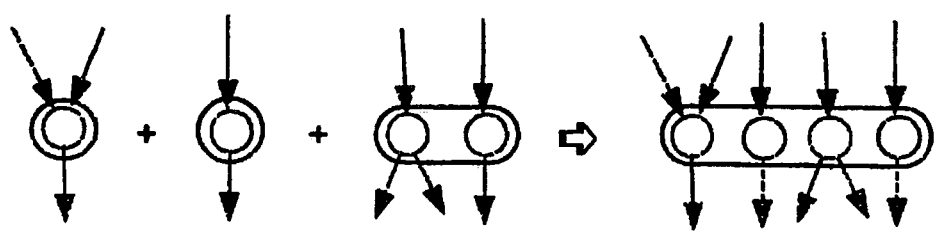
FIG. 17 shows a diagrammatic example a process of preserving link-nodes in the new basic block created from CFG merging according to the present invention.

As multiple basic blocks are merged into one new basic block, the link-nodes within the old basic blocks are moved to and preserved within the new basic block. FIG. 17 shows a diagrammatic example of a process of preserving link-nodes in the new basic block created from CFG-merging according to the present invention. Thus, while the CFG changes, its underlying link-node graph ("LNG") maintains the flow behavior of the original CFG. Throughout the process of code disguise, it is the LNG that is being used for supporting data analyses. Note that a link-node is contained in exactly one basic block at all times.

In the context of basic blocks, a basic block "predecessor" of basic block b is defined as a basic block that has an out-edge pointing to b. Similarly, in the context of link-nodes, a link-node "predecessor" of node n is defined as a link-node that has an out-edge pointing to n. "Pred-links(x)" is defined as the set of link-node predecessors of link-node x. "Succ-links(x)" is defined as the set of link-node successors of link-node x.

The following procedure may be used to merge multiple similar code segments together:

1. If a code segment to be merged is not an entire independent basic block, make it form an entire independent basic block by splitting it from its parent basic block.
2. If a basic block to be merged has no basic block predecessor, for example, if the basic block is the starting basic block of the application software program, add an empty basic block as its predecessor.
3. Among the candidate basic blocks to be merged, select those that satisfy the following two conditions:
   (a) Basic blocks that do not contain any link-nodes that share a link-node predecessor;
   (b) Basic blocks that do not contain any link-node that is a predecessor of itself or of another link-node in either candidate basic block;

These two conditions make later steps of the merging possible by guaranteeing that each distinct link-node in the merged basic block will have a unique, prior computation environment for deriving its needed values such as the target addresses for the jump instruction.
4. Merge the basic blocks into one, collecting and preserving their link-nodes in the merged basic block.
5. Assign a variable for each conflicting set of immediate values. The chosen variable may be either a new or a used variable that is not live in either the link-nodes of the merged basic block or in their link-node predecessors.
6. Precompute for each of the assigned variables its set of conflicting values.
7. If any of the basic blocks just merged previously were designated with levels or schemes of protection by guards, designate the merged basic block to be protected by the highest level or scheme of protection. This improves the likelihood that the merging process will not compromise the levels of protection expected by any of the old basic blocks.

Figure 18:
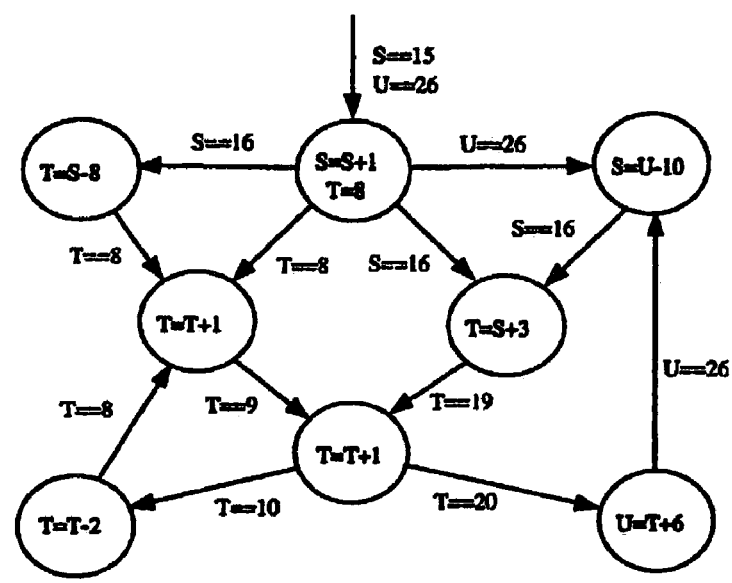
FIG. 18 shows a diagrammatic example of network of dynamically changing and mutually dependent data values resulting from the data precomputation method of the present invention.

Driving the CFG-merging assembly language software code disguise technique, and the data-aliasing assembly language software code disguise technique, is a technique called "data precomputation." Data precomputation comprises a method of hiding data values in variables and precomputing their values before their use. A result of data precomputation is the establishment of a network of dynamically changing and mutually dependent data values that is tightly integrated into the application software program assembly language code. FIG. 18 shows a diagrammatic example of such a network. Note that correct execution of the software program depends on the values of a variable. If a guard fires during execution, altering the value of at least one variable, the error may propagate into other parts of the network and the software program potentially may suffer from a subtle error that is difficult for a hacker to detect.

Data precomputation is a general method for precomputing for a variable its set of values to be used at different points during the application software program execution, so that upon reaching any point during the application software program execution where the variable is to be used, the variable will contain an appropriate value. One use of data precomputation is to compute multiple sets of conflicting values within a newly merged basic block.

FIGS. 19A-B show an algorithm for performing data precomputation according to the present invention. The algorithm illustrated in FIGS. 19A-B performs the data precomputation process in a reverse manner by initiating the process from the target basic block and then propagating the process in reverse directions of control flows. An advantage of this type of algorithm is that it works systematically with a CFG of any form, and that its backward propagation is flexible enough to stop at almost any desired point in the CFG.

The algorithm illustrated in FIGS. 19A-B begins by setting the expected values of the target variable for the link-nodes in the target basic block. Each link-node expects a single value from the variable. The rest of the process involves "pushing away" the computations of these values to other parts of the CFG through the underlying network of link-nodes.

At each link-node where a variable is expected to hold a certain value, one of the following may be used to give the variable its expected value:

1. Do nothing and pass the same request to all link-node predecessors of the current link-node; or
2. Assign the variable its expected value by installing a corresponding computation in the parent basic block (if such a computation has not yet been installed), that initializes the variable with the value. If the computation uses an uninitialized variable, the variable will undergo the same process by requesting the predecessors to initialize it with the expected value.

Figure 20:
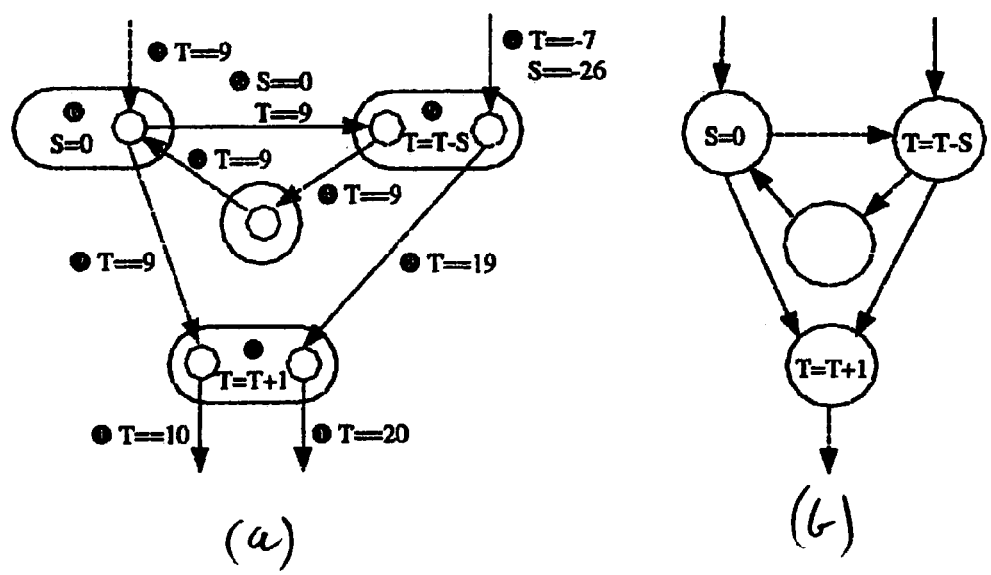
FIG. 20 shows a diagrammatic example of data precomputation based on an underlying graph of link-nodes according to the present invention.

FIG. 20 shows a diagrammatic example of data precomputation based on an underlying graph of link-nodes according to the present invention. Part (a) of FIG. 20 illustrates the process of backward propagation, starting from the bottom node. Part (b) of FIG. 20 shows what a user may see given only this portion of the CFG.

A result of data precomputation is the creation of a global network of inter-dependent data values stored as variables upon which the software program host depends. The network of inter-dependent data values is sensitive to changes in the data values because a change in one part of the network may trigger changes in other parts. This enhances the effectiveness of checksumming guards in particular, because checksumming guards can fire in one part of the network and affect the whole network. As a result, the attacker may see only a consequence of checksumming guard firing without knowing where the checksumming guard firing actually occurs. This effect is called a "subtle errors effect."

Figure 21:
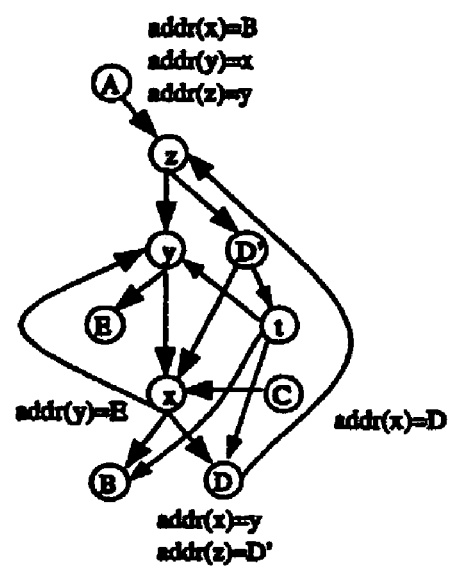
FIG. 21 shows a diagrammatic example of a CFG-cloning assembly language code disguising technique according to the present invention, wherein basic block t has been cloned from basic block x in FIG. 11, so that the flow coming from D' can go through either of x or t in a randomized manner.

The second assembly language software code disguise technique is called CFG-cloning. CFG-cloning complicates the CFG by adding to it new, seemingly non-deterministic flows. FIG. 21 shows a diagrammatic example of CFG-cloning according to the present invention, wherein basic block t has been cloned from basic block x in FIG. 11, so that the flow coming from D' can go through either of x or t in a randomized manner.

CFG-cloning serves as a complement to CFG-merging by introducing into the CFG new flows cloned from parts of the graph. The intent of CFG-cloning is to complicate the underlying execution flows of the merged CFG by making the new flows that are partial and randomized substitutions of their parent flows, injecting "non-deterministism" in execution traces.

Basic blocks are the units to be cloned. The following is a method for CFG-cloning:

1. Selecting a small subset of basic blocks, each of which has a large number of unmerged basic block predecessors with only a single link-node successor.
2. Produce a clone for each of the above-mentioned basic blocks.
3. For each newly created clone, direct a subset of its unmerged basic block predecessors to also point to it as their new successor. Each of these predecessors may be modified in such a way that it will jump to either of its successors based on a randomized condition. As an example, one simple way to create a randomized condition is to do a comparison between two variables chosen randomly from the code. Outcomes, as a result, are based randomly on run-time values of the variables. An application software program with such randomized conditions will be more difficult to understand. FIG. 22 shows an example of assembly language code containing a randomized jump-based decision which will be made by the application software program during program execution based on the value of two unrelated variables, %eax and (%esp).
4. In the final step, all clones undergo basic block rewriting, such as the instruction reshuffling and register reallocation techniques used by Mambo et al. Basic block rewriting recasts the basic blocks with new looks, thereby offering a plausible appearance that they are functionally different from their counterparts. The functionality of the basic blocks remains unchanged. These clones may be further rewritten by other disguise transformations, such as CFG-merging, in later rounds of the code-disguise process.

The third assembly language software code disguise technique is called data-aliasing. Data-aliasing involves hiding data values. In one embodiment, data-aliasing can involve hiding a constant data value, such as a numeric literal, in the code. Data-aliasing according to this embodiment involves the steps of identifying a constant data value to be hidden, identifying a variable, substituting an occurrence of the variable for at least one occurrence of the constant data value in the application software code, and initializing the variable by the process of data precomputation so that the variable will evaluate to the constant data value when the variable is needed during program execution. The steps can be repeated until a desired level of data-aliasing is achieved.

Figure 23:
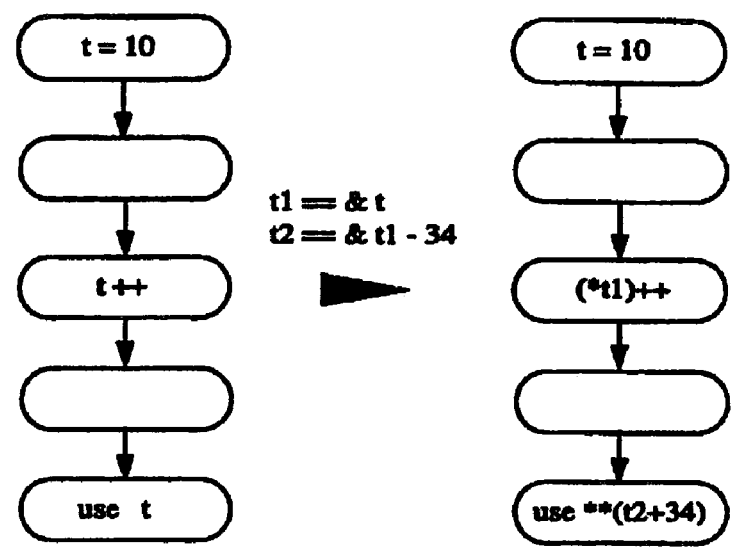
FIG. 23 shows a diagrammatic example of data-aliasing according to the present invention, wherein the two occurrences of variable t are aliased by variables $t_1$ and $t_2$, which are pointers containing the partial address of t.

In another embodiment, data-aliasing can involve creating pointer-aliases with arbitrary levels of indirection. FIG. 23 shows a diagrammatic example of data-aliasing according to this embodiment, wherein the two occurrences of variable t are aliased by variables $t_1$ and $t_2$, which are pointers containing the partial address of t. Variables $t_1$ and $t_2$ contain known precomputed values, and are used for accessing t indirectly through pointer arithmetic and dereferencing. Syntax similar to that used in the C software programming language is used in FIG. 23.

Data-aliasing is an application of a data-precomputation algorithm to hide data values in the code. Based on the network of variables with pre-computed values established by CFG-merging, data-aliasing can conceal as many data values in the code as desired, thereby further weaving the network of inter-dependent values into the host. For example, it can create pointer-aliases of arbitrary levels of indirection, by one of the following methods:

1. If t is a variable whose address, T, is a constant, for example, if t is a global variable, then an occurrence of t in the code can be replaced by a mathematical expression which evaluates to T, and which is dereferenced. For example, if $g_2$ is a new global variable initialized to hold the mathematical expression (T). Optionally, $g_2$ may be initialized to hold the value of a mathematical expression comprising T and at least one numeric literal, such as (T−4340480), or a mathematical expression comprising T and at least one variable, such as (T−x), or a mathematical expression comprising T, at least one numeric literal, and at least one variable. Where $g_2$ has been initialized to hold T, an occurrence of t in the code can be replaced by a second mathematical expression, which incorporates $g_2$, which evaluates to T, and which is dereferenced, such as, for example, *(g2), where "*" denotes pointer-dereferencing. If $g_2$ has been initialized to hold a mathematical expression comprising T and at least one numeric literal, such as (T−4340480), then the second mathematical expression substituted for t in this example would be *(4340480)+$g_2$). The second mathematical expression optionally may include additional numeric literals and/or at least one additional variable, provided the mathematical expression always evaluates to T. The constant address of $g_2$, $G_2$, can in turn be hidden by using another global variable with a known precomputed value, $g_1$. If $g_1$ holds, for example, 12345, then the occurrence of $g_2$ in *(4340480+$g_2$) may be replaced by *($g_1$–K) where K is the sum (–$G_2$+12345). The final representation for t then becomes *(4340480+*($g_1$–K)).

2. If t is a stack variable whose address is based on an unknown stack pointer and a known constant offset, then the constant offset can be disguised in a similar manner to the above.

The core data precomputation algorithm for data-aliasing is the same as that used in CFG-merging, except that in the data-aliasing technique the algorithm takes in only a single data value to be precomputed instead of a vector of them. The technique of data-aliasing involves randomly and repetitively selecting a subset of data values in the code and then performing data precomputation for each of them.

It is known by those of ordinary skill in the art to provide the ability to insert different watermarks or fingerprints in otherwise identical copies of an application software program. For simplicity, the term "watermark" as used in the following discussion includes both software "watermarks" and software "fingerprints." Therefore, a watermark "$W_1$" in one copy of an application software program (denoted as "$S_1$") is different from a watermark "$W_2$" in another copy of the application software program (denoted as "$S_2$"). Preferably, program copies $S_1$ and $S_2$ operate identically, even though each contains a different watermark.

Software watermarks are messages encoded into software programs. Software watermarks often carry information, such as information identifying the licensee or the vendor of the software program. A tamper-resistant watermark makes software program piracy less likely, since the watermark can be used to prove ownership of a software program copy, as well as to trace the origin of illegal redistribution of a software program. In addition to tamper-resistance, salient features of software watermarks include sufficient data capacity for encoding messages, ease of extraction by software program vendors or authors, and a high degree of confidentiality for sensitive messages.

With SPC, all of the foregoing salient features of software watermarking are attainable. To become tamper-resistant, watermarks are inserted into inter-basic block regions of the application software program that have been protected by checksumming guards. Unlike dynamic watermarking schemes disclosed by Collberg et al. in an article entitled, "Software Watermarking: Models and Dynamic Embeddings," published in ACM SIGPLAN-SIGACT POPL'99, San Antonio, Tex., USA, January 1999, in which watermarks are encoded in run-time data structures and where data capacity becomes an issue, the watermarking or fingerprinting scheme of the present invention is static in nature and, theoretically, is unlimited in data capacity. In practice, however, longer watermarks may slightly degrade software program performance. Furthermore, as with any static watermarking scheme, extraction of watermarks is easily accomplished by scanning the file for known messages or patterns.

Figure 24:
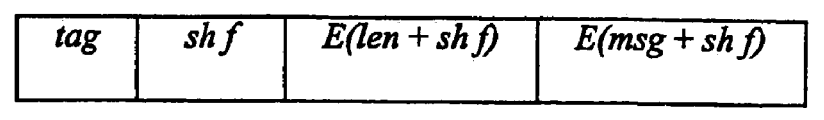

If confidentiality is necessary, watermarks can be encrypted before they are inserted into the code. The following is an example of a scheme for producing encrypted watermarks that appear to be random byte strings, even if the watermark messages have the same contents. Each watermark message is encoded into a sequence of byte strings as shown in FIG. 24. In FIG. 24, tag is a one-byte prefix common to all watermarks in the code. This one-byte prefix may be specified by the user, or may be derived from encryption key by a means known in the art, such as, for example, from the application of a one-way hash function to the encryption key or to a character string containing the encryption key, or from a random number generator whose seed is the encryption key. With only one byte, the tag effectively limits the search space for true watermarks without compromising its random-looking appearance. In FIG. 24, sh f is a two-byte number that is unique for each of the watermarks, which may be extended to be four-bytes long if a large number of watermarks are to be encrypted. It is this number that gives messages of same content different appearances, by first masking their content and length using the same number (denoted as "msg+sh f" and "len+sh f") before they are encrypted. In FIG. 24, E(M) denotes an encrypted version of string M using public key E(•). E(M) can be decrypted only by using a secret key known only to the party who encrypted the message.

Because a watermark W often comprises sensitive information, it may be desirable to protect the watermark W with a network of guards. It also may be desirable to use the same network of guards in each copy $S_y$ (where γ is an integer index variable and $1 \leq y$) of the application software program S. However, in a case where, for example, copies $S_1$ and $S_2$ of application software program S comprise watermarks $W_1$ and $W_2$, respectively, use of the same network of guards makes application program S susceptible to a collusion attack, wherein program copies $S_1$ and $S_2$ are compared instruction-by-instruction.

For example, if any two program copies $S_1$ and $S_2$ comprise the same network of guards M comprising checksumming guards $G_1, \ldots, G_m$ ($2 \leq m$), wherein (1) the client code of each checksumming guard $G_i$ (where i is an integer index variable and $2 \leq i \leq m$) comprises checksumming guard $G_{i-1}$, (2) the client code block of checksumming guard $G_1$ in program copy $S_1$ comprises watermark $W_1$, and (3) the client code block of checksumming guard G1 in program copy S2 comprises watermark $W_2$, then the expected checksum of the client code block comprising watermark W1 appears in or is accessed by checksumming guard G1 of program copy $S_1$, and the expected checksum of the client code block comprising watermark $W_2$ appears in or is accessed by checksumming guard G1 of program copy $S_2$. Likewise, the expected checksum of the client code block comprising checksumming guard G1 of each program copy $S_y$ appears in or is accessed by checksumming guard $G_2$ in each program copy $S_y$, and the expected checksum of the client code block comprising checksumming guard $G_2$ in each program copy $S_y$ appears in or is accessed by checksumming guard $G_3$ in each program copy $S_y$ and so on until reaching checksumming guard $G_m$.

Checksumming guard G1 in program copy $S_1$ is not the same as checksumming guard G1 in program copy S2, because checksumming guard G1 comprises information about the expected checksum of the client code block comprising watermark $W_1$ or $W_2$ (respectively). Likewise, checksumming guards $G_2$ through $G_m$ in program copy $S_1$ are not the same as their counterpart checksumming guards $G_2$ through $G_m$ in program copy $S_2$. Thus, a comparison of program copies S1 and S2 (such as in a collusion attack) reveals not only the differences in watermarks $W_1$ and $W_2$, but also the differences between the checksumming guards $G_i$ of program copy S1 and the checksumming guards $G_i$ of program copy S2. A practitioner can end up with every checksumming guard $G_i$ depending in some manner on watermark $W_y$, and thus every checksumming guard $G_i$ will look different for each copy $S_y$ of the application software program S.

The present invention comprises a method for using guards to protect differently watermarked copies of an application software program, wherein an application software program so protected is made less susceptible to a collusion attack. According to the present invention, a collusion attack of the type discussed above may be thwarted by "decoupling" checksumming guards $G_i$ from watermark $W_y$ in each program copy $S_y$. Thus, according to the present invention, in a network of guards M comprising m checksumming guards $G_i$ (where $1 \leq i \leq m; 2 \leq m$), wherein checksumming guard $G_1$ protects the integrity of watermark $W_y$, and checksumming guards $G_2, \ldots, G_m$ protect each other and checksumming guard $G_1$, the network of checksumming guards M appears to be identical in each copy $S_y$ of application software program S.

Watermark $W_y$ is an integer according to this method. The value of watermark $W_y$ must be greater than 1. Preferably, watermark $W_y$ has a large value and a length of not less than 128 bits, but this is not required. $W_y$ is stored program copy $S_y$.

In a first embodiment of this method, new constant integers $A_y$ and V are introduced. V is a randomly selected integer, but its value is the same in all differently watermarked copies $S_y$ of application software program S. V is stored in the program code of all program copies $S_y$.

The value of constant $A_y$ is equal to the difference between integer V and watermark $W_y$. Accordingly, constant $A_y$ is different in all differently watermarked copies $S_y$ of application software program S. In equation form:

$$A_y = V - W_y$$

Also introduced in this embodiment is a decoupling guard designated as guard $G_0$. Guard $G_0$ is installed in program copy $S_y$ after watermark $W_y$ and integers $A_y$ and V are installed. Guard $G_0$ is inserted into network of guards M such that the client code block of guard $G_0$ comprises watermark $W_y$, and the client code block of checksumming guard $G_1$ comprises guard $G_0$.

Guard $G_0$ comprises properties that are different from those of checksumming guards $G_1, \ldots, G_m$. In operation, when the application software program instructions comprising guard $G_0$ are executed, instead of calculating the checksum of its client code block comprising watermark $W_y$, guard $G_0$ merely verifies that watermark $W_y$ is of the expected length, and then computes the sum of watermark $W_y$ and constant integer $A_y$ and performs a conditional computation to verify that the result is equal to V. Thus, V is part of guard $G_0$ and is therefore protected by the guard(s) that protect guard $G_0$. If watermark $W_y$ has been altered after constant integer $A_y$ is calculated and stored in program copy $S_y$, the conditional computation comprising the following equation will not hold true:

$$W_y + A_y = V$$

Guard $G_0$ then will take a defensive action.

Checksumming guard $G_1$ computes the checksum of a client code block comprising guard $G_0$, rather than a client code block comprising watermark $W_y$. The operation of each other checksumming guard $G_i$ (namely, checksumming guards $G_2, \ldots, G_m$) is unaltered. Each computes the checksum of the client code block comprising guard $G_{i-1}$.

Because V is the same in all differently watermarked copies $S_y$ of application software program S, guard $G_0$ looks the same in all differently watermarked copies $S_y$. Because guard $G_0$ appears to be the same in all $S_y$, so does checksumming guard $G_1$ and, hence, so do all of the other checksumming guards $G_i$ of network of guards M. Accordingly, a collusion attack against two differently watermarked copies $S_y$ of application software program S exposes only the different watermarks $W_y$, but does not expose any of the guards $G_i$. An attacker unaware of the network of guards may attempt to alter a watermark $W_y$, but in so doing will cause one or more of the guards $G_i$ to take a defensive action.

Although this first embodiment of the method for using guards to protect differently watermarked copies of an application software program can be effective, the protection afforded to application software program S by this first embodiment is weak because of the simple expression used to compute $A_y$. A collusion attack on differently watermarked program copies $S_1$ and $S_2$ will reveal watermarks $W_1$ and $W_2$, respectively. Also revealed will be constants $A_1$ and $A_2$, respectively, which are different in program copies $S_1$ and $S_2$. A hacker thereafter can replace, for example, watermark $W_1$ with a forged watermark $W_{1f}$, and concurrently replace constant $A_1$ with the result of $V - W_{1f}$. Thus, guard $G_0$ in program copy $S_1$ still obtains constant V, even though watermark W1 was replaced with forged watermark $W_{1f}$.

Another, more resilient embodiment of the method for using guards to protect differently watermarked copies of an application software program also uses a randomly selected constant integer V which has the same value in all differently watermarked copies $S_y$ of application software program S. Also used in this embodiment is decoupling guard $G_0$, which is installed in the network of guards M such that the client code block of guard $G_0$ comprises watermark $W_y$, and the client code block of checksumming guard $G_1$ comprises guard $G_0$.

Integers $p_y$ and $q_y$ are introduced used in this embodiment. Each of integers $p_y$ and $q_y$ has a predetermined and constant value. Integers $p_y$ and $q_y$ are associated with each program copy $S_y$, but are not stored within the code comprising the program copy $S_y$. However, the multiplicative product $p_y q_y$ of integer $p_y$ and integer $q_y$ is stored within the code comprising the program copy $S_y$. According to this embodiment, each integer $p_y$ and integer $q_y$ comprises the following properties:

Each is a prime number
$p_y \neq q_y$
$p_y$ modulo $V \neq 0$
V modulo $p_y \neq 0$
$q_y$ modulo $V \neq 0$
V modulo $q_y \neq 0$
$V < p_y q_y$ Integers $p_y$ and $q_y$ are selected so that it is difficult for an attacker to derive integers $p_y$ and $q_y$ from multiplicative product $p_y q_y$. In an embodiment, integers $p_y$ and $q_y$ are large numbers.

A one-way function of the type discussed previously herein (denoted as "H(•)") is used in this embodiment. One-way function H(•) is executed with unaltered watermark $W_y$ as its input argument. According to this embodiment, each one-way function $H(W_y)$ has a multiplicative inverse modulo$(p_y-1)(q_y-1)$. The multiplicative inverse of one-way function $H(W_y)$ modulo$(p_y-1)(q_y-1)$ is represented hereinafter by "$W'_y$," and satisfies the equation:

$$W'_y * H(W_y) \text{modulo}(p_y-1)(q_y-1) = 1$$

Multiplicative inverse $W'_y$ is computed as part of process of installing watermark $W_y$ in the application software program, but it is not stored within the code comprising program copy $S_y$. Integer $(p_y-1)$, integer $(q_y-1)$, and multiplicative product $(p_y-1)(q_y-1)$ also are not stored within the code comprising the program copy $S_y$. A practitioner of the present invention is advised that, to ensure that a multiplicative inverse $W'_y$ exists in every case, the values of $p_y$ and $q_y$ are selected so that for a given one-way function $H(W_y)$ there is a multiplicative inverse $W'_y$ which satisfies the above-defined equation. In an implementation of the present invention, random values of integer $p_y$ and $q_y$ are tested until a set of $p_y$ and $q_y$ is found which satisfies the above-defined equation.

Also according to this embodiment, a new constant integer $Q_y$ is introduced. The value of constant $Q_y$ is calculated according to the following equation:

$$Q_y = V^{W_y} \text{ modulo } p_y q_y$$

As part of process of installing guard $G_0$ in the application software program copy $S_y$, (1) integer V is identified, (2) integers $p_y$ and $q_y$ are selected and multiplicative product $p_y q_y$ is computed, (3) watermark $W_y$ is identified, (4) one-way function $H(W_y)$ is computed, (5) multiplicative inverse $W'_y$ is computed, and (6) integer $Q_y$ is computed. Recall that integers $p_y$ and $q_y$, and multiplicative inverse $W'_y$ are not retained anywhere in the application software program after integer $Q_y$ is computed.

As in the first embodiment of this method, guard $G_0$ in this embodiment comprises properties that are different from those of checksumming guards $G_1, \ldots, G_m$. Instead of calculating the checksum of its client code block comprising watermark $W_y$, guard $G_0$ performs a conditional computation to verify that the result of raising $Q_y$ to the power of one-way function $H(W_y)$ modulo $p_y q_y$ is equal to V. In equation form:

$$Q_y^{H(W_y)} \text{ modulo } p_y q_y = V$$

This equation is true because:

$$Q_y^{H(W_y)} \text{ modulo } p_y q_y = (V^{W_y} \text{ modulo } p_y q_y)^{H(W_y)} \text{ modulo } p_y q_y$$

and $$(V^{W_y} \text{ modulo } p_y q_y)^{H(W_y)} \text{ modulo } p_y q_y = V$$

Recall that the value of multiplicative inverse $W'_y$ does not appear anywhere in program copy $S_y$ of application software program S. Multiplicative inverse $W'_y$ is shown in the above equations only to explain the operation of the $Q_y^{H(W_y)}$ modulo $p_y q_y = V$ equation.

If watermark $W_y$ has been altered after constant $Q_y$ is calculated and stored in the program code comprising program copy $S_y$, the conditional computation comprising the equation:

$$Q_y^{H(W_y)} \text{ modulo } p_y q_y = V$$

will fail. Guard $G_0$ will take a defensive action.

According to this embodiment, checksumming guard $G_1$ computes the checksum of a client code block comprising guard $G_0$, rather than a client code block comprising watermark $W_y$. The operation of each other checksumming guard $G_i$ (namely, checksumming guards $G_2, \ldots, G_m$) is unaltered. Each computes the checksum of the client code block comprising guard $G_{i-1}$.

Because V is the same in all differently watermarked copies $S_y$ of application software program S, guard $G_0$ appears to be the same in all $S_y$, and hence so do all other guards $G_i$. Accordingly, a collusion attack against two differently watermarked copies $S_y$ of application software program S exposes only the different watermarks $W_y$ and constants $Q_y$, but does not expose any of the checksumming guards $G_i$. An attacker unaware of the network of guards may attempt to alter a watermark $W_y$, but in so doing will cause one of more of the guards $G_i$ to take a defensive action.

The fact that integers $p_y$ and $q_y$ are not apparent (and preferably not known) to an attacker makes it difficult for the attacker to modify a watermark $W_y$ and perform a corresponding modification to constant $Q_y$ that maintains the $Q_y^{H(W_y)}$ modulo $p_y q_y = V$ property. A modification to a watermark $W_y$ after constant $Q_y$ is calculated and stored in program copy $S_y$, is detectable by guard $G_0$ unless such a corresponding modification is made to constant $Q_y$. Modifying constant $Q_y$ requires computing a new multiplicative inverse (modulo$(p_y-1)(q_y-1)$) of one-way function $H(W_y)$, which is difficult to carry out without knowing integers $p_y$, $q_y$, $(p_y-1)$, and/or $(q_y-1)$. Accordingly, protection of watermark $W_y$ is stronger in this embodiment than in the first previous embodiment.

Yet another embodiment of this method for using guards to protect differently watermarked copies of an application software program uses an asymmetric key encryption technique of a type known in the art comprising a public-private key pair. As used elsewhere herein, $E(\bullet)$ denotes the public key, and $D(\bullet)$ denotes the private key. A one-way function $H(\bullet)$ of the type discussed previously herein also is used. Public key $E(\bullet)$ and one-way function $H(\bullet)$ are stored in program copy $S_y$. Preferably, private key $D(\bullet)$ is not stored anywhere within program copy $S_y$.

This embodiment uses decoupling guard $G_0$. As before, the client code block of guard $G_0$ comprises watermark $W_y$, and the client code block of checksumming guard $G1$ comprises guard $G_0$. Constant integer $Q_y$ is adapted for use in this embodiment. The value of constant $Q_y$ in this embodiment is computed by executing one-way function $H(\bullet)$ with watermark $W_y$ as its input argument, and then encrypting the result of one-way function $H(\bullet)$ using private key $D(\bullet)$. In equation form:

$$Q_y = D(H(W_y))$$

Integer $Q_y$ is computed as part of process of installing guard $G_0$ in the application software program. Integer $Q_y$ then is stored as a constant within the code comprising program copy $S_y$.

Guard $G_0$ comprises properties which are different from those of checksumming guards $G_1, \ldots, G_m$. Instead of calculating the checksum of its client code block comprising watermark $W_y$, during program execution guard $G_0$ executes one-way function $H(\bullet)$ with watermark $W_y$ as its input argument, decrypts $Q_y$ using public key $E(\bullet)$, and then performs a conditional computation to verify that the computed values are the same. In equation form, guard $G_0$ performs a conditional computation to verify that the following property is present:

$$H(W_y) = E(Q_y)$$

If watermark $W_y$ has been altered after constant $Q_y$ is calculated and stored in the program code comprising program copy $S_y$, the conditional computation will fail. Guard $G_0$ will take a defensive action.

The remaining operation of network of guards M is in accordance with the operation described previously herein in regard to the earlier embodiments. Specifically, checksumming guard $G_1$ computes the checksum of a client code block comprising guard $G_0$, rather than a client code block comprising watermark $W_y$. Because guard $G_0$ appears to be the same in all $S_y$, so does checksumming guard $G_1$ and hence so do all of the other guards $G_i$ of the network of guards M. Accordingly, a collusion attack against two differently watermarked copies $S_y$ of application software program S exposes only the different watermarks $W_y$, and constants $Q_y$, but does not expose any of the guards $G_i$. An attacker unaware of the network of guards may attempt to alter a watermark $W_y$, but in so doing will cause one or more of the guards $G_i$ to take a defensive action.

In this third embodiment of the method for using checksumming guards to protect differently watermarked copies of an application software program, it is essential to compute $Q_y$ using one-way function $H(\bullet)$ with watermark $W_y$ as its input argument. Absent the use of one-way function $H(\bullet)$, the value of constant $Q_y$ would be set equal to $D(W_y)$ instead of $D(H(W_y))$. Under these conditions, guard $G_0$ would verify the following property:

$$W_y = E(Q_y)$$

instead of $$H(W_y) = E(Q_y)$$

A problem arises if the conditional computation of guard $G_0$ verifies $W_y = E(Q_y)$. Because both constant $Q_y$ and public key $E(\bullet)$ are present in the program copy $S_y$, a savvy hacker easily could replace $Q_y$ in a program copy $S_y$ with a random number r, and concurrently replace watermark $W_y$ in the program copy $S_y$ with $E(r)$. Thus, guard $G_0$ would, in effect, be verifying that $E(r) = E(r)$. Although watermark $W_y$ has been altered (i.e., replaced by $E(r)$), the conditional computation would not fail, giving the appearance that watermark $W_y$ is authentic.

Using one-way function $H(\bullet)$ with watermark $W_y$ as its input argument avoids this shortcoming, because it becomes very difficult to change watermark $W_y$ (such as by replacing it with a decrypted random number $E(r)$) and make a corresponding change to $Q_y$ that maintains the $H(W_y) = E(Q_y)$ property. Because of the inherent one-way property of one-way function $H(\bullet)$, there is not a direct relationship between changes to watermark $W_y$ and changes to $H(W_y)$. Accordingly, because $Q_y$ is calculated using $H(W_y)$, there is not a direct relationship between changes to watermark $W_y$ and changes to $Q_y$.

Each of the foregoing embodiments of the method for using guards to protect differently watermarked copies of an application software program is described in terms of an acyclic guard formation. However, the same result can be achieved from each of these embodiments regardless of whether the network of guards comprises an acyclic guard formation, a cyclic guard formation, or a polycyclic guard formation.

It is known by those of ordinary skill in the art to provide the ability to insert one or more program parameters into copies of an application software program. These program parameters may be different in otherwise identical copies of an application software program. Such program parameters may, for example, implement software license restrictions or govern the allowed modes of use of the application software program. Thus, a first end user having a first copy $S_1$ of application software program S comprising a first set of program parameters $P_1$ may have the ability to use features of the application software program which are different from the features available to a second end user having a second copy $S_2$ of application software program S comprising a second set of program parameters $P_2$.

Individual program parameters may be "independent," meaning that the presence of or value of a first program parameter in a copy of an application software program does not correlate to the presence of or value of a second program parameter in the same copy. Alternatively, two or more program parameters may be "related" in a copy of an application software program such that the presence of or value of a first program parameter in a copy of an application software program correlates to the presence of or value of a second program parameter in the same copy. An application software program may comprise certain program parameters which are independent, and other program parameters which are related. In an embodiment, one or more of the program parameters may comprise a watermark.

Where the application software program is acquired by an end user through a download from a server to the end user's computer, the program parameters may be set by the server at software download time. Where the application software program is purchased on a computer readable medium such as a CD-ROM, the program parameters may be encoded into the application software program code on the CD-ROM. In an embodiment, a software publisher may adjust the set of program parameters according to the price an end user pays for the application software program. Thus, a first end user paying a higher price may receive a copy of the program comprising a set of program parameters allowing access to more features of the program. Conversely, a second end user paying a lower price may receive a copy of the program comprising a set of program parameters allowing access to fewer features of the program.

As with watermarks, problems may arise if one or more program parameters are discovered and altered by a hacker. The hacker may be able to obtain and use features of the application software program which exceed those to which the hacker otherwise would be entitled. In addition, a hacker, having overridden a program parameter limitation in an application software program, may distribute copies of the altered program to others, or may publicize his method for overriding the program parameter to permit others to alter the application software program in the same way.

Accordingly, in a copy $S_y$ of an application software program S, it is desirable to protect the program parameters $Z_j$ in the set of program parameters $P_y$ (where j and y are integer index variables; $1 \leq j$; $1 \leq y$) with one or more guards, or with a network of guards. In addition, where the application software program comprises a plurality of program parameters, it is desirable to have the plurality of program parameters rely on each other for protection, even if such program parameters are otherwise independent.

If a network of guards is to be used, it may be desirable to use the same network of guards in each copy $S_y$ of the application software program S. However, as was the case with watermarks, in the event copies $S_1$ and $S_2$ of application software program S comprise sets of program parameters $P_1$ and $P_2$, respectively, use of the same network of guards makes application program S susceptible to a collusion attack, wherein program copies $S_1$ and $S_2$ are compared instruction-by-instruction. For the reasons discussed previously herein in regard to protecting differently watermarked copies of an application software program, a collusion attack may reveal not only the program parameters $Z_j$, but also all guards in network of guards.

The present invention comprises a method for creating mutually reliant program parameters. According to the method of the present invention, a plurality of program parameters $Z_j$ are associated in a way that reduces the likelihood that any particular program parameter $Z_j$ can be altered unexpectedly without disrupting proper execution of the program copy $S_y$. The method for creating mutually reliant program parameters according to the present invention comprises an adaptation of the method described above regarding the use of guards to protect differently watermarked copies of an application software program. Also according to the method of the present invention, the same network of guards can be used in all copies $S_y$ of application software program S.

The method for creating mutually reliant program parameters of the present invention can be illustrated by an example where an application software program S comprises a set of program parameters P, which comprises n program parameters $Z_1, \ldots, Z_n$ (where $2 \leq n$). Program copy $S_1$ comprises set of program parameters $P_1$, and program copy $S_2$ comprises set of program parameters $P_2$. At least one program parameter $Z_j$ has a value which is not the same in both sets of program parameters $P_1$ and $P_2$.

According to this method, all program parameters $Z_j$ (where $1 \leq j \leq n$) in a program copy $S_y$ are concatenated to form a constant $U_y$. The order in which the program parameters $Z_j$ appear in concatenated constant $U_y$ is left to the discretion of the practitioner. Constant $U_y$ then is protected by a network of guards M comprising guards $G_i$ (i is an integer index variable; $0 \leq i \leq m$) in a manner similar to the manner by which watermark $W_y$ was protected in the method for watermark protection according to the present invention previously discussed herein.

In a first embodiment of the method for creating mutually reliant program parameters, constant integers $A_y$ and V are used. Each has properties which are the same as those discussed above in regard to the first embodiment of the watermark protection method of the present invention. V is a randomly selected integer having the same value in all copies $S_y$ of application software program S, and is stored in the program code of all program copies $S_y$. Constant $A_y$ is equal to the difference between constant V and constant $U_y$. Accordingly, constant $A_y$ is different in all copies $S_y$ of application software program S.

After constant $U_y$ and integers $A_y$ and V are installed in program copy $S_y$, guard $G_0$ is installed in network of guards M. The client code block of guard $G_0$ comprises constant $U_y$. Guard $G_1$ has a client code block comprising guard $G_0$. Each of guards $G_2, \ldots, G_m$ has a client code block comprising guard $G_{i-1}$. Guards $G_1, \ldots, G_m$ are checksumming guards. In operation, when the application software program instructions comprising checksumming guard $G_0$ are executed, guard $G_0$ recreates constant $U_y$ by "re-concatenating" program parameters $Z_1, \ldots, Z_n$, then computes the sum of recreated constant $U_y$ and constant integer $A_y$, and performs a conditional computation to verify that the result is equal to V. Constant integer V is part of the program instructions comprising guard $G_0$. Thus, it is protected by the network of guards M.

If one or more program parameters $Z_j$ has been altered after constant integer $A_y$ is calculated and stored in program copy $S_y$, the sum of constant integer $A_y$ and recreated constant $U_y$ (comprising the altered program parameter(s) $Z_j$) will not equal V. The conditional computation comprising the equation $U_y + A_y = V$ will not hold true, and guard $G_0$ will take a defensive action. Because V is the same in all copies $S_y$ of application software program S, guard $G_0$ looks the same in all program copies $S_y$, as do the other checksumming guards $G_1, \ldots, G_m$.

Although this first embodiment of the method for creating mutually reliant program parameters in an application software program can be effective, the protection afforded to application software program S by this first embodiment is weak because of the simple formula used to compute $A_y$. A collusion attack on differently watermarked program copies $S_1$ and $S_2$ will reveal constants $U_1$ and $U_2$, respectively. Also revealed will be constants $A_1$ and $A_2$, respectively, which are different in program copies $S_1$ and $S_2$. A hacker thereafter can replace, for example, constant $U_1$ with a dummy constant $U_{1d}$, and concurrently replace constant $A_1$ with the result of $V - U_{1d}$. Thus, guard $G_0$ in program copy S1 still obtains constant V, even though constant $U_1$ was replaced with dummy constant $U_{1d}$.

In another embodiment of the method for creating mutually reliant program parameters, randomly selected constant integer V is used again, as is guard $G_0$, which again has a client code block comprising constant $U_y$. Constant integers $p_y$ and $q_y$ are used, each having properties which are the same as those discussed above in regard to the second embodiment of the watermark protection method of the present invention. Integers $p_y$ and $q_y$ are associated with each program copy $S_y$, but are not stored within the code comprising the program copy $S_y$. The multiplicative product $p_y q_y$ of integer $p_y$ and integer $q_y$ is stored within the code comprising the program copy $S_y$. A one-way function H(•) of the type discussed previously herein also is used in this embodiment.

One-way function H(•) is executed with unaltered constant $U_y$ as its input argument. According to this embodiment, each one-way function $H(U_y)$ has a multiplicative inverse modulo $(p_y-1)(q_y-1)$. The multiplicative inverse of one-way function $H(U_y)$ modulo $(p_y-1)(q_y-1)$ is represented hereinafter by "$U'_y$," and satisfies the equation:

$$U'_y * H(U_y) \bmod (p_y-1)(q_y-1) = 1$$

Integer $(p_y-1)$, integer $(q_y-1)$, and multiplicative product $(p_y-1)(q_y-1)$ are not stored within the code comprising the program copy $S_y$. A practitioner of the present invention is advised that, to ensure that a multiplicative inverse $U'_y$ exists in every case, the values of $p_y$ and $q_y$ are selected so that for a given value of constant $U_y$, there is a multiplicative inverse $U'_y$ which satisfies the above-defined equation. In an implementation of the present invention, random values of integer $p_y$ and $q_y$ are tested until a set of $p_y$ and $q_y$ is found which satisfies the above-defined equation.

Also according to this embodiment, constant $Q_y$ is used. The value of constant $Q_y$ is calculated according to the following equation:

$$Q_y = V^{U'_y} \bmod p_y q_y$$

As part of process of installing guard $G_0$ in the application software program copy $S_y$, (1) integer V is identified, (2) integers $p_y$ and $q_y$ are selected and multiplicative product $p_y q_y$ is computed, (3) watermark $U_y$ is identified, (4) one-way function $H(U_y)$ is computed, (5) multiplicative inverse $U'_y$ is computed, and (6) integer $Q_y$ is computed. Recall that integers $p_y$ and $q_y$ and multiplicative inverse $U'_y$ are not retained anywhere in the application software program after integer $Q_y$ is computed.

In operation, guard $G_0$ recreates constant $U_y$ by "re-concatenating" program parameters $Z_1, \ldots, Z_n$, and then performs a conditional computation to verify that the result of raising $Q_y$ to the power of one-way function $H(U_y)$ modulo $p_y q_y$ is equal to V. In equation form, guard $G_0$ performs a conditional computation to verify that the following property exists:

$$Q_y^{H(U_y)} \bmod p_y q_y = V$$

If one or more program parameters $Z_j$ has been altered after constant $Q_y$ is calculated and stored in the program code comprising program copy $S_y$, the conditional computation comprising the foregoing equation will fail. This is because constant $Q_y$ is calculated using the multiplicative inverse $U'_y$ of one-way function $H(U_y)$. If one or more program parameters $Z_j$ has been altered, recreated constant $U_y$ will not be the same as original constant $U_y$. Thus, multiplicative inverse $U'_y$ (of the one-way function H(•) with original constant $U_y$ as its input argument) and the one-way function H(•) with recreated constant $U_y$ as its input argument will not cancel each other, as is necessary for the above equation to hold true. Accordingly, guard $G_0$ will take a defensive action.

The fact that integers $p_y$ and $q_y$ are not known to and not readily discoverable by an attacker makes it difficult for the attacker to modify any program parameter $Z_j$ which comprises constant $U_y$, and then perform a corresponding modification to constant $Q_y$ that maintains the $Q_y^{H(U_y)}$ modulo $p_y q_y = V$ property. A modification to any program parameter $Z_j$ after constant $Q_y$ is calculated means that the value of original constant $U_y$ used to calculate constant $Q_y$ will be different from the value of constant $U_y$ recreated during program execution. Thus, a modification to any program parameter $Z_j$ is detectable by guard $G_0$ unless a corresponding modification is concurrently made to constant $Q_y$. Modifying constant $Q_y$ requires computing a new multiplicative inverse (modulo$(p_y-1)(q_y-1)$) of the one-way function H(•) with recreated constant $U_y$ as its input argument, which is difficult to carry out without knowing integers $p_y$, $q_y$, $(p_y-1)$, and/or $(q_y-1)$.

A third embodiment of the method for creating mutually reliant program parameters uses asymmetric key encryption technique of a type known in the art comprising a public-private key pair. As before, E(•) denotes the public key, and D(−) denotes the private key. A one-way function H(•) of the type discussed previously herein also is used. Public key E(•) and one-way function H(•) are stored in program copy $S_y$. Private key D(•) is not stored anywhere within program copy $S_y$.

This embodiment also uses guard $G_0$, which has a client code block comprising constant $U_y$. Constant integer $Q_y$ is adapted for use in this embodiment. The value of constant $Q_y$ in this embodiment is computed by executing one-way function H(•) with constant $U_y$ as its input argument, and then encrypting the result of one-way function H(•) using private key D(•). In equation form:

$$Q_y = D(H(U_y))$$

Integer Q is computed as part of process of installing guard $G_0$ in the application software program. Integer Q then is stored as a constant within the code comprising program copy $S_y$.

In operation, guard $G_0$ recreates constant $U_y$ by "re-concatenating" program parameters $Z_1, \ldots, Z_n$, executes one-way function H(•) with recreated constant $U_y$ as its input argument, decrypts $Q_y$ using public key E(•), and then performs a conditional computation to verify that the computed values are the same. In equation form, guard $G_0$ performs a conditional computation to verify that the following property is present:

$$H(U_y) = E(Q_y)$$

If one or more program parameters $Z_j$ has been altered after constant $Q_y$ is calculated and stored in the program code comprising program copy $S_y$, the conditional computation comprising the foregoing equation will fail. This is because constant $Q_y$ is calculated using a one-way function H(•) with original constant $U_y$ as its input argument, and then encrypting the result of one-way function H(•) using private key D(•). Decrypting constant $Q_y$ with public key E(•) during the conditional computation returns the value of one-way function H(•) with original constant $U_y$ as its input argument.

If one or more program parameters $Z_j$ has been altered, recreated constant $U_y$ will not be the same as original constant $U_y$. Thus, the result of one-way function H(•) with recreated constant $U_y$ as its input argument will not be the same the result of one-way function H(•) with original constant $U_y$ as its input argument, as is necessary for a conditional computation comprising the above equation to hold true. Accordingly, guard $G_0$ will take a defensive action.

The fact that private key D(•) is not known or readily discoverable by an attacker makes it difficult for the attacker to modify any program parameter $Z_j$ and then perform a corresponding modification to constant $Q_y$ that maintains the $H(U_y) = E(Q_y)$ property. A modification to any program parameter $Z_j$ after constant $Q_y$ is calculated means that the value of original constant $U_y$ used to calculate constant Q, will be different from the value of constant $U_y$ recreated during program execution. Thus, a modification to any program parameter $Z_j$ is detectable by guard $G_0$ unless a corresponding modification is concurrently made to constant $Q_y$. Modifying constant $Q_y$ requires executing one-way function H(−) with recreated constant $U_y$ as its input argument, and then encrypting the result of one-way function H(•) using private key D(•), which is difficult to carry out without knowing private key D(•).

The remaining operation of network of guards M in each embodiment of the method for creating mutually reliant program parameters is the same. Checksumming guard $G_1$ computes the checksum of a client code block comprising guard $G_0$, checksumming guard $G_2$ computes the checksum of a client code block comprising checksumming guard $G_1$, and so on. Because guard $G_0$ appears to be the same in all $S_y$, so does checksumming guard $G_1$ and hence so do all of the other guards $G_i$ of the network of guards M. Accordingly, a collusion attack against two copies $S_y$ of application software program S exposes only the different program parameters $Z_j$, constants $B_y$, and constants $Q_y$, but does not expose any of the guards $G_i$. An attacker unaware of the network of guards may attempt to alter program parameter $Z_j$, but in so doing will cause one of more of the guards $G_i$ to take a defensive action.

Each of the foregoing embodiments of the method for creating mutually reliant program parameters in an application software program is described in terms of an acyclic guard formation. However, the same result can be achieved from each of these embodiments regardless of whether the network of checksumming guards comprises an acyclic guard formation, a cyclic guard formation, or a polycyclic guard formation.

Given that directly attacking some highly guarded application software program code is difficult, there is a type of attack that could easily bypass the guards by attacking the "neighbors", of the guarded code instead. This type of attack is called "clone attack," in which clones of the code blocks are first produced, then compromised, and finally merged into the application software program code, substituting for the original target code blocks, which are left intact but no longer execute during program execution.

Figure 25:
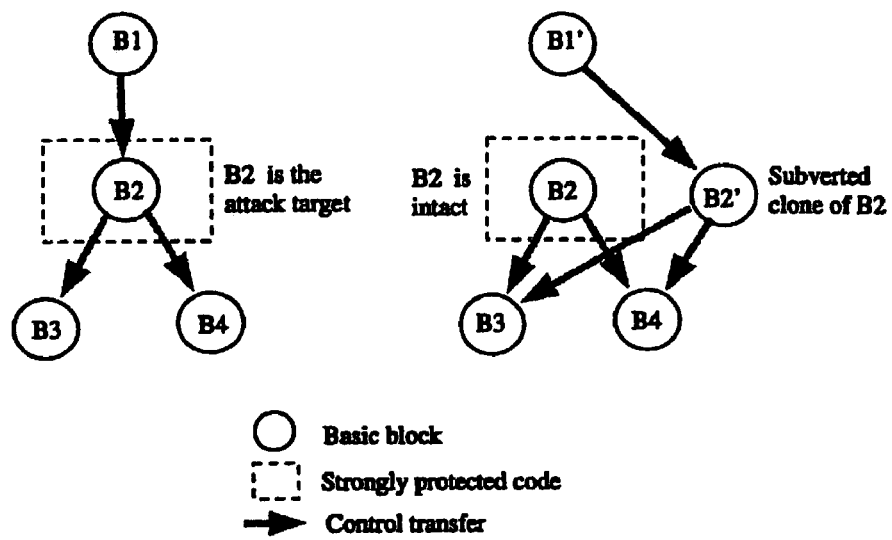
FIG. 25 shows a diagrammatic example of a clone attack.

FIG. 25 shows a diagrammatic example of a clone attack. In FIG. 25, the attack target, basic block $B_2$, is highly protected but its predecessor, basic block $B_1$, is not protected at all. In this case, an attacker can easily produce basic block $B'_2$, a clone of basic block $B_2$, as an extension of the program. Basic block $B'_2$ then becomes the attack target without any protection. To make the compromised basic block $B'_2$ a part of execution, the hacker redirects the transfer of control from basic block $B_1$ to flow into basic block $B'_2$, which then reroutes the flow back to basic blocks $B_3$ and $B_4$. The example above states the fact that a checksumming guard protection scheme can be bypassed easily if the protection range misses the "weak points" in its control-flow predecessors.

Several preventive measures may prevent clone attacks. First, install into the client code blocks special guards that monitor whether the application software program code has become a cloned copy of the original. These guards are units of code that use methods known in the art to check if some code relative to their current locations (the "code protection range") is different from before. They monitor their environments for clues about their positioning.

A second preventative measure is to enlarge the code protection range so that the range covers a larger number of predecessors of the originally protected code. This allows more guards to be installed within the range and increases the cost of tampering with the region.

A third preventative measure is to obscure by code disguise and obfuscation techniques the control flow both preceding and within the code protection range as much as possible. This is to prevent an attacker from knowing the locations of the immediate predecessors of his original target since these predecessors must be modified in order to transfer control to the clone.

A final preventative measure is to avoid placing critical code containing sensitive instructions or data near the beginning of the execution flow, where it is not reachable from the rest of the code, since such code contains a limited number of basic blocks and is very vulnerable to clone attacks.

Figure 26:
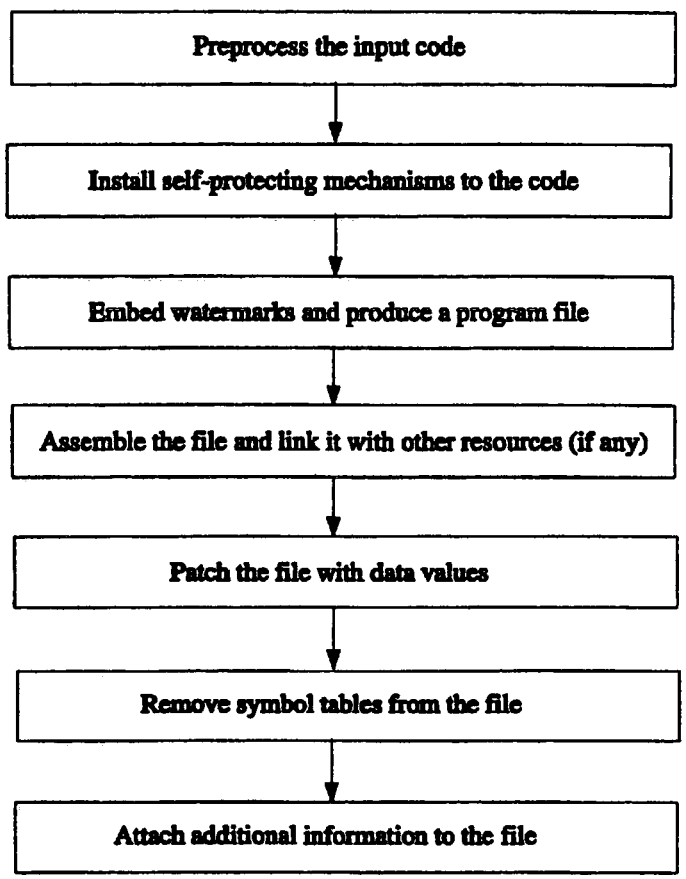
FIG. 26 shows one embodiment of a method of installing SPC according to the present invention.

An embodiment of the method of installing SPC according to the present invention is shown in FIG. 26. The method begins with a set of application software program files written in an assembly language. The first step shown in FIG. 26 is preprocessing the input code from the application assembly language software program files to enable efficient code transformations at a later stage of the process. The step is comprised of two concurrent operations. First, a combined CFG is built from the set of assembly language software program files. At the same time, instructions within the assembly language software program files containing high-level semantics are replaced by groups of simpler instructions with the equivalent semantics. The table in FIG. 27 illustrates several examples where the high-level semantics shown in the left column of the table are replaced by groups of simpler instructions with the same semantics shown in the right column. INTEL® assembly code is used in FIG. 27, however the method of the present invention will work equally well with other, different hardware architectures and assembly language code.

The second step shown in FIG. 26 involves installing self-protecting mechanisms. Self-protection is achieved by installing at least one guard into the application assembly language software program code. Self-protection may be enhanced by installing more than one guard to form a network of guards that cooperatively defend the application software program from modification. Further enhancement of self-protection may be achieved by applying a sequence of simple disguise and obfuscating transformations to the application assembly language software program code that protect the code and render the code unintelligible without compromising its functionality.

In the embodiment of the present invention shown in FIG. 26, three distinct operations comprise the step of installing self-protection mechanisms. First, the application assembly language software program code is disguised to obfuscate the appearance of the original code as much as possible before the installation of guards. Second, at least one guard is installed into the obfuscated code according to a protection scheme that may be given by the user, or may be generated automatically. Third, the code undergoes a second disguise operation to blend the guard code with the application assembly language software program code.

The third step shown in FIG. 26 involves embedding at least one watermark and producing a software program file. This step is optional, and may not be required in every implementation of this embodiment. When used, at least one watermark is embedded into the application assembly language software program code and protected by guards. After watermark insertions, a randomized listing of the software program basic blocks is written to a new file, which is to be assembled in the next stage. The new randomized listing will not rearrange the basic blocks that have already been protected, as they were grouped together and their relative positions were fixed during the previous guard installation stage. This avoids unexpected changes in values of parameters belonging to the guards already installed in the application assembly language software program code.

The fourth step shown in FIG. 26 involves assembling the file and linking the file with other resources. The new assembly file produced from the previous stage is assembled and its object file may be linked with other object files or libraries in order to produce a preliminary binary executable image.

The fifth step shown in FIG. 26 involves patching the preliminary binary executable image with data values which any checksumming guards will use in determining checksum correctness. During the previous installation of checksumming guards some binary information, for example, checksums of client code blocks in the finalized image, was not available and corresponding slots in the code for storing the values were left unfilled. This stage, therefore, computes the missing values based on the preliminary binary executable image and then patches them into the unfilled slots in the file.

The patching process is comprised of several steps. First, an external simulator program of a type known in the art is used to execute the checksumming template of each installed checksumming guard, deriving one or more checksums for each client code block guarded by a checksumming guard in the preliminary binary executable image. This checksum is called the "checksum constant" of the client code block. In one embodiment of the present invention, the checksum constants are patched into the file in the appropriate place in the preliminary binary executable image, and used by the checksumming guards to compare dynamically the checksums computed by the checksumming templates during program execution. In another embodiment of the present invention, a subset of the checksum constants, with each subset containing at least one checksum constant, are used to drive a functional algorithm which derives other values that in turn are patched into the file in the appropriate place in the preliminary binary executable image. These derived values and the functional algorithm are used by the checksumming guards to compare dynamically the checksums computed by the checksumming templates during program execution. To ensure that checksums are computed correctly, the order in which values are patched to the preliminary binary executable image follows the sequence of checksumming guard creations. This stage produces a binary executable application software program.

The sixth step shown in FIG. 26 involves removing symbol tables from the binary executable application software program. All symbol tables in the finalized code are removed. Their presence may give hints to attackers about the underlying self-protecting mechanisms.

The final step shown in FIG. 26 involves attaching additional information to the binary executable application software program file. For the convenience of both the vendor and users of the self-protecting software program, a digital signature of the file and any encrypted customization parameters used in the installation process, may be attached to the end of the file as shown in FIG. 28.

The digital signature provides an option for an application software program user to verify integrity of an application software program that came from an unknown, possibly hostile source. There are many digital signature schemes available, any of which can be applied here. For example, digital signatures by public-key cryptography and one-way functions may be used. Note that the digital signature may cover both the software program code (the first portion of the file) and any encrypted customization parameters (the second portion).

Customization parameters are encrypted by using a secret key known only to the vendor or author of the software program. The specific set of customization parameters that guided the installation process may be stored in the same file for future reference. There may be no need for the vendor to store the parameters in a database.

FIG. 29 shows a table illustrating the actions of a hypothetical self-protecting software program which produces incorrect results whenever its code is altered, even on inserting a single null instruction into the code. The table in FIG. 29 illustrates a self-protecting software program requires the correct password "opensesame" to generate the next prime number of a given number. The left column of the table in FIG. 29 illustrates the execution of the unaltered self-protecting software program, first when the wrong password is used and then when the correct password is used. The right column of the table in FIG. 29 illustrates the operation of the self-protecting software program after it has been altered by a hacker. On the first use, the altered self-protecting software program returns an erroneous value which may or may not be apparent to the hacker. After further alterations by the hacker, the altered software program terminates unexpectedly.

Figure 30:
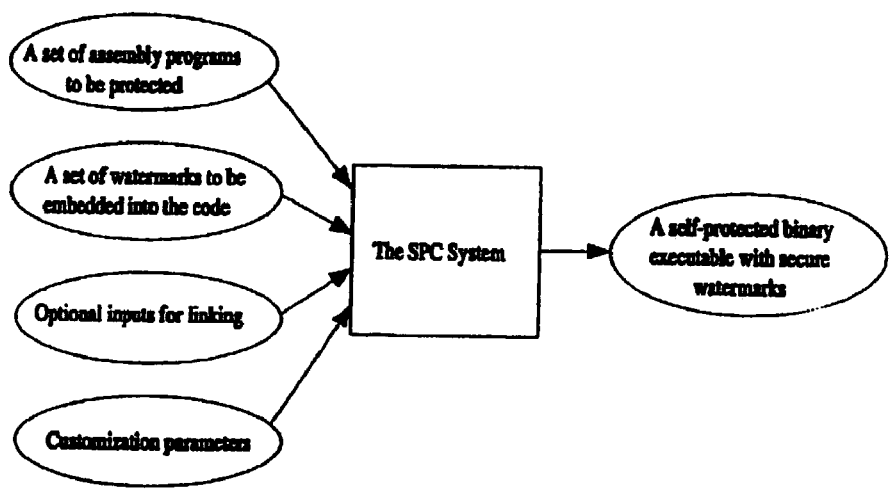
FIG. 30 shows a block diagram illustrating the operation of one embodiment of a system for creating a tamper resistant application software program according to the present invention.

FIG. 30 shows a block diagram illustrating the operation of one embodiment of a system for creating tamper resistant software according to the present invention. The box in FIG. 30 labeled "The SPC System" represents a software program for creating a tamper resistant application software program according to the present invention. The SPC System receives the input necessary to carry out the present invention, the input including but not limited to: (1) at least one assembly language software program to be protected, (2) optionally, a set of watermarks to be embedded into the assembly language software programs, (3) a set of object files or libraries with which the set of assembly language software programs will be linked, and (4) the customization parameters required by the present invention. The SPC System possesses a means for receiving more than one assembly language software program file as an input, including a means known in the art for resolving conflicting entity names may which may appear in different assembly language software program files, and a means known in the art for combining the more than one assembly language software program files. The SPC System installs Self-Protecting Code into the assembly language software programs in accordance with the present invention. The output of The SPC System will be a self-protecting binary executable software program, optionally having secure watermarks.

In an embodiment, the present invention may include a software means known in the art for storing references to one or more code blocks within an application software program to be protected by guards, and a means for later retrieving the stored references to the one or more code blocks. Such means will improve the efficiency of the present invention when the present invention is used by a user to protect an application software program which is under development. The user will not be required to identify code blocks to be protected each time the application software program is built from its component program files.

In an embodiment, the present invention may include a data storage and retrieval means known in the art for storing references to one or more guards installed in an application software program, and a means for later retrieving the stored references to the one or more guards. Such means will improve the efficiency of the present invention when the present invention is used by a user to protect an application software program which is under development. The user will not be required to reinstall guards each time the application software program is built from its component program files.

In an embodiment, the present invention may provide the user the option of specifying a desired level of protection for the application software program. For example, the user may specify that the software protection level be "low," "medium," or "high," or the user may specify the exact number of guards to be installed, and/or may specify the complexity of the guards to be installed. Additionally or alternatively, the user may specify that the code disguise level be "low," "medium," or "high." Such specifications may be made through a user interface. The present invention will be operable to accept these user specifications and generate a self-protecting binary executable software program in accordance with these user specifications, by, for example, varying the number and complexity of the embedded guards.

In an embodiment, the present invention is operable to receive an application software program, and to create protected copies of the executable version of the application software program which are protected differently. Differently protected copies of the application software program are achieved by varying the application of one or more of the different methods disclosed herein. For example: (i) different client code blocks in each copy of the application software program may be selected; (ii) different guard formations may be installed in each copy of the application software program; (iii) different checksumming templates may be installed in each copy of the application software program; (iv) the same checksumming template may be installed in each copy of the application software program, but the location within the application software program code where the checksumming template is installed may be different in each copy of the application software program; (v) different conditional identities may be installed in each copy of the application software program; (vi) the conditional identities may be installed in different locations in each copy of the application software program; (vii) different code disguise techniques, in different sequences, and for different numbers of iterations may be applied to each copy of the application software program; (viii) where CFG-merging is employed, different code blocks in each copy of the application software program may be selected for merging; (ix) where CFG-cloning is employed, different basic blocks in each copy of the application software program may be selected for cloning; (x) where data-aliasing is employed, different constant data values in each copy of the application software program may be selected; (xi) where data precomputation is employed, different computations for initializing the variables to be precomputed may be installed into the application software program code; (xii) the basic blocks of the application software program may be arranged in a different sequence in each copy of the application software program; (xiii) different watermarks may be installed in each copy of the application software program; and/or (xiv) the same watermark may be installed in each copy of the application software program, but the location within the application software program code where the watermark is installed may be different in each copy of the application software program. Other ways of varying the application of one or more of the different methods disclosed herein for the purpose of generating differently protected copies of the application software program may be used in addition to, or in lieu of, the foregoing examples.

An embodiment of the present invention may include a means for providing the user the option of protecting each copy of the application software program differently. If the user so opts, this embodiment may generate the differently protected copies of the application software program randomly and automatically, or may provide the user with the ability to generate the differently protected copies of the application software program under the control of the user. If the user does not desire differently protected copies of the application software program, this embodiment may be operable to create identically protected copies of the application software program randomly and automatically, or may provide the user with the ability to generate the identically protected copies of the application software program under the control of the user.

An embodiment of the present invention can be adapted to guard relocatable code (such as Windows DLL files) as well as regular non-relocatable code (such as executable files). Relocatable code is ordinary executable code except that it also contains information that allows the code to be loaded into (i.e., relocated to) different memory addresses at different program loading times. To make code relocation possible, the loader will patch location-dependent bytes in the program (such as target addresses of branch instructions) with values that depend on the actual memory location where the code is loaded. As a result, the values of these patched (or "fixup") bytes are not known until the program loading time, and these bytes may change from one program execution to another.

Because the values of the fixup bytes are unknown at guard installation time, the fixup bytes must not be checksummed by checksumming guards. That is, instead of checksumming a segment of code containing fixup bytes, for relocatable code the system of the present invention checksums subranges of the relocatable code that do not contain the fixup bytes. By installing checksumming guards at the assembly or binary level, the system can know exactly what fixup bytes to skip over while still protecting the integrity of the relocatable code.

Another embodiment of a guard according to the present invention is called an "external guard." Like the other guard embodiments discussed herein, an external guard is installed in an application software program. However, the function of an external guard is not exclusively the protection of the application software program in which it is installed. An external guard differs from other guards discussed herein in that at least one client code block of an external guard is not part of the application software program. The at least one "external" client code block of an external guard may be, for example, all or a portion of another application software program, or all or a portion of a computer file which is not part of the application software program in which the external guard is installed. In an embodiment, an external guard may have the features of a checksumming guard according to the present invention. In an embodiment, an external guard may have the features of a silent guard according to the present invention. In an embodiment, an external guard may have the features of a repair guard according to the present invention.

Another embodiment of an external guard is called a "policy-enforcement" guard. The function of a policy-enforcement guard according to the present invention is to enforce a certain policy for the computing platform upon which the application software program is running. For example, it may be desired by an employer to prevent employees from having instant messaging software on the employees' computers. This policy would be embodied in a computer file (a "policy file"), encrypted using a private key, and stored on the hard drive of the employees' computers. A policy-enforcement guard then is operable to retrieve a policy file, decrypt it using a public key, and verify whether any instant messaging software exists on the personal computer in violation of the policy. Optionally, the policy-enforcement guard may be operable to delete the offending instant messaging software from the personal computer. In the event that the policy is changed to allow a particular instant messaging software product, but other instant messaging software is not allowed, the revised policy file containing this information may be read and enforced by the same policy-enforcement guard.

The present invention may be integrated with a source code compiler software program or a linker software program used in the art to generate assembly language and/or binary executable software programs from application software program source code written in a high level programming language. In this embodiment the user may, optionally, select through a user interface those portions of the high level application software program source code to be protected, such as, for example, specific procedures, functions, routines, or lines of code, by at least one guard before compiling the application software program, and the compiler and present invention will be operable to generate a self-protecting binary executable software program with at least one guard installed in the locations in the binary executable code which correspond to the designated locations in the high level source code.

The method and system of the present invention provide a method and a system for protecting a application software program from unauthorized modification which do not require special hardware or code encryption and decryption. The method and system also do not require special operating system features for proper execution. The defensive actions taken according to the present invention in response to software tampering may produce subtle errors rather than immediate program failure, thereby hindering the efforts of hackers to unauthorizedly modify a guarded application software program.

The system of the present invention may be incorporated into or integrated with a programming language compiler for automatically generating self-protecting software programs, providing enhanced advantages for an author or vendor of a software program.

Those of skill in the art will appreciate that the various means recited herein and in the claims may be performed by computer software and/or computer hardware. Such computer software may be written in a high-level programming language such as, for example, Java, C, C++, Pascal, or Fortran.

In interpreting the mathematical expressions contained herein, the following precedence of operations shall apply: (1) functions, such as, for example, $H(W_y)$ or $E(R_j)$; (2) exponentiation; (3) multiplication and division; and (4) addition, subtraction, and modulo division. When multiplication and division occur together in an expression, each operation is evaluated as it occurs from left to right. Likewise, when addition, subtraction, and modulo division occur together in an expression, each operation is evaluated as it occurs from left to right. Where used, parentheses enclosing one or more operations affect the precedence of operations in the customary manner.

The terms "random" and "randomly" and "randomized" and "randomization" when used herein mean that no apparent pattern is present in that activities associated with such terms. The use of such terms does not necessarily imply the use of a uniform distribution or of any other well known statistical distribution.

While this invention has been described as having a preferred design, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof. A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains and which fall within the limits of the appended claims.

We claim:

1. A computer implemented method for adding tamper resistance to a software program, the method comprising:
   selecting a program block that computes a result necessary for proper execution of the software program, the program block comprising at least one program instruction;
   selecting a silent guard for the program block;
   selecting an insertion point in the software program;
   selecting a program variable in the software program;
   determining the expected value of the program variable at the insertion point;
   determining the expected value of the silent guard at the start of execution of the program block;
   installing a second computation that includes the runtime value of the program variable, such that the result of the second computation is corrupted if the runtime value of the program variable is not equal to the expected value of the program variable at the insertion point;
   setting the silent guard equal to the result of the second computation, such that the runtime value of the silent guard equals the expected value of the silent guard if the runtime value of the program variable equals the expected value of the program variable at the insertion point; and
   installing a first computation dependent on the silent guard in the software program, such that if the runtime value of the silent guard is not equal to the expected value of the silent guard then the first computation causes the result computed by the program block to evaluate improperly, causing the software program to execute improperly.

2. The method of claim 1, wherein the second computation uses both the expected value of the program variable and the runtime value of the program variable.

3. A recordable computer media having a tamper resistant software program recorded thereon, the tamper resistant software program comprising:
   a program variable having an expected value at a first dependency point in the software program and an expected value at a second dependency point in the software program, the expected value at the first dependency point not being equal to the expected value at the second dependency point;
   a silent guard variable having an expected value at the first dependency point;
   a mathematical computation that includes the runtime value of the silent guard variable and an expected term, the expected term being set based on the expected value of the silent guard variable at the first dependency point;
   a supplementary silent guard variable having an expected value at the second dependency point in the software program;
   wherein the runtime value of the program variable is dependent on the result of the mathematical computation which is dependent on the runtime value of the silent guard variable, such that the runtime value of the program variable will not equal the expected value of the program variable at the first dependency point if the runtime value of the silent guard variable does not equal the expected value of the silent guard variable at the first dependency point, which will cause the software program to execute improperly; and
   wherein the runtime value of the program variable at the second dependency point is dependent on the runtime value of the supplementary silent guard variable, such that the runtime value of the program variable will not equal the expected value of the program variable at the second dependency point if the runtime value of the supplementary silent guard variable does not equal the expected value of the supplementary silent guard variable at the second dependency point, which will cause the software program to execute improperly.

4. A recordable computer media having a tamper resistant software program recorded thereon, the tamper resistant software program comprising:
   a program variable having an expected value at a first dependency point in the software program and an expected value at a second dependency point in the software program, the expected value at the first dependency point not being equal to the expected value at the second dependency point;
   a silent guard variable having an expected value at the first dependency point and an expected value at the second dependency point in the software program;
   a mathematical computation that includes the runtime value of the silent guard variable and an expected term, the expected term being set based on the expected value of the silent guard variable at the first dependency point;
   wherein the runtime value of the program variable is dependent on the result of the mathematical computation which is dependent on the runtime value of the silent guard variable, such that the runtime value of the program variable will not equal the expected value of the program variable at the first dependency point if the runtime value of the silent guard variable does not equal the expected value of the silent guard variable at the first dependency point, which will cause the software program to execute improperly; and wherein the runtime value of the program variable at the second dependency point is dependent on the runtime value of the silent guard variable at the second dependency point, such that the runtime value of the program variable will not equal the expected value of the program variable at the second dependency point if the runtime value of the silent guard variable does not equal the expected value of the silent guard variable at the second dependency point, which will cause the software program to execute improperly.

5. The method of claim 1, wherein the insertion point is separated from the installation point of the first computation by a plurality of program instructions of the software program.

6. The recordable computer media of claim 3, wherein the first dependency point is separated from the second dependency point by a plurality of program instructions of the software program.

7. The recordable computer media of claim 4, wherein the first dependency point is separated from the second dependency point by a plurality of program instructions of the software program.

8. A recordable computer media having a tamper resistant software program recorded thereon, the tamper resistant software program comprising:
- a program block that computes a result necessary for proper execution of the software program, the program block comprising at least one program instruction;
- a silent guard for the program block, the silent guard having an expected value at the start of execution of the program block;
- a program variable, the program variable having an expected value at an insertion point in the software program;
- a second computation that includes the runtime value of the program variable, such that the result of the second computation is corrupted if the runtime value of the program variable is not equal to the expected value of the program variable at the insertion point; the silent guard being set equal to the result of the second computation, such that the runtime value of the silent guard equals the expected value of the silent guard if the runtime value of the program variable equals the expected value of the program variable at the insertion point;
- a first computation dependent on the silent guard, such that if the runtime value of the silent guard is not equal to the expected value of the silent guard then the first computation causes the result computed by the program block to evaluate improperly, causing the software program to execute improperly.

9. The recordable computer media of claim 8, wherein the second computation uses both the expected value of the program variable and the runtime value of the program variable.

10. The recordable computer media of claim 8, wherein the insertion point is separated from the first computation by a plurality of program instructions of the software program.

\* \* \* \* \*